United States Patent
Miyamoto et al.

(10) Patent No.: US 6,865,348 B2
(45) Date of Patent: Mar. 8, 2005

(54) OPTICAL TRANSMISSION METHOD, OPTICAL TRANSMITTER, OPTICAL RECEIVER, AND OPTICAL TRANSMISSION SYSTEM

(75) Inventors: Yutaka Miyamoto, Yokohama (JP); Akira Hirano, Yokohama (JP); Kazushige Yonenaga, Yokosuka (JP); Kenji Sato, Yokosuka (JP); Hiromu Toba, Yokosuka (JP); Akihiko Matsuura, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 659 days.

(21) Appl. No.: 09/793,954

(22) Filed: Feb. 28, 2001

(65) Prior Publication Data

US 2001/0017724 A1 Aug. 30, 2001

(30) Foreign Application Priority Data

Feb. 28, 2000 (JP) .................................. 2000-052579
Apr. 26, 2000 (JP) .................................. 2000-125783

(51) Int. Cl.$^7$ ...................... H04B 10/04; H04B 10/12
(52) U.S. Cl. ................. 398/183; 398/182; 398/184; 398/185; 398/186; 398/187; 398/188; 398/189; 398/201
(58) Field of Search ................ 398/183, 185–189, 398/182, 201, 128, 140

(56) References Cited

U.S. PATENT DOCUMENTS

| | | | | |
|---|---|---|---|---|
| 5,903,376 A | | 5/1999 | Hofstetter et al. | 359/181 |
| 5,917,638 A | * | 6/1999 | Franck et al. | 398/201 |
| 5,926,297 A | * | 7/1999 | Ishikawa et al. | 398/183 |
| 6,188,497 B1 | * | 2/2001 | Franck et al. | 398/183 |
| 6,266,171 B1 | * | 7/2001 | Gehlot | 398/161 |
| 6,278,539 B1 | * | 8/2001 | Ooi et al. | 359/237 |
| 6,304,353 B1 | * | 10/2001 | Gehlot | 398/185 |
| 6,421,155 B1 | * | 7/2002 | Yano | 398/183 |
| 6,522,438 B1 | * | 2/2003 | Mizuhara | 398/189 |

FOREIGN PATENT DOCUMENTS

| | | |
|---|---|---|
| EP | 0718990 A2 | 6/1996 |
| EP | 0977382 A2 | 2/2000 |
| JP | 09-236781 | 9/1997 |

OTHER PUBLICATIONS

O'Reilly J. J. et al., "Race R2005: Microwave Optical Duplex Antenna Link" IEE Proceedings J. Optoelectronics, Institution of Electrical Engineers, Stevenage, GB, vol. 140, No. 6 Part J, Dec. 1, 1993, pp. 385–391, XP000422802, ISSN: 0267–3932.

Yonenaga, et al., "Dispersion–Tolerant Optical Transmission System Using Duobinary Transmitter and Binary Receiver", Journal of Lightwave Technology, vol. 15, No. 8, Aug. 1997, 8 pages.

(List continued on next page.)

*Primary Examiner*—Leslie Pascal
*Assistant Examiner*—Chau M. Nguyen
(74) *Attorney, Agent, or Firm*—Thelen Reid & Priest, LLP

(57) ABSTRACT

A system which improves wavelength tolerance, compensates dispersion in a simple way, reduces limitation of the fiber input power is disclosed. The operation includes receiving a clock signal from a system clock source; modulating a single mode optical signal based on the clock signal and generating an optical pulse signal having two longitudinal modes, the frequency interval thereof being n×B, n being a natural number and B being a transmission speed; generating a partial response signal by converting a binary NRZ signal from a digital signal source in synchronism with the system clock source; and modulating the optical pulse signal based on the partial response signal, and outputting a binary RZ modulated signal. The binary RZ modulated signal is input into a receiver, where two partial response components in the optical spectra of the input signal are divided, and one or both of the components are received.

27 Claims, 43 Drawing Sheets

OTHER PUBLICATIONS

Matsuura, et al., "High-speed transmission system based on optical modified duobinary signals", Electronic Letters, vol. 35, No. 9, Apr. 1999, 2 pages.

Sato, et al., Frequency Range Extension of Actively Mode-Locked Lasers Integrated with Electroabsorption Modulators using Chirped Gratings, vol. 3, No. 2, Apr. 1997, 6 pages.

Suzuki, et al., "New Applications of a Sinusoidally Driven InGaAsP Electroabsorption Modulator to In-Line Optical Gates with ASE Noise Reduction Effect", Journal of Lightwave Technology, vol. 10, No. 12., Dec. 1992, 7 pages.

Iwatsuki, et al., "Generation of Transform Limited Gain-Switched DFB-LD Pulses <6 ps with Linear Fibre Compression and Spectral Window", Electronics Letters, vol. 27 No. 21, Oct. 1991, 2 pages.

Wake, et al., "Optical Generation of Millimeter-Wave Signals for Fiber-Radio Systems Using a Dual-Mode DFB Semiconductor Laser", vol. 43, No. 9, Sep. 1995, 7 pages.

Sato, et al., "Dual-Mode Operation of 60-Ghz Mode-Locked Semiconductor Lasers", 1 page.

Miyamoto, et al., "320 Gbit/s (8×40 Gbit/s) WDM transmission over 367 km with 120km repeater spacing using carrier-suppressed return-to-zero format", Electronic Letters, vol. 35, No. 23, Nov. 1999, 2 pages.

Yonenaga, et al., "Optical Duobinary Transmission System with no Receiver Sensitivity Degradation", Electronic Letters, vol. 31, No. 4, Feb. 1995, 3 pages.

Miyamoto, et al., "Dispersion-Tolerant RZ Signal Transmission Using Baseband Differential Code and Carrier Suppressed Modulation", Sep. 1998, 3 pages.

* cited by examiner

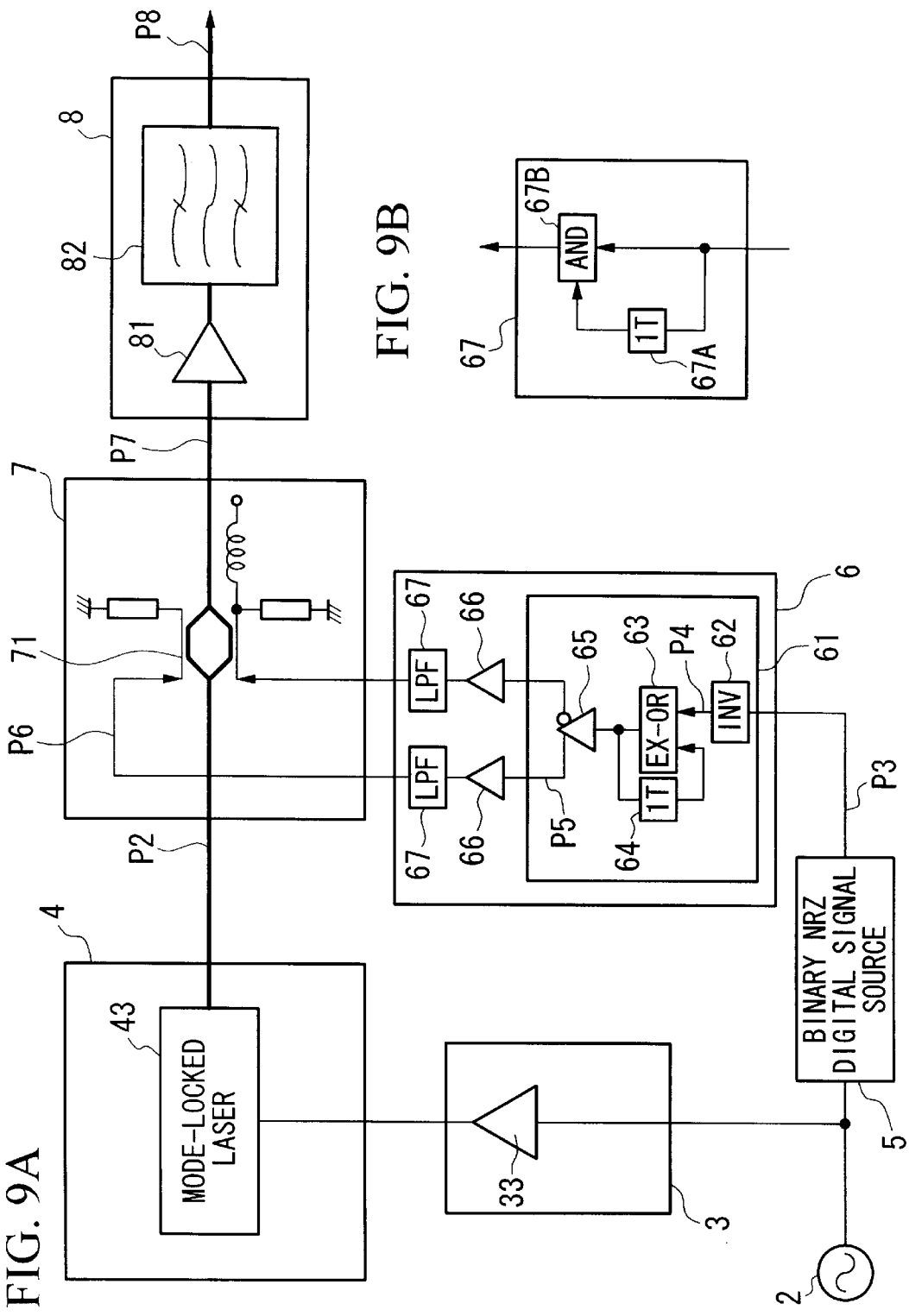

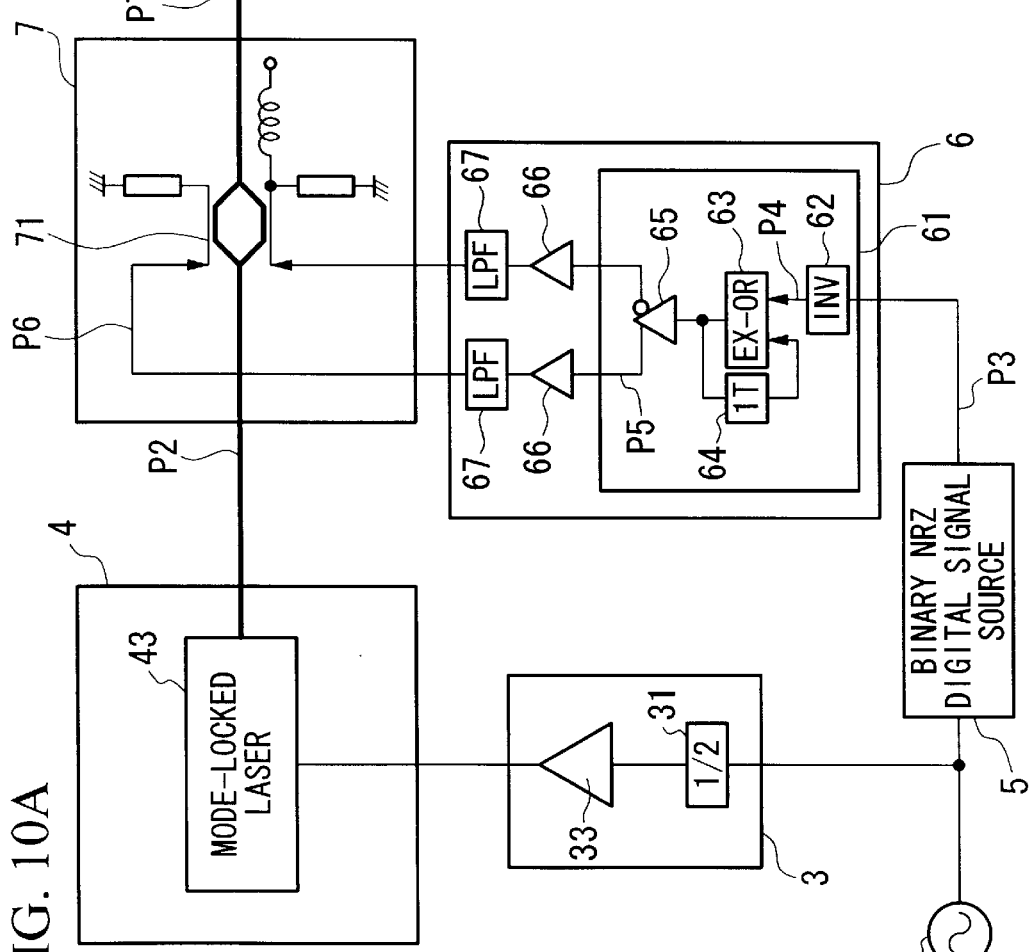
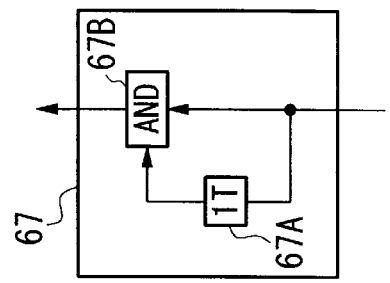
FIG. 10A
FIG. 10B

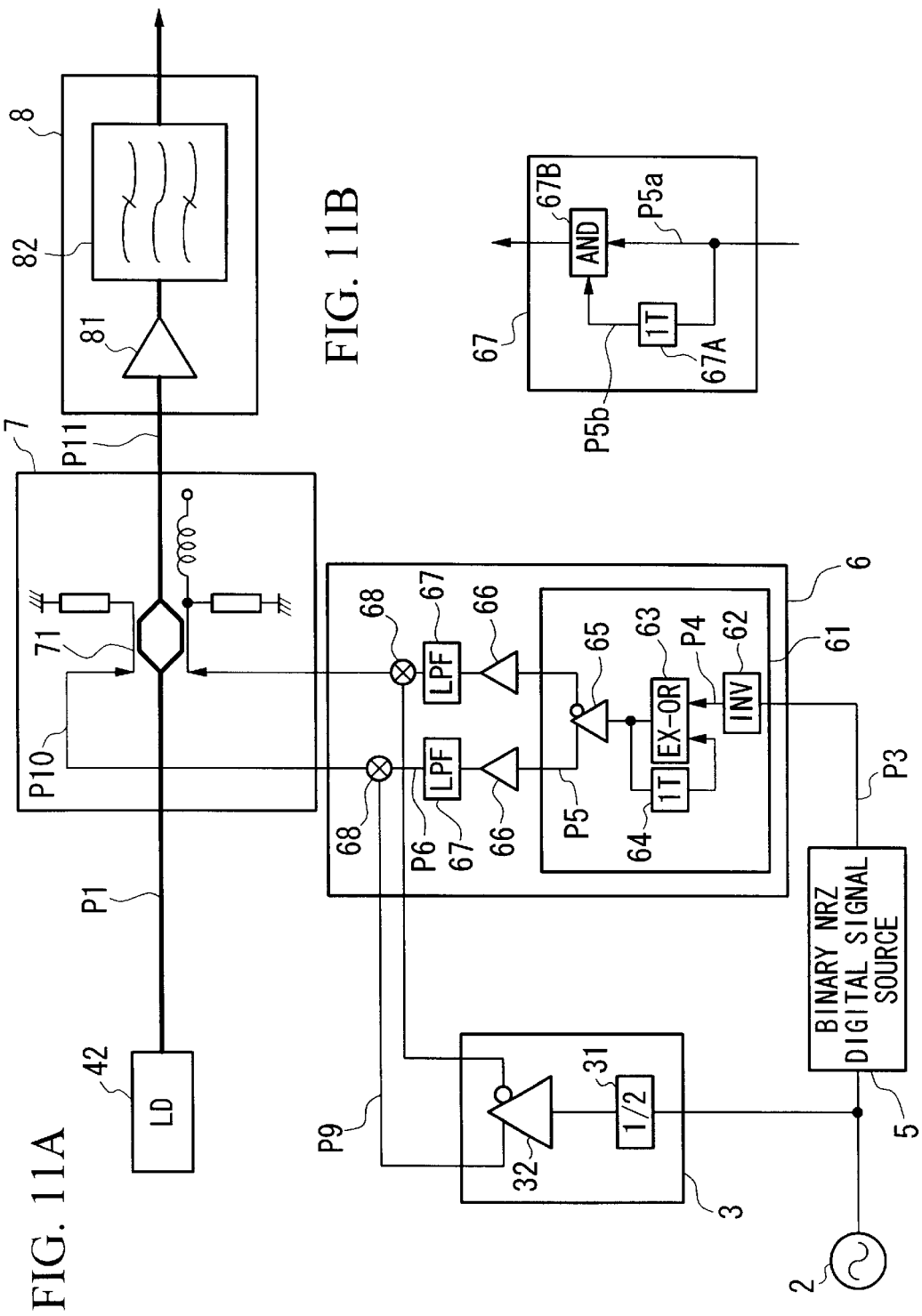

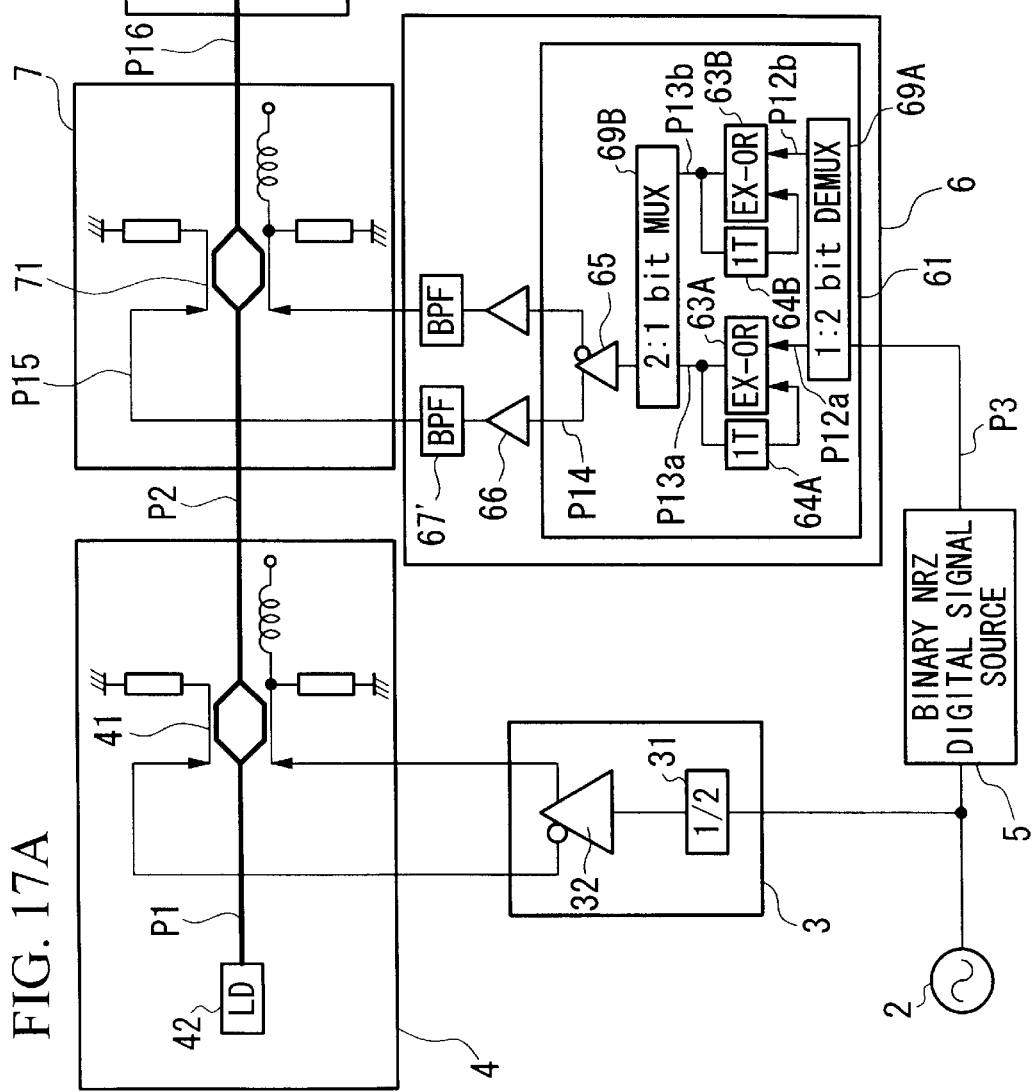
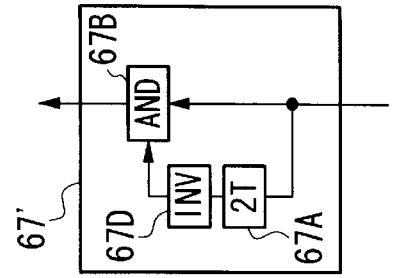
FIG. 17A
FIG. 17B

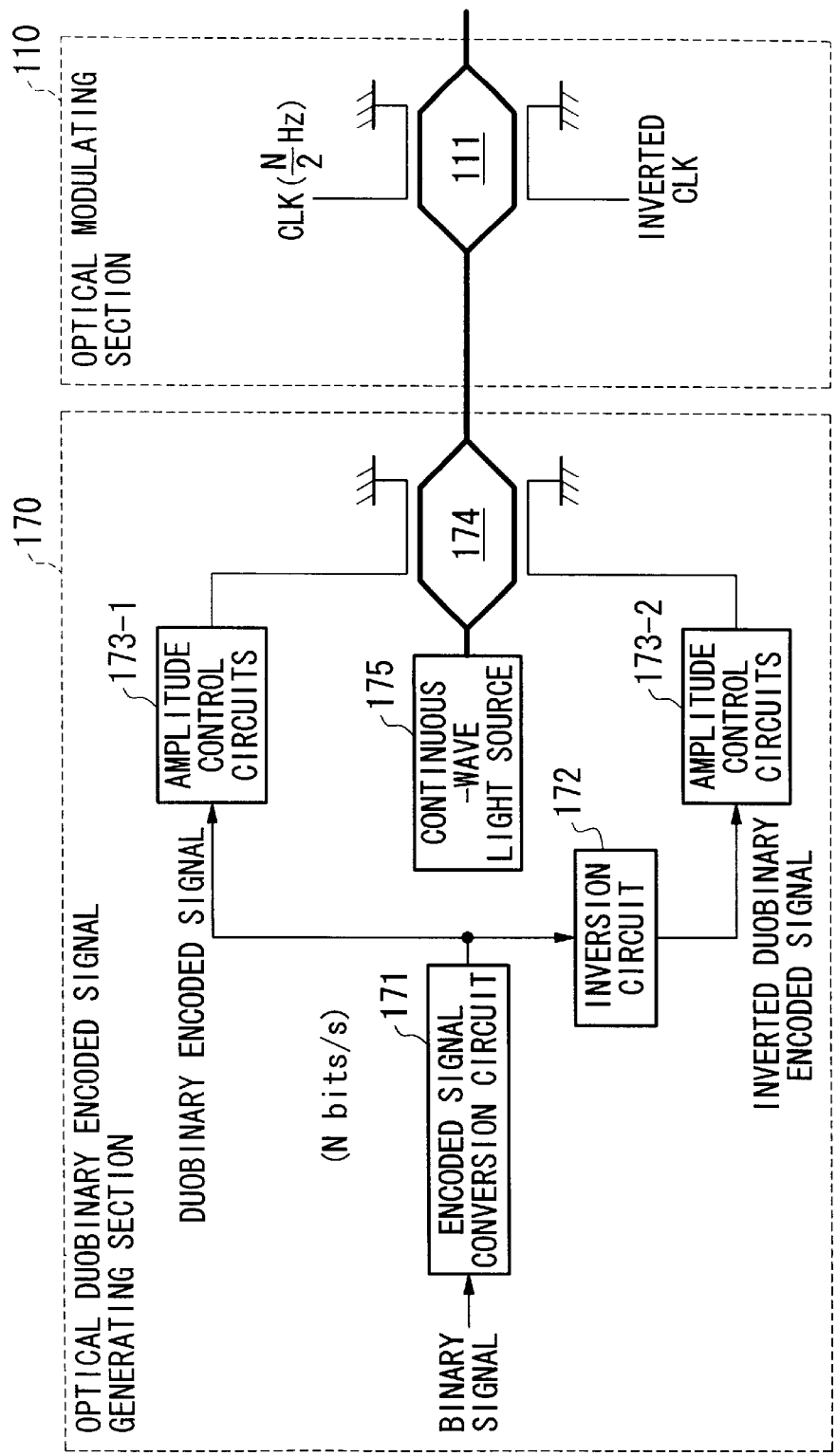

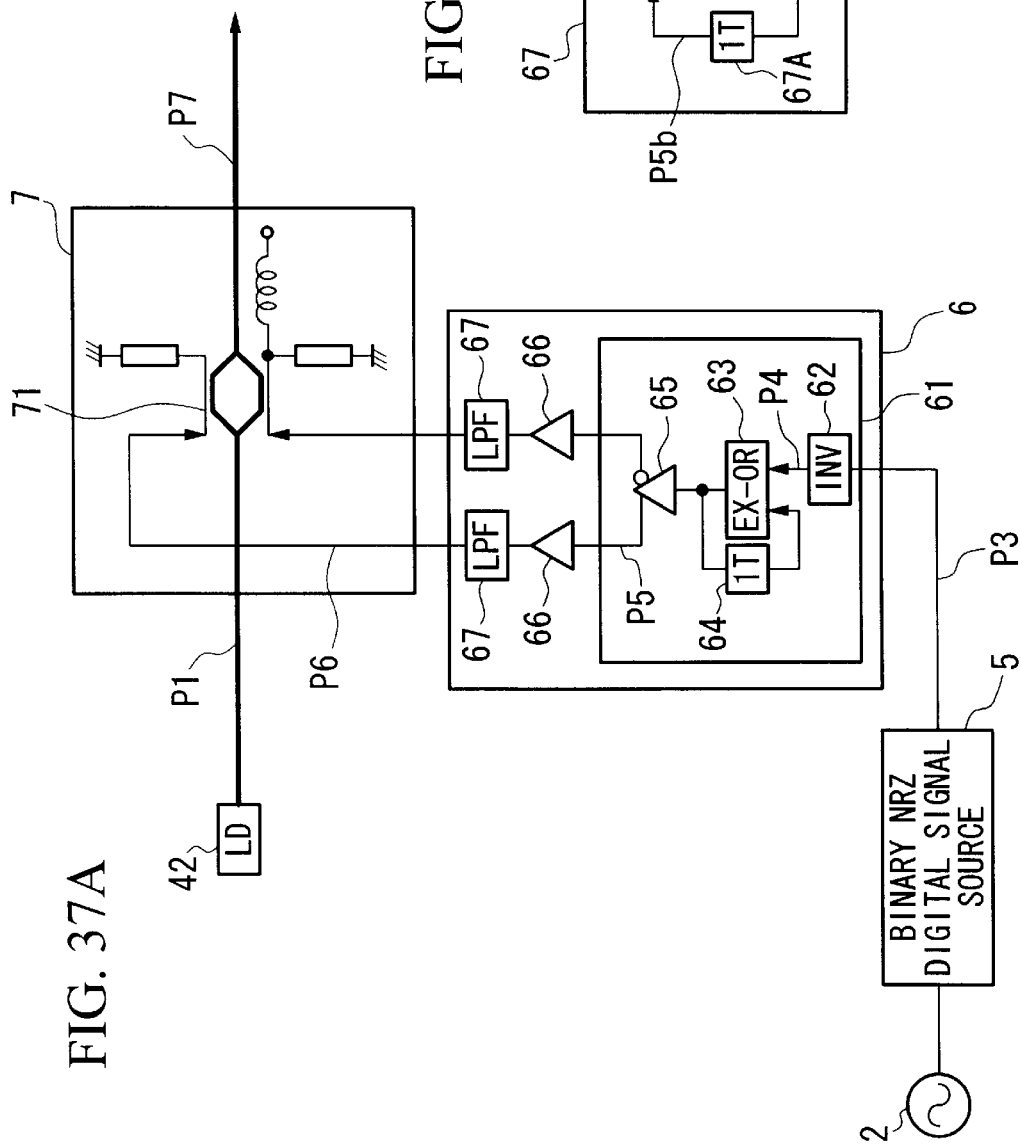

——— BINARY RZ MODULATED SIGNAL (PRESENT INVENTION)

------ OPTICAL DUOBINARY ENCODED SIGNAL

– – – NRZ ENCODED SIGNAL

—·— RZ ENCODED SIGNAL

OPTICAL TRANSMISSION METHOD, OPTICAL TRANSMITTER, OPTICAL RECEIVER, AND OPTICAL TRANSMISSION SYSTEM

BACKGROUND OF THE INVENTION

1. Field of the Invention

The present invention relates to a system and method of transmitting an optical signal of a single wavelength or a wavelength-division multiplexed optical signal, and in particular, to a technique which is effectively applied to an optical transmission system for modulating an optical signal by using a partial response encoded signal. The present invention also relates to an optical transmission system for suppressing the degradation of the transmitting quality due to chromatic dispersion of a transmission medium such as an optical fiber, or to interaction between the chromatic dispersion and the nonlinear optical effects in the transmission medium. The present invention also relates to an optical transmitter and optical receiver which constitute the optical transmission system.

2. Description of the Related Art

In conventional optical fiber transmission systems, various kinds of encoded signals for modulation have been proposed for improving tolerance with respect to waveform distortion due to chromatic dispersion of a relevant optical fiber, and for reducing the wavelength distortion due to the nonlinear optical effects occurring in a relevant optical fiber transmission path.

As a disclosed technique for improving chromatic dispersion tolerance, Reference 1 (K. Yonenaga et al., "Dispersion-Tolerant Optical Transmission System Using Duobinary Transmitter and Binary Receiver", Journal of Lightwave Technology, LT-15, (8), pp. 1530–1537, 1997) discloses an optical duobinary modulating means which has a push-pull type Mach-Zehnder optical intensity modulator (called "MZ optical intensity modulator") and which uses a duobinary encoded signal as a modulated signal, where the duobinary encoded signal is a three-level partial response encoded signal.

The transmitter of a conventional optical transmission system (see FIG. 37A) includes a duobinary encoding section (electric partial response encoding section) 6 for receiving a binary NRZ (non-return-to-zero) encoded signal supplied from a binary NRZ digital signal source which is in synchronism with a system clock source 2, and for outputting an electric duobinary encoded signal.

A binary NRZ encoded signal P3 (see FIG. 38A) generated by the binary NRZ digital signal source 5 is logically inverted in a logical inversion circuit 62 in the electric partial response encoding section 6 into an inverted NRZ encoded signal P4 (see FIG. 38B). This logically inverted encoded signal is converted by a pre-coder 61 having an exclusive OR (EX-OR) circuit 63 and a 1-bit delay circuit 64 (i.e., a 1-time slot delay for data having a transmission speed (or rate) B (refer to FIG. 39C)). After that, a binary NRZ pre-coder output signal P5 (see FIG. 38C) is differentially output by a differential converter 65.

The above binary NRZ pre-coder output signal P5 is amplified in an amplifying circuit 66, and then input into a low-pass filter (LPF) 67 whose 3 dB bandwidth is B/4, thereby obtaining a three-level complementary duobinary encoded signal P6 (see FIG. 38E). An equivalent circuit of LPF 67 is a pre-coder consisting of a 1-bit delay circuit 67A and an adder 67B (see FIG. 37B), so that it is obvious that signal P6 is equal to the sum of a binary NRZ pre-coder output signal P5a and a 1-bit delayed binary NRZ pre-coder output signal P5b (see FIGS. 38C and 38D).

In an optical modulating section 7, a push-pull type MZ optical intensity modulator 71 modulates a single mode optical signal P1 (see FIG. 39A), output from a continuous wave (CW) laser source 42, according to the three-level complementary duobinary encoded signal P6, and is converted into an optical duobinary encoded signal P7 (see FIG. 39B).

The above Reference 1 shows a structure, as shown in FIG. 37A, by which the chromatic dispersion tolerance can be twice as much as that of generally known NRZ encoded signals.

Another Reference 2 (A. Matsuura et al., "High-Speed Transmission System Based on Optical Modified Duobinary encoded signals", Electronics Letters, Vol. 35, No. 9, pp. 1–2, 1999) discloses an optical partial response modulating means suitable for a system using a modified duobinary encoded signal as a modulated signal, which is also a three-level partial response encoded signal. In the relevant system, the chromatic dispersion tolerance is also increased to twice as much as that related to general NRZ encoded signals.

In order to reduce an undesirable effect of waveform distortion due to the nonlinear optical effects, a method using an RZ (return-to-zero) encoded signal having a fixed pulse width is effective. Reference 3 (K. Sato et al., "Frequency Range Extension of Actively Mode-Locked Lasers Integrated with Electroabsorption Modulators Using Chirped Grating", Journal of Selected Topics in Quantum Electronics, Vol. 3, No. 2, pp. 250–255, 1997) discloses a relevant technique using a mode-locked laser, Reference 4 (M. Suzuki et al., "New Application of Sinusoidal Driven InGaAsP Electroabsorption Modulator to In-Line Optical Gate with ASE Noise Reduction Effect, Journal of Lightwave Technology, Vol. 10, pp. 1912–1928, 1992) discloses a relevant technique using an absorption-type semiconductor modulator, and Reference 5 (K. Iwatsuki et al., "Generation of Transform Limited Gain-Switched DFB-LD Pulses<6 ps with Linear Fiber Compression and Spectral Window", Electronics Letters, Vol. 27, pp. 1981–1982, 1991) discloses a relevant technique using gain switching of a semiconductor laser.

None of the above References 3 to 5 discloses a data conversion encoded signal of an RZ pulse sequence.

As an example of a dual-mode beat pulse sequence generating means, Reference 6 (D. Wake et al., "Optical Generation of Millimeter-Wave Signals for Fiber-Radio Systems Using a Dual-Mode DFB Semiconductor Laser", IEEE Transactions on Microwave Theory and Techniques, Vol. 43, pp. 2270–2276, 1995) discloses a technique for generating a dual-mode beat pulse signal by synchronizing two single-longitudinal-mode laser sources, Reference 7 (K. Sato et al., "Dual-Mode Operation of 60-GHz Mode-Locked Semiconductor Lasers", Proceedings of the 1999 IEICE (Institute of Electronics, Information and Communication Engineers) Electronics Society Conference, C-4–8, p. 235, 1999) discloses a technique for generating a dual-mode beat pulse signal by using a mode-locked semiconductor laser, and Reference 8 (Y. Miyamoto et al., "320 Gbits/s (8×40 Gbits/s) WDM Transmission over 367 km with 120 km Repeater Spacing Using Carrier-Suppressed Return-to-Zero Format", Electronics Letters, Vol. 35, No. 23, pp. 2041–2042, 1999) discloses a technique for generating a dual-mode beat pulse signal by using an LN ($LiNbO_3$) MZ modulator.

Neither of the above References 6 and 7 discloses usage of a baseband signal as a modulated signal, and the above Reference 8 discloses usage of an NRZ encoded signal in synchronism with beat frequency B.

However, in the above-described conventional technique, when a binary optical partial response modulated signal such as an optical duobinary encoded signal or optical modified duobinary encoded signal is used, the same codes may successively appear (such as a sequence having a pattern of "1, 1, . . . 1") in an optical modulated signal which is dependent on the pattern of an input binary NRZ encoded signal. In this case, the pulse width of the optical modulated signal is not constant. Therefore, if the optical input power increases, marked waveform distortion appears due to interaction between the self phase-modulation effect and the chromatic dispersion, and thus the tolerance characteristics of the chromatic dispersion are degraded.

On the other hand, in order to equalize or balance the chromatic dispersion in an optical transmission path, it is easy to provide a dispersive medium, which has dispersive characteristics opposite to those of the transmission path, in a receiver or an inline optical amplifying repeater, and to compensate the dispersion so as to have a total dispersion (value) D of 0. This condition is also preferable for the measurement of dispersion in the optical fiber transmission path.

However, in the conventional binary optical partial response modulated signal, the optimum total dispersion D is generally shifted to an anomalous dispersion (D>0) region. Therefore, if dispersion compensation is performed under the simple condition of "D=0", considerable intersymbol interference due to the chromatic dispersion may occur between the encoded signals in the receiver because the optimum value of the dispersion compensation is shifted from that point. Accordingly, the receiving sensitivity is degraded.

Additionally, in the conventional binary optical partial response modulated signal, the initial intersymbol interference between the encoded bits in the modulated waveform is larger than that of generally known NRZ encoded signals; therefore, the receiving sensitivity tends to be degraded in a binary receiving circuit which is also applied to the NRZ encoded signals.

If a conventional optical pulse sequence having a constant pulse width is modulated using a partial response encoded signal so as to prevent waveform degradation due to the nonlinear optical effects or to prevent the intersymbol interference between encoded signals of initial modulated waveforms, then the chromatic dispersion tolerance with respect to the partial response encoded signal is considerably degraded.

Furthermore, in the conventional RZ modulation method (refer to the above References 4 to 6), the phases of each optical pulse are the same as shown in FIG. 40A (the temporal waveform of an RZ encoded signal is shown in FIG. 41A). Therefore, in the Fourier transform of a conventional optical pulse sequence signal, modes of clock components are generated at points away from the carrier ($f_0$) component by B (transmission speed), as shown in FIG. 40B. When each of the three modes is modulated by a general NRZ encoded signal having a bandwidth of 2B, the total bandwidth is 4B as shown in FIG. 41B.

That is, the band occupied by the optically modulated spectrum of a pulse sequence is wide such as 3B to 4B or more (B is the transmission speed). Therefore, the effect of the chromatic dispersion or a dispersion slope cannot be ignored, so that the transmittable distance may be limited if the transmission speed is increased.

In addition, in a wavelength-division multiplexed system, if the band occupied by the optically modulated spectrum is wide, the number of wavelength channels which can be multiplexed in a specific optical gain band of an optical amplifier, used in the wavelength-division multiplexed system, is decreased and the signal spectrum efficiency is degraded. Therefore, the total transmission capacity of the wavelength-division multiplexed system is reduced.

In addition, in the technique of generating the dual-mode beat pulse disclosed in the above Reference 7, it is difficult to synchronize the optical frequencies of two longitudinal modes, so that the stability is inferior. The above Reference 8 also discloses a dual-mode beat pulse signal; however, the disclosed modulated data signal is a conventional NRZ encoded signal, and each line spectrum in the optical spectrum is preset at intervals corresponding to the transmission speed B. As a result, if the input power into an optical fiber exceeds the threshold of the stimulated Brillouin scattering (a few mW at a wavelength of 1.5 $\mu$m in a single-mode silica fiber), the signal is backward-scattered to the input side by the stimulated Brillouin scattering, so that the input power from a transmitter into the optical fiber (i.e., optical fiber transmission path) is considerably limited. In order to solve this problem, an additional circuit for enlarging the line width of the optical carrier signal, or the like, is necessary in conventional systems.

In other words, the degradation of the transmission quality in such an optical transmission system is caused by an effect of the group velocity dispersion of each optical fiber in the bandwidth of an optical signal. According to such an effect, the waveform of the optical pulse is deformed and interference between adjacent time slots may occur.

In order to suppress such degradation due to the group velocity dispersion, an optical duobinary transmission method using an optical transmission system as shown in FIG. 42 has been proposed (refer to Japanese Unexamined Patent Application, First Publication No. Hei 9-236781).

In FIG. 42, a binary data signal (i.e., binary signal) is input into an encoded signal conversion circuit 171 and is converted into a three-level duobinary encoded signal. This duobinary encoded signal is divided into two portions, and one of them is logically-inverted in an inversion circuit 172; then the band thereof is limited by amplitude control circuits 173-1 and 173-2, so that the signal is used for push-pull-driving a dual-electrode MZ optical intensity modulator 174 whose transmittance is biased to the minimum value.

The optical intensity of a continuous-wave signal output from a continuous-wave light source 175 is modulated according to the above duobinary encoded signals having opposite phases, and this intensity-modulated signal, that is, the optical duobinary encoded signal, is output into an optical transmission medium 103.

The optical duobinary encoded signal transmitted through the optical transmission medium 103 is directly detected by an optical detection circuit 181, and the detected signal is identified by a decision circuit 182. The logic of the signal output from the decision circuit 182 is inverted in an inversion circuit 183, thereby reproducing a binary data signal.

In the above optical duobinary transmission system, a high chromatic dispersion tolerance of the optical fiber can be obtained (refer to K. Yonenaga et al., "Optical Duobinary Transmission System with No Receiver Sensitivity Degradation", Electronics Letters, Vol. 31, No. 4, pp. 302–304, 1995).

However, if the intensity of light incident on an optical fiber transmission path (i.e., fiber input (or launched) power) is increased in the relevant conventional structure, the dispersion tolerance is degraded. FIG. 43 shows results of a computer simulation of the dispersion tolerance of each of the optical duobinary transmission methods, and generally known methods using NRZ and RZ encoded signals. The common condition is to transmit the signal through 2 spans of 100 km of a single mode fiber having a local dispersion of +2 ps/nm/km via an optical amplifier, and the graph shows contour lines when each eye opening is degraded by 1 dB. Here, the graph also shows the dispersion tolerance of the present invention explained below.

In FIG. 43, at 0 dBm of the fiber input power, the dispersion tolerance in the method using the NRZ encoded signal is approximately twice as much as that of the method using the RZ encoded signal, while the dispersion tolerance in the method using the optical duobinary encoded signal is approximately four times as much as that of the method using the NRZ encoded signal. Here, the optimum dispersion is approximately 0 ps/nm.

However, when the intensity of light incident on the optical fiber transmission path is increased, the dispersion tolerance of the optical duobinary transmission method is degraded, and in particular, the total dispersion, which is optimum in a low-power region, is considerably degraded in the vicinity of 0 ps/nm. When the fiber input power exceeds 5 dBm, the amount or degree of degradation of the eye opening may exceed 1 dB.

On the other hand, in the methods using the NRZ and RZ encoded signals, the optimum dispersion is shifted towards the positive dispersion side according to the increase of the fiber input power, and the point of 0 ps/nm, which is the optimum point under the low power condition such as 0 dBm, is positioned near an end in the dispersion tolerance width (or margin), and the tolerance margin is considerably decreased if the incident optical power is further increased. This is because a frequency chirp is added to the optical signal due to the nonlinear optical effects in the optical fiber, Additionally, the dispersion tolerance itself is very small such as ¼ or ⅛ in comparison with the optical duobinary transmission method; thus, the system design itself is difficult and system optimization is also difficult when the system is introduced into practical use.

As explained above, in the transmission methods using the optical duobinary, NRZ, and RZ encoded signals, the optimum point of dispersion tolerance shifts with respect to a wide fiber input power range. This makes the system design complicated and disturbs the speedy introduction and stable operation of the system. That is, in the design of the optical transmission system, it is necessary to consider the optimum dispersion which varies depending on the fiber input power, and thus the design is complicated.

Additionally, when the optical transmission system is installed, the dispersion of the optical fiber transmission path is measured using a dispersion measurement device, and an optimum dispersion (generally, 0 ps/nm, but a slightly shifted value if the transmitted signal is chirped) is defined so as to establish the system. However, only the dispersion of the optical fiber can be acquired in the above measurement of dispersion; thus, it is difficult to follow the variation of the optimum dispersion specific to each transmission system which employs a specific encoded signal. In other words, in the conventional methods, the effective dynamic range of the incident light is small. Therefore, in the optical transmission system employing a conventional method, the bit rate or transmission distance must be limited.

Also as explained above, in each of the transmission methods using the optical duobinary, NRZ, and RZ encoded signals, the dispersion tolerance is considerably degraded according to an increase of the fiber input power. This prevents the stable operation of the optical transmission system.

SUMMARY OF THE INVENTION

In consideration of the above circumstances, the present invention relates to an optical transmission system using a partial response encoded signal, and an objective of the present invention is to provide a technique for improving the wavelength tolerance, compensating the dispersion in a simple way, and reducing the limitation of the fiber input power.

Another objective of the present invention is to maintain a stable dispersion tolerance within a wide range of the fiber input power, to make the design of the optical transmission system easy, to realize speedy installation of the optical transmission system, and to provide an optical transmitter and an optical receiver which constitute the above optical transmission system.

The above and other objectives and distinctive features of the present invention will be clearly shown by the following description and the appended drawings.

Therefore, the present invention provides an optical transmission method for modulating an optical signal having longitudinal modes based on a partial response encoded signal and outputting the modulated signal, comprising the steps of:

receiving a clock signal from a system clock source;

modulating a single mode optical signal based on the clock signal and generating an optical pulse signal having two longitudinal modes, the frequency interval between the two modes being n×B, where n is a natural number and B is a transmission speed;

generating a partial response encoded signal by converting a binary NRZ encoded signal output from a digital signal source in synchronism with the system clock source; and modulating the optical pulse signal having two longitudinal modes based on the partial response encoded signal, and outputting a binary RZ modulated signal obtained by the modulation.

Preferably, the binary RZ modulated signal is output after higher harmonic components thereof are removed.

Typically, a duobinary encoded signal or a modified duobinary encoded signal is used as the partial response encoded signal.

The present invention also provides an optical transmitter comprising:

a system clock source for generating a clock signal;

a binary NRZ digital signal source for generating a binary NRZ digital signal in synchronism with the clock signal;

an electric partial response encoding section for receiving the binary NRZ digital signal and generating an electric partial response encoded signal;

a dual-mode beat optical pulse generating section for generating an optical pulse signal having two longitudinal modes, the frequency interval between the two modes being n×B, where n is a natural number, B is a transmission speed, and the generated optical pulse signal is in synchronism with the binary NRZ digital signal;

a pulse light source driving section for generating a signal for driving the dual-mode beat optical pulse generating section, by using a clock signal in synchronism with the clock signal generated by the system clock source; and an optical modulating section for modulating the optical pulse signal having two longitudinal modes based on the electric partial response encoded signal, and outputting a binary RZ modulated signal obtained by the modulation.

Typically, the dual-mode beat optical pulse generating section includes a Mach-Zehnder optical intensity modulator or a dual-mode oscillation mode-locked laser.

It is possible that the Mach-Zehnder optical intensity modulator is a push-pull type, and is driven by a clock signal which has a frequency of n×B/2 and has an amplitude equal to the half-wave voltage of the Mach-Zehnder optical intensity modulator.

Preferably, the dual-mode beat optical pulse generating section has an optical filter for removing higher harmonic components included in the optical pulse signal having two longitudinal modes.

In this case, an arrayed-waveguide grating filter may be used as the optical filter for wavelength-division multiplexing the generated signal.

The optical transmitter may further comprise an optical filtering section for removing higher harmonic components included in the optical signal modulated by the optical modulating section.

Typically, the above electric partial response encoded signal is a duobinary encoded signal, and the binary RZ modulated signal is a carrier-suppressed RZ optical duobinary encoded signal.

The present invention also provides an optical receiver comprising:

a band dividing section for receiving a binary RZ modulated signal transmitted from an optical transmitter as explained above, and dividing two partial response components included in the optical spectra of the received binary RZ modulated signal, and outputting one or both of the divided partial response components; and an optical receiving section for receiving one or both of the divided partial response components output from the band dividing section.

Typically, the two partial response components are optical duobinary components.

It is possible that the optical receiving section includes:

a photoelectric conversion section for converting the two partial response components into electric signals; and an adder for adding the electric signals so as to regenerate an original signal in the transmission.

It is also possible that the optical receiving section includes:

a photoelectric conversion section for converting the two partial response components into electric signals; and a subtracter for performing subtraction on the electric signals so as to regenerate an original signal in the transmission.

The optical receiving section may individually receive the two partial response components, and one of the components may be for backup use.

It is also possible that the optical receiving section monitors one of the optical intensities of the two partial response components, and controls the pass-band frequency of the band dividing section so as to satisfy the condition that the monitored optical power is a maximum.

It is also possible that the optical receiving section monitors both of the optical intensities of the two partial response components, and controls the pass-band frequency of the band dividing section so as to satisfy the conditions that the sum of the two monitored optical powers is a maximum while the difference of the two monitored optical powers is a minimum.

The band dividing section may output only one of the two partial response components, and may have crosstalk characteristics in which a suppression ratio of the output component to the non-output component is 20 dB or more.

The present invention also provides an optical transmission system comprising an optical transmitter as explained above, and an optical receiver as explained above, which are connected via an optical transmission medium.

The present invention also provides an optical transmission system comprising:

a plurality of optical transmitters as explained above, for generating binary RZ modulated signals having different wavelengths;

an optical wavelength-division multiplexing section for wavelength-division multiplexing the binary RZ modulated signals having different wavelengths, and outputting the wavelength-division-multiplexed binary RZ modulated signal;

an optical transmission medium for transmitting the wavelength-division-multiplexed binary RZ modulated signal;

an optical wavelength-division demultiplexing section for receiving the wavelength-division-multiplexed binary RZ modulated signal transmitted via the optical transmission medium, and wavelength-division demultiplexing the received signal into binary RZ modulated signals having different wavelengths; and a plurality of optical receivers as explained above, for respectively receiving the binary RZ modulated signals having different wavelengths.

The present invention also provides an optical transmitter comprising:

a plurality of optical transmitters as explained above, for generating binary RZ modulated signals having different wavelengths; and an optical wavelength-division multiplexing section for wavelength-division multiplexing the binary RZ modulated signals having different wavelengths, and outputting the wavelength-division-multiplexed binary RZ modulated signal.

The present invention also provides an optical receiver comprising:

an optical wavelength-division demultiplexing section for receiving a wavelength-division-multiplexed binary RZ modulated signal output from an optical transmitter as explained above, and wavelength-division demultiplexing the received signal into binary RZ modulated signals having different wavelengths; and a plurality of optical receivers as explained above, for respectively receiving the binary RZ modulated signals having different wavelengths.

The optical wavelength-division multiplexing section may have an optical filter for removing higher harmonic components included in the binary RZ modulated signals having different wavelengths.

According to the present invention, the optical signal having two longitudinal modes (i.e., the dual-mode beat pulse optical signal) with a frequency interval of n×B (n is a natural number and B is a transmission speed) is used as an optical carrier signal which is to be modulated, instead of a conventional continuous-wave optical signal having a single longitudinal mode. Therefore, the initial interference between the encoded signals in the modulated waveform can be improved in comparison with generally-known optical partial response encoded signals, and thus the (receiving) sensitivity can be improved.

In addition, even when the fiber input power is high, transmission can be performed without considerably degrading the chromatic dispersion tolerance characteristics, thereby easily designing the equalization of the chromatic dispersion of the optical transmission path.

Furthermore, the limitation of the fiber input power of the optical fiber transmission path due to the stimulated Brillouin scattering can be reduced in comparison with conventional systems which use optical duobinary encoded signals.

Additionally, the carrier-suppressed RZ optical duobinary encoded signal transmitted through an optical transmission medium (such as an optical fiber) has an RZ-pulsed shape; thus, the waveform degradation caused by the nonlinear optical effects in the optical fiber can be reduced to a minimum level.

In the above band dividing section, the two partial response components of the binary RZ modulated signal are divided, and one or both of the divided components are individually extracted and output; thus, the band corresponding to the original partial response encoded signal is affected by the chromatic dispersion of the optical transmission medium. Therefore, the waveform degradation due to the chromatic dispersion of the optical transmission medium can be reduced to approximately ¼.

As shown in FIG. 43, according to the present invention, it is possible to provide an optical transmission system having (i) the widest dispersion tolerance in the practical range of the fiber input power, and (ii) a fixed optimum dispersion with respect to a variation in the practical range of the fiber input power. That is, the optical transmission system (having an optical transmitter and an optical receiver) according to the present invention has a sufficient tolerance with respect to the degradation of the transmitting quality due to the interaction between the nonlinear optical effects and the chromatic dispersion of the transmission medium. Accordingly, it is possible to construct an optical transmission system having a longer transmission path, a larger transmittable capacity, and much more reliability in comparison with conventional optical transmission systems using an optical duobinary encoded signal, NRZ encoded signal, RZ encoded signal, or the like.

BRIEF DESCRIPTION OF THE DRAWINGS

FIGS. 9A and 9B are block diagrams showing the general structure of the optical transmitter as a second example (Example 2).

FIGS. 10A and 10B are block diagrams showing the general structure of the optical transmitter as a third example (Example 3).

FIGS. 11A and 11B are block diagrams showing the general structure of the optical transmitter as a fourth example (Example 4).

FIGS. 17A and 17B are block diagrams showing the general structure of the optical transmitter as a sixth example (Example 6).

FIGS. 23A and 23B show example structures of the optical transmitter 101 in FIG. 22; FIG. 23A shows a first example, and FIG. 23B shows a second example.

FIGS. 37A and 37B are block diagrams showing the general structure of the optical transmitter of a conventional optical transmission system.

DESCRIPTION OF THE PREFERRED EMBODIMENTS

Figure 1:
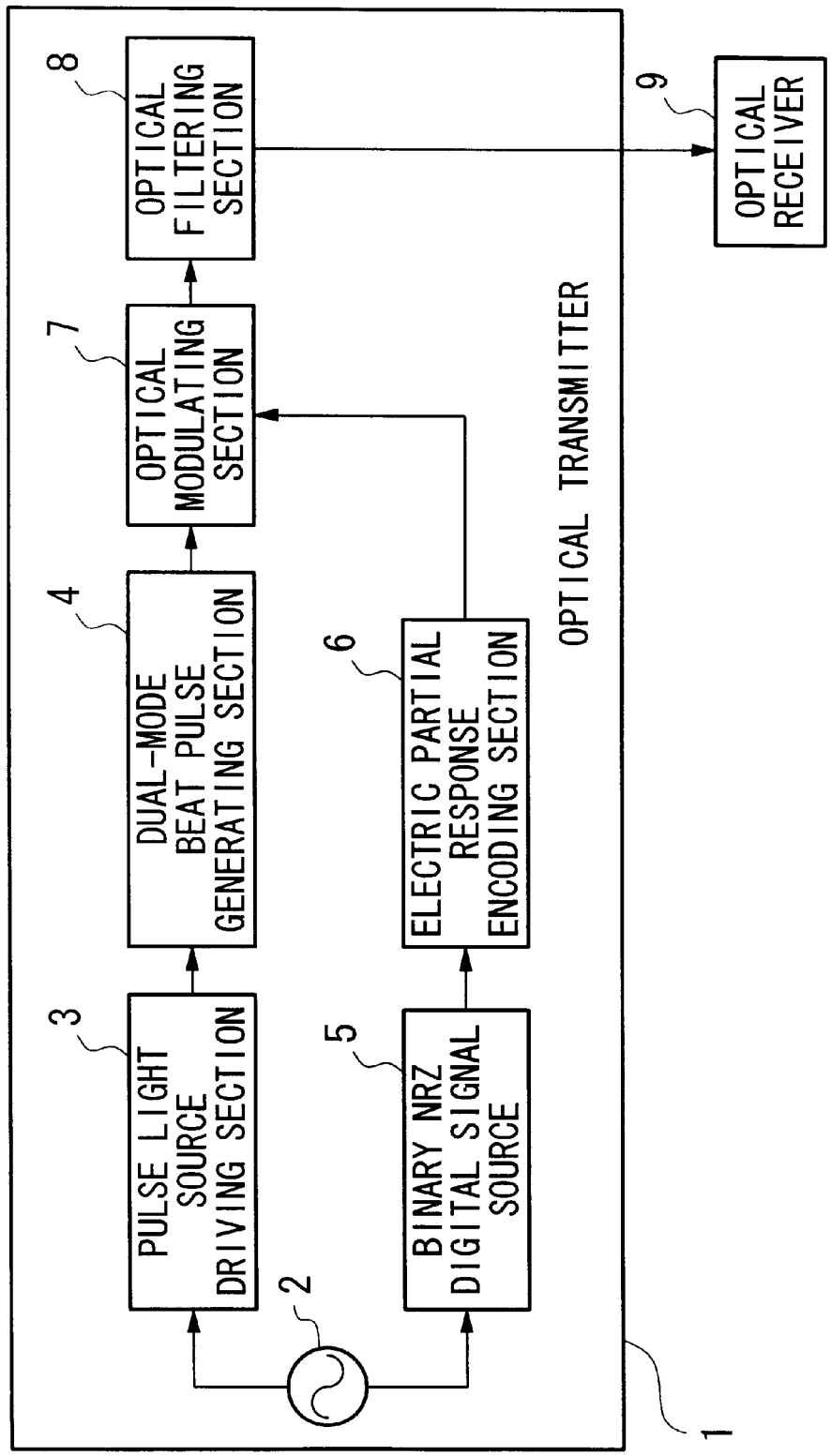
FIG. 1 is a block diagram showing the general structure of the optical transmission system as a first embodiment of the present invention.

Hereinafter, embodiments and specific examples according to the present invention will be explained in detail with reference to the drawings.

In all of the drawings for explaining each embodiment and example, portions having identical functions are given identical reference numerals, and relevant explanations thereof are not repeated.

First Embodiment

FIG. 1 is a block diagram showing the general structure of the optical transmission system as a first embodiment of the present invention. Reference numeral 1 indicates an optical transmitter, reference numeral 2 indicates a system clock source, reference numeral 3 indicates a pulse light source driving section, reference numeral 4 indicates a dual-mode beat pulse generating section, reference numeral 5 indicates a binary NRZ digital signal source, reference numeral 6 indicates an electric partial response encoding section, reference numeral 7 indicates an optical modulating section, reference numeral 8 indicates an optical filtering section, and reference numeral 9 indicates an optical receiver.

As shown in FIG. 1, the optical transmission system according to the present embodiment has the optical transmitter 1 for transmitting an optical signal modulated using an electric partial response encoded signal, and the optical receiver 9 for receiving the optical signal transmitted from the optical transmitter 1.

The pulse light source driving section 3 in the optical transmitter 1 receives a clock signal in synchronism with the system clock source 2 which is connected to the binary NRZ digital signal source 5, and generates and outputs a driving clock signal for driving the dual-mode beat pulse generating section 4.

The dual-mode beat pulse generating section 4 receives the above driving clock signal, and generates two longitudinal mode optical signals which are separated from each other by a transmission speed (or rate) B and outputs a dual-mode beat pulse signal in synchronism with the binary NRZ encoded signal generated by the binary NRZ digital signal source 5, where the repetition rate of the dual-mode beat pulse signal is "n×B" (n is a natural number, and B is the transmission speed).

In the electric partial response encoding section 6, the binary NRZ encoded signal generated in the binary NRZ digital signal source 5 is converted into an electric partial response encoded signal. In the optical modulating section 7, the dual-mode beat pulse signal input from the dual-mode beat pulse generating section 4 is modulated according to the electric partial response encoded signal, so as to generate a binary optical modulated signal.

The optical filtering section 8 removes only higher harmonics generated in the optical modulated spectra of the above dual-mode beat pulse signal. The optical filtering section 8 may also have a wavelength-division multiplexing function.

Below, examples of the structure and operation of the optical transmitter shown in FIG. 1 will be explained.

EXAMPLE 1

Figure 2B:
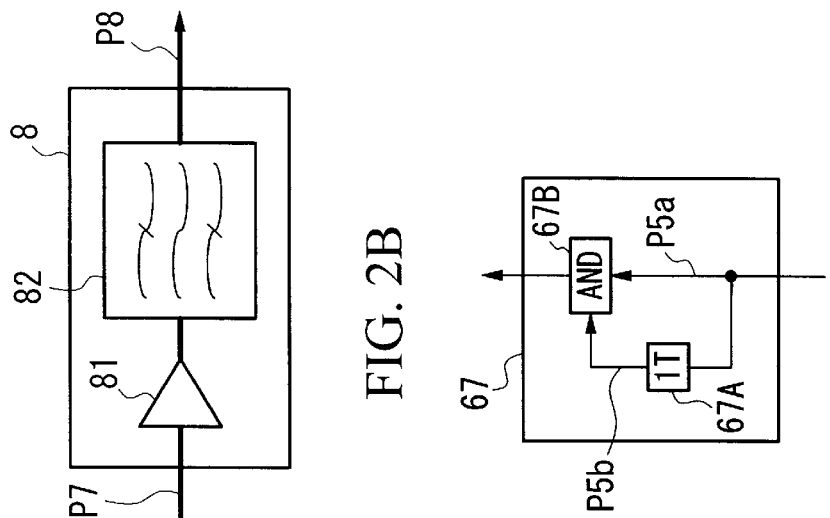
FIGS. 2A and 2B are block diagrams showing the general structure of the optical transmitter as a first example (Example 1).
Figure 2A:
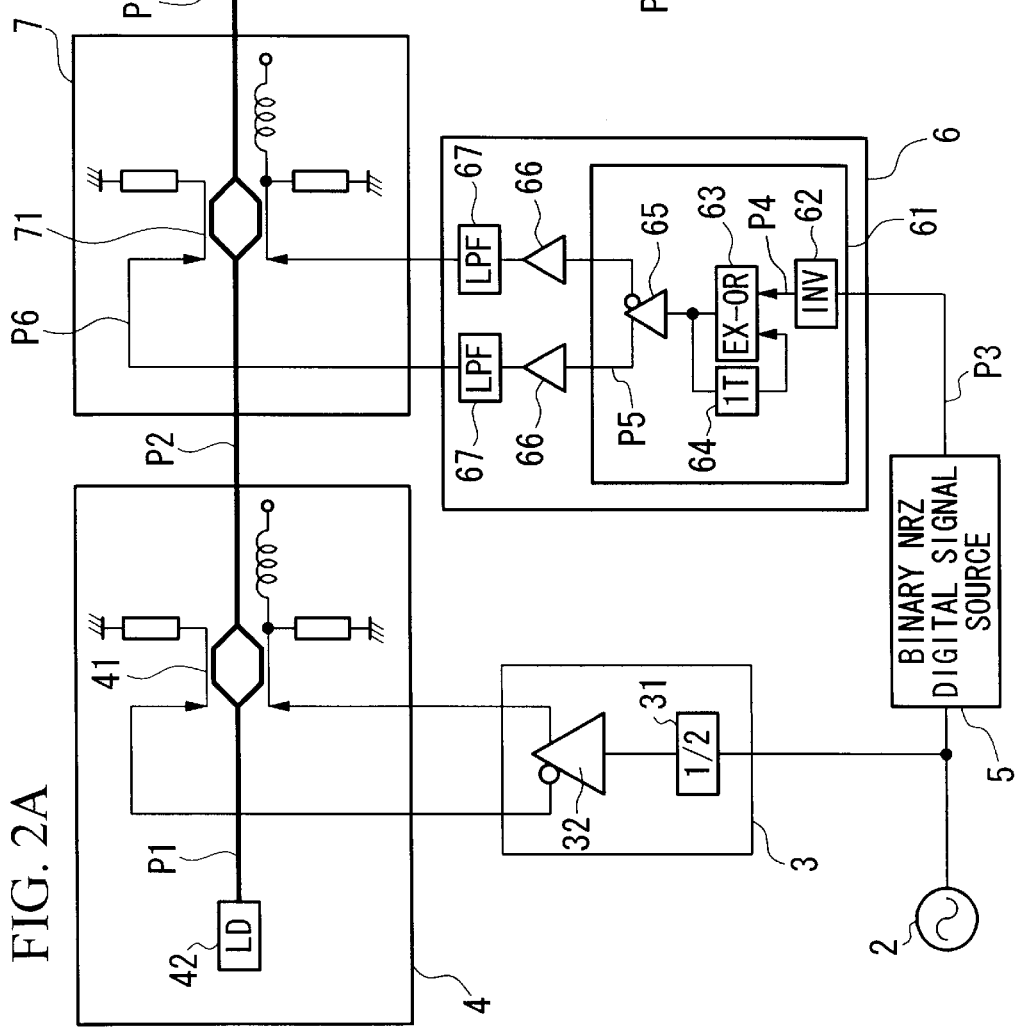

FIGS. 2A and 2B are block diagrams showing the general structure of the optical transmitter as a first example.

In the figures, reference numeral 2 indicates a system clock source, reference numeral 3 indicates a pulse light source driving section, reference numeral 31 indicates a ½ frequency-dividing circuit, and reference numeral 32 indicates a drive circuit.

Reference numeral 4 indicates a dual-mode beat pulse generating section, reference numeral 41 indicates an MZ (Mach-Zehnder) optical intensity modulator, and reference numeral 42 indicates a CW (continuous wave) laser (light) source.

Reference numeral 5 indicates a binary NRZ digital signal source, reference numeral 6 indicates an electric partial response encoding section, reference numeral 61 indicates a pre-coder, reference numeral 62 indicates a logical inversion circuit, reference numeral 63 indicates an exclusive OR (EX-OR) circuit, reference numeral 64 indicates a 1-bit delay circuit, reference numeral 65 indicates a differential converter, reference numeral 66 indicates an amplifying circuit, reference numeral 67 indicates a low-pass filter (LPF), reference numeral 67A indicates a 1-bit delay circuit, and reference numeral 67B indicates an adder (see FIG. 2B).

Reference numeral 7 indicates an optical modulating section, reference numeral 71 indicates an MZ optical intensity modulator, reference numeral 8 indicates an optical filtering section, reference numeral 81 indicates an optical amplifier, and reference numeral 82 indicates an optical band-pass filter.

Also in FIG. 2A, reference symbol P1 indicates a single mode optical signal, reference symbol P2 indicates a dual-mode beat pulse optical signal, reference symbol P3 indicates a binary NRZ encoded signal, reference symbol P4 indicates an inverted NRZ encoded signal, reference symbol P5 indicates a binary NRZ pre-coder differential output signal, reference symbol P6 indicates an electric duobinary encoded signal, and reference symbols P7 and P8 indicate binary RZ modulated signals according to the present invention.

FIGS. 3A to 6D are diagrams for explaining the operation of the optical transmitter (of Example 1) in the relevant optical transmission system. According to these figures, the operation of the optical transmitter (as shown in FIG. 2A) of Example 1 will be explained.

In the optical transmitter of Example 1, a duobinary encoded signal is used as the above-described electric partial response encoded signal, and the MZ optical intensity modulator 41 is used in the dual-mode beat pulse generating section 4, and the frequency interval between the two longitudinal modes is equal to the transmission speed B.

The clock signal of frequency B (corresponding to the transmission speed) generated in the system clock source 2 is input into the ½ frequency-dividing circuit 31 in the pulse light source driving section 3, so that a ½ frequency-divided signal having a frequency of B/2 is generated by the ½ frequency-dividing circuit 31. This ½ frequency-divided signal is amplified in the drive circuit 32 to an approximately half-wave voltage $V_\pi$ (the driving voltage necessary for changing the transmittance of the optical signal by 0 to 100%) of the MZ optical intensity modulator 41, and then is differentially output to the dual-mode beat pulse generating section 4.

In the dual-mode beat pulse generating section 4, a single mode optical signal P1 having an optical carrier frequency $f_0$ (refer to FIGS. 3A and 3B) generated in the CW laser source 42 is modulated by the MZ optical intensity modulator 41, according to the above ½ frequency-divided signal which is differentially output from the pulse light source driving section 3, where the MZ optical intensity modulator 41 is a push-pull type which is DC-biased so as to have "0" transmission characteristics (namely, transmission null point). Accordingly, a dual-mode beat pulse optical signal P2 having a frequency interval of B is generated (see FIGS. 3C, 3D, and 3E).

Figure 3A:
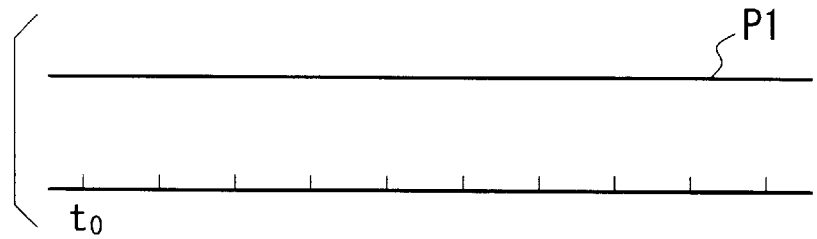
FIGS. 3A to 3E are diagrams for explaining the operation of the optical transmitter of Example 1.
Figure 3B:
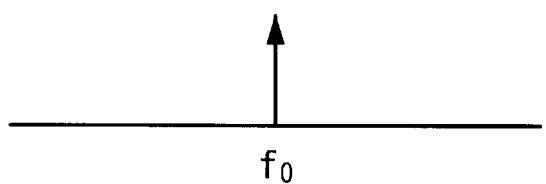
Figure 3C:
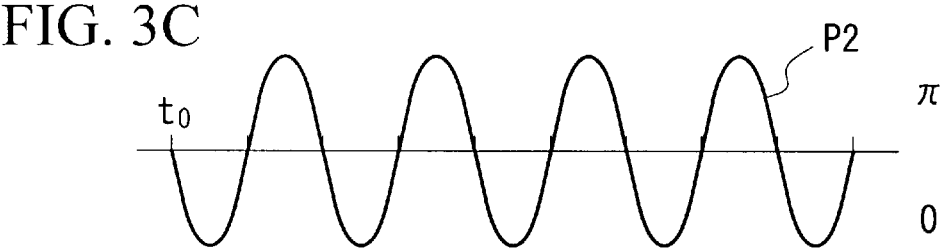
Figure 3D:
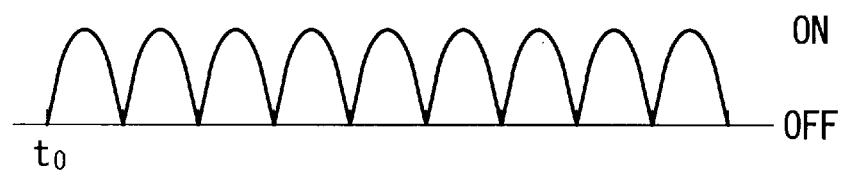
Figure 3E:
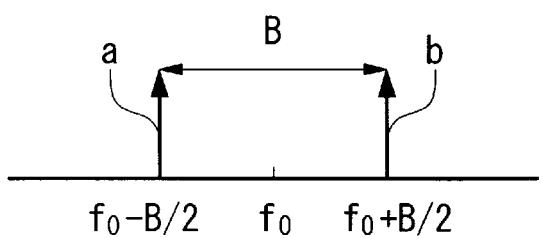

Here, FIG. 3C shows a temporal waveform of the dual-mode beat pulse optical signal P2, FIG. 3D shows a directly-detected waveform corresponding to FIG. 3C, and FIG. 3E shows relevant optical spectra. As shown in FIG. 3C, the dual-mode beat pulse optical signal P2 corresponds to an optical pulse sequence having a repetition frequency of B, where the optical phase is inverted by π for every bit. When a Fourier transform is applied to this signal, two longitudinal modes "a" and "b" having a frequency difference of B (i.e., corresponding to the transmission speed) are respectively generated at optical frequencies $f_0-B/2$ and $f_0+B/2$, as shown in FIG. 3E.

The electric partial response encoding section 6 functions as a duobinary encoding circuit, that is, receives a binary NRZ encoded signal from the binary NRZ digital signal source 5 in synchronism with the system clock source 2, and outputs an electric duobinary encoded signal.

Figure 4A:
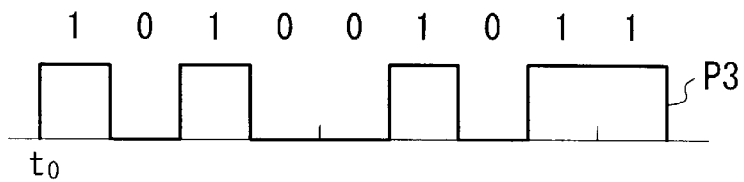
FIGS. 4A to 4E are diagrams for explaining the operation of the optical transmitter of Example 1.
Figure 4B:
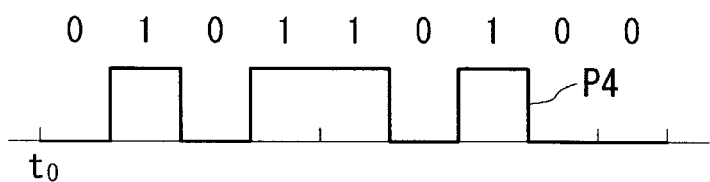

A binary NRZ encoded signal P3 (see FIG. 4A) input from the binary NRZ digital signal source 5 is logically inverted in the logical inversion circuit 62 (see the inverted NRZ encoded signal P4 shown in FIG. 4B). This inverted encoded signal is converted by a pre-coder 61 having an exclusive OR (EX-OR) circuit 63 and a 1-bit delay circuit 64 (i.e., a 1-time slot delay for data having a transmission speed B) into a binary NRZ pre-coder output signal. After that, a binary pre-coder output signal P5 (see FIG. 4C) is differentially output from the differential converter 65.

Figure 4C:
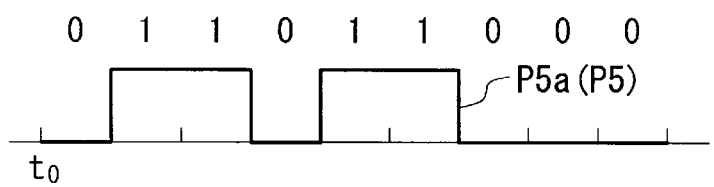
Figure 4D:
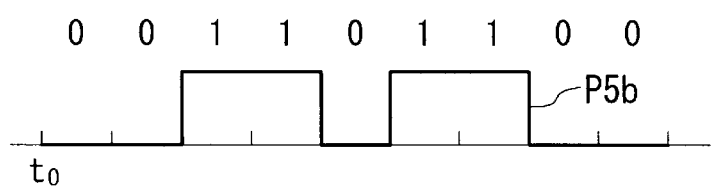
Figure 4E:
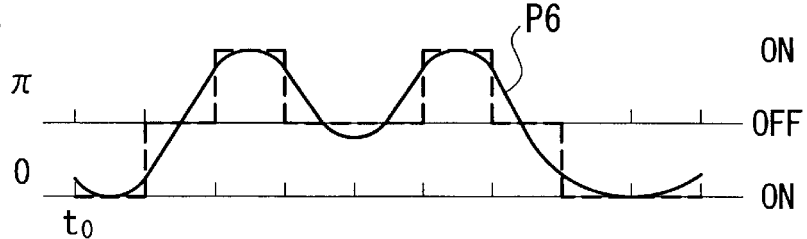

The binary pre-coder differential output signal PS output from the differential converter 65 is amplified by the amplifying circuit 66, and is then input into the LPF 67 having a 3 dB band of B/4, so that a three-level complementary electric duobinary encoded signal P6 is obtained (see FIG. 4E).

A logically equivalent circuit of LPF 67 is a pre-coder consisting of a 1-bit delay circuit 67A and an adder 67B (see FIG. 2B), so that it is obvious that the signal P6 is equal to the sum of a binary NRZ pre-coder output signal P5a and a 1-bit delayed binary NRZ pre-coder output signal P5b (see FIGS. 4C and 4D).

Figure 5A:
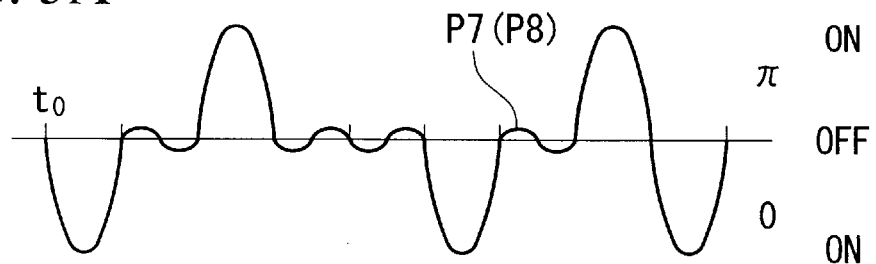
FIGS. 5A to 5C are diagrams for explaining the operation of the optical transmitter of Example 1.

In the optical modulating section 7, the above dual-mode beat pulse optical signal P2 is modulated by the push-pull type MZ optical intensity modulator 71 according to the three-level complementary electric duobinary encoded signal P6, thereby obtaining a binary RZ modulated signal P7 (see FIG. 5A).

Figure 5B:
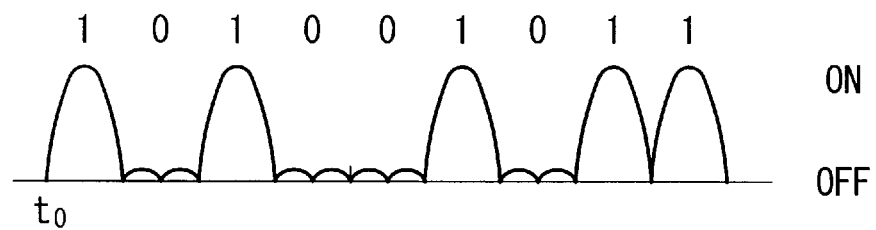
Figure 5C:
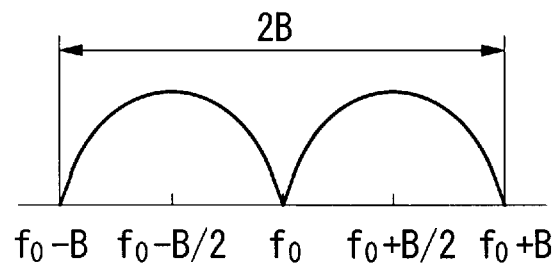

The above two longitudinal modes generated by the dual-mode beat pulse generating section 4 are each duobinary-modulated in the optical modulating section 7, so that the line spectra at optical frequencies $f_0-B/2$ and $f_0+B/2$ as shown in FIG. 3E disappear, and the two optical duobinary encoded signal spectra, each having a frequency band of B, are generated around two center points of $f_0-B/2$ and $f_0+B/2$, as shown in FIG. 5C. Therefore, the total signal bandwidth is 2B. When this signal is temporally observed, the two optical duobinary encoded signals interfere with each other, and thus an RZ waveform as shown in FIG. 5A is formed. FIG. 5B is a corresponding directly-detected waveform.

Different from the present Example 1, the optical phases of the conventional optical pulse signals (as shown in FIGS. 40A to 41B) are the same. Therefore, in the Fourier transform of such a conventional optical pulse sequence signal, modes corresponding to clock components are generated at points away from the carrier ($f_0$) component by B (transmission speed). When the three modes shown are modulated using a general NRZ encoded signal, each mode is modulated by an NRZ encoded signal having a bandwidth of 2B, so that the total bandwidth is 4B.

Therefore, the band occupied by the optically modulated spectra of the RZ encoded signal generated by the optical transmitter of the present Example 1 can be halved in comparison with the conventional RZ encoded signal.

Additionally, as is obviously understood from FIG. 5A, the temporal waveform of the binary RZ modulated signal P7 corresponds to an RZ encoded signal in which the electric field strength (i.e., light intensity) becomes 0 at regular intervals of each time slot. In the present Example 1, the two longitudinal modes "a" and "b" as shown in FIG. 3E are each optical-duobinary-modulated, so that the line spectra at optical frequencies $f_0-B/2$ and $f_0+B/2$ as shown in FIG. 3E disappear, and no line spectrum having a high spectral density is present in the optically modulated spectra. Accordingly, under the same conditions of the average (optical) fiber input (or launched) power, the binary RZ modulated signal of the present example has ½ the spectral density in comparison with that of the conventional optical duobinary encoded signal; thus, the allowable fiber input power with respect to the effect of the stimulated Brillouin scattering can be improved by 3 dB.

Figure 6A:
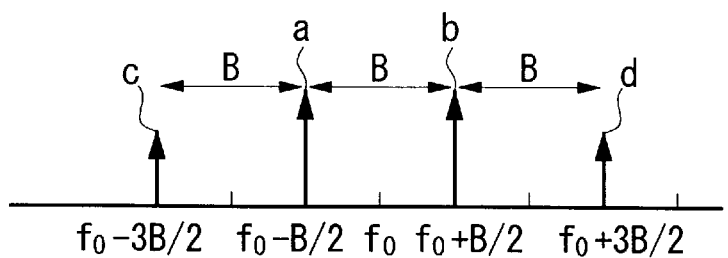
FIGS. 6A to 6D are diagrams for explaining the operation of the optical transmitter of Example 1.
Figure 6B:
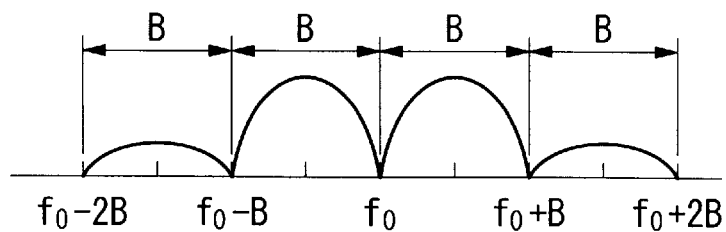
Figure 6C:
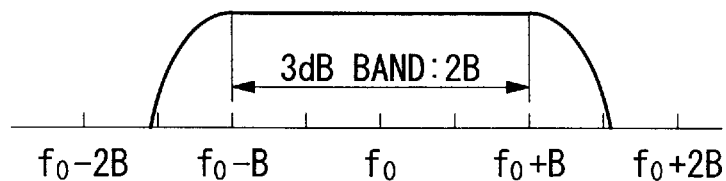
Figure 6D:
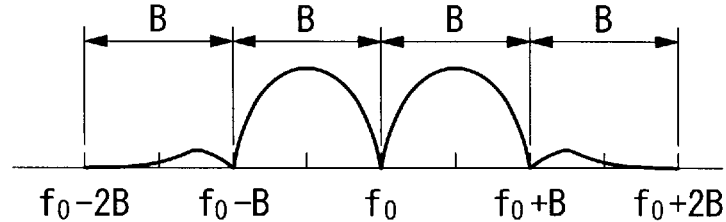

When the MZ optical intensity modulator is used, the percentage of modulation is typically set to 100% or the like and each driving amplitude is set equal to the half-wave voltage, so as to obtain the necessary output power of the MZ optical intensity modulator 71. In this case, according to the non-linear response characteristics of the MZ optical intensity modulator, higher harmonics may be included in the dual-mode beat pulse optical signal P2, as shown in FIGS. 6A and 6B. Such higher harmonics can be removed (see FIG. 6D) by using an optical band-pass filter 82 having the transmittance characteristics with respect to the center optical frequency $f_0$ as shown in FIG. 6C.

In addition to the provision of the optical amplifier 81 for amplifying the output from the optical modulating section 7, the above-explained optical band-pass filter 82 may be provided (i) at the output port of the optical modulating section 7, and/or (ii) between the output port of the dual-mode beat pulse generating section 4 and the input port of the optical modulating section 7.

Figure 7:
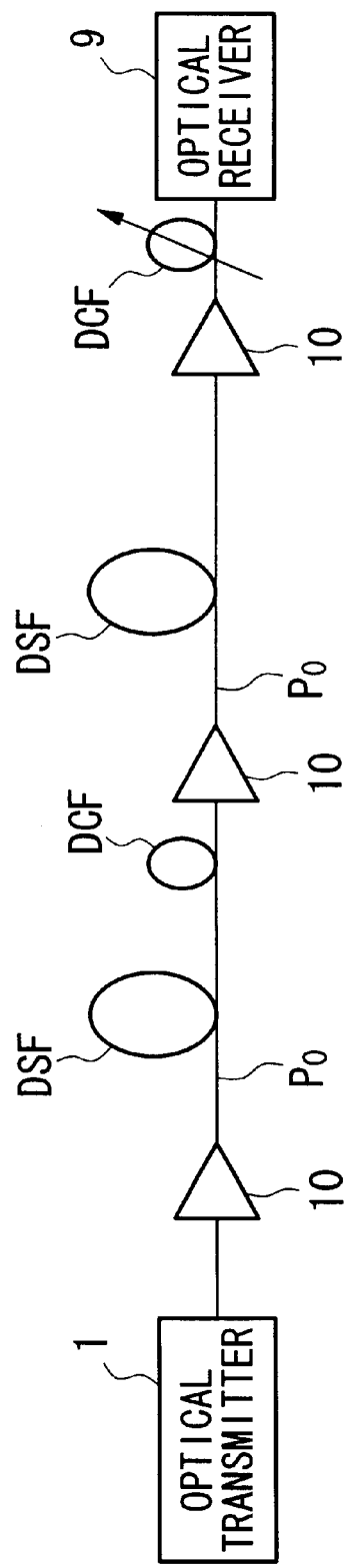
FIG. 7 is a block diagram showing the structure used for a computer simulation for explaining the function and effect of the optical transmission system related to Example 1.
Figure 8A:
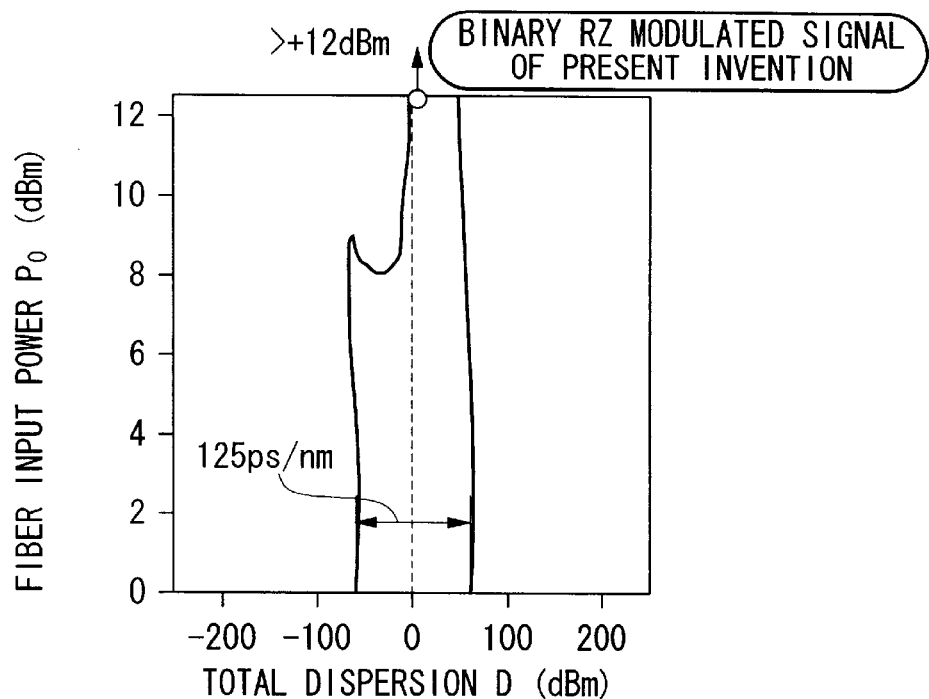
FIGS. 8A to 8D are diagrams for explaining the function and effect of the optical transmission system related to Example 1.
Figure 8B:
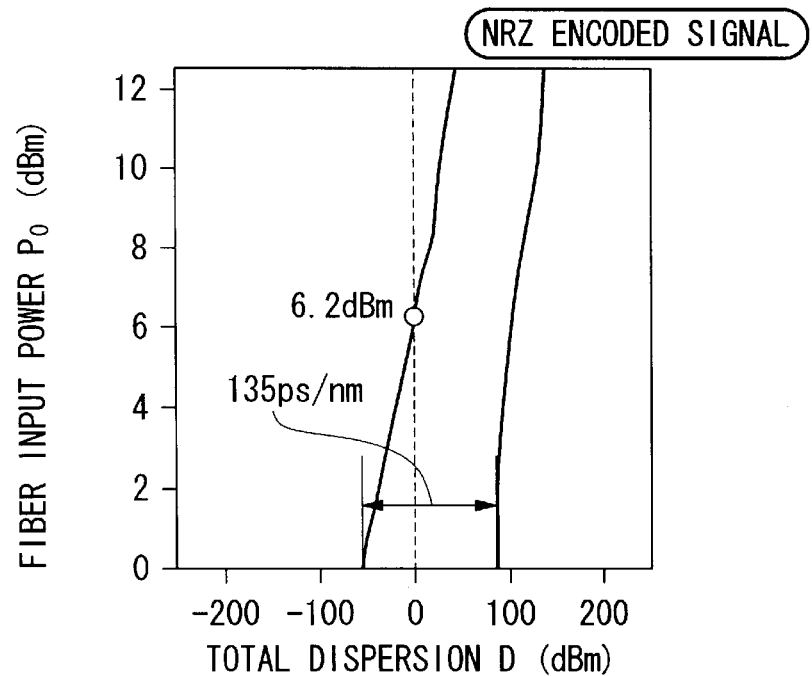
Figure 8C:
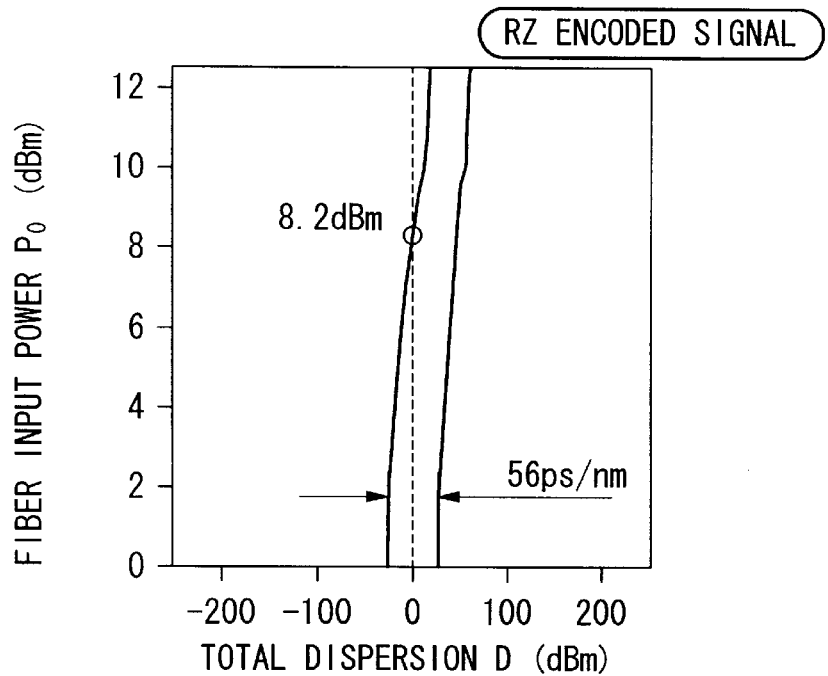
Figure 8D:
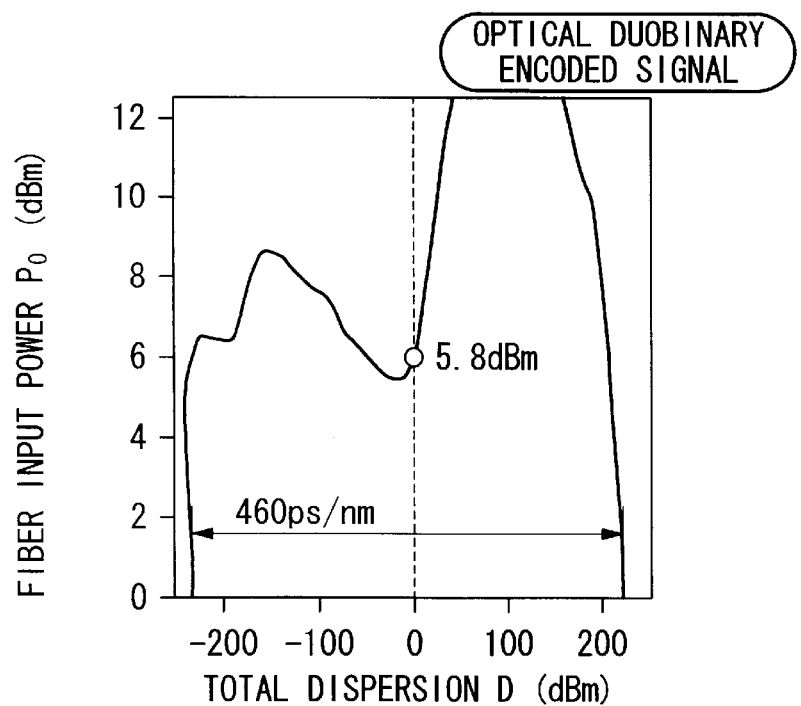

FIGS. 7 to 8D are diagrams for explaining the function and effect of the optical transmission system related to Example 1, which show the results of a computer simulation of dependency of the chromatic dispersion tolerance on the fiber input power, where the tolerance allows a degradation level of 1 dB of the eye opening of the optical modulated signal. The results are shown in comparison with results related to the conventional optical duobinary encoded signal.

As shown in FIG. 7, the transmission fiber used in the simulation is a 200 km fiber transmission path including two dispersion shift fibers (DSFs) optically and directly coupled with each other via a repeater, each having a length of 100 km and having "0" dispersion at 1.55 $\mu$m. The dispersion compensation is performed using a dispersion compensating fiber (DCF) in each section, and the output power $P_O$ of each repeater 10 is simultaneously varied. In addition, the transmission speed is 40 Gbits/s, the line loss is 0.2 dB/km, and the dispersion (value) is +2 ps/nm/km.

Under the above structural conditions, in FIGS. 8A to 8D, the horizontal line indicates the total dispersion of the above DSF and DCF, and each graph shows the dependency of the chromatic dispersion tolerance (of each encoded signal) on the output power of the repeater when the total dispersion is changed by changing the DCF. FIG. 8A relates to the binary RZ modulated signal P7 of Example 1, FIG. 8B relates to the conventional NRZ encoded signal, FIG. 8C relates to the conventional RZ encoded signal, and FIG. 8D relates to the conventional optical duobinary encoded signal.

As clearly shown by the figures, under the condition of a fiber input power of approximately 0 dBm (by which the optical non-linear effects can be neglected), the chromatic dispersion tolerance of the binary RZ modulated signal as shown in FIG. 8A is 125 ps/nm, which is a similar level to that of the conventional NRZ encoded signal as shown in FIG. 8B (i.e., 135 ps/nm), twice as much as that of the conventional RZ encoded signal as shown in FIG. 8C (i.e., 56 ps/nm), and approximately ¼ as much as that of the conventional optical duobinary encoded signal as shown in FIG. 8D (i.e., 460 ps/nm).

When the fiber input power $P_O$ of repeater 10 is 8 dBm or more (in that region, the optical non-linear effects in the optical fiber cannot be neglected), the wide dispersion tolerance of the duobinary encoded signal is considerably degraded, as shown in FIGS. 8A to 8D, and thus the optimum dispersion compensation value is shifted to the anomalous dispersion side. The fiber input power Pd (indicated by "○" in the figures) for allowing a penalty of 1 dB in the "0" dispersion region (in which the dispersion compensation can be easily performed) is 6.2 dBm in the conventional NRZ encoded signal (see FIG. 8B), 8.2 dBm in the conventional RZ encoded signal (see FIG. 8C), and 5.8 dBm in the conventional optical duobinary encoded signal (see FIG. 8B). Therefore, severe limitations are imposed in each case.

In contrast, in the binary RZ modulated signal P7 (see FIG. 8A) according to Example 1, the power Pd is +12 dBm or more, thereby improving the tolerance of the fiber input power Pd.

Additionally, when the power $P_O$ (of repeater 10) is approximately less than 8 dBm, the change of the dispersion tolerance of the binary RZ modulated signal of Example 1 is not large, as shown in FIG. 8A; thus, the optimum dispersion value D is not shifted to the anomalous dispersion side (i.e., D>0), and the design of the dispersion compensation is easy.

For example, in order to design the dispersion compensation of a system for outputting a high power (up to 8 dBm) from the repeater in the case of using a conventional encoded signal, the amount of dispersion compensation must be designed under the condition that the optimum total dispersion D≠0, where the optimum value D is shifted depending on the conditions related to the loss of the transmission path or to the dispersion. It is difficult to calculate and determine such an optimum value by using a conventional dispersion measurement device.

In contrast, if the binary RZ modulated signal of Example 1 is used, the amount of the dispersion compensation can be designed under a simple condition that the total dispersion D is 0 within a range of the repeater output power of 0 dBm or less, where the optical non-linear effects can be neglected in this range. More specifically, the amount of dispersion of the transmission path (i.e., DSF in the present case) is measured using a known dispersion measurement device, and the amount of dispersion of the relevant DCF is determined so as to make the total dispersion (including that of DCF) D equal to 0. As a result, the fiber input power for allowing the 1 dB penalty is increased to +8 dBm or more, and a wide dispersion tolerance of 100 ps/nm or more can also be obtained. Therefore, an optical amplifier repeater system having a high repeater-output power for preventing the degradation of the S/N ratio of the total system can be realized by a simple design of the dispersion compensation.

As explained above, according to the above Example 1, a single mode optical signal is modulated into a dual-mode beat pulse optical signal having a frequency interval of B, and then is further modulated using an electric duobinary encoded signal, thereby realizing an optical transmission system having a wide chromatic dispersion tolerance, where the dispersion compensation of the system can be easily designed, and the limitation of the fiber input power is reduced.

EXAMPLE 2

FIGS. 9A and 9B are block diagrams showing the general structure of a second example of the optical transmitter employed in the optical transmission system in the present embodiment. In FIG. 9A, reference numeral 33 indicates a drive circuit, and reference numeral 43 indicates a (dual-mode oscillation) mode-locked laser. The distinctive feature of the present optical transmitter in comparison with the above Example 1 is to use the mode-locked laser 43 as the dual-mode beat pulse generating section 4.

The pulse light source driving section 3 of this Example 2 receives a clock signal of frequency B (i.e., corresponding to the transmission speed) from the system clock source 2, and amplifies the clock signal of frequency B so as to have a synchronous voltage Vs of the mode-locked laser through the use of the drive circuit 33, In the dual-mode beat pulse generating section 4, the mode-locked laser 43 is mode-lock-modulated by using the frequency B of the clock signal, so that a dual-mode beat pulse optical signal P2 having a frequency interval of B is generated.

The electric partial response encoding section 6 receives a binary NRZ encoded signal P3 from the binary NRZ digital signal source 5 in synchronism with the system clock source 2, and outputs an electric duobinary encoded signal, so that a three-level complementary electric duobinary encoded signal P6 is generated according to an operation similar to that of the above Example 1. Therefore, detailed explanations are omitted here.

In the optical modulating section 7, the push-pull type MZ optical intensity modulator 71 modulates the dual-mode beat pulse optical signal P2 output from the mode-locked laser 43 according to the three-level complementary electric duobinary encoded signal P6, so that a converted binary RZ modulated signal P7 is obtained.

Also in Example 2, higher harmonics may be included in the dual-mode beat pulse optical signal P2, as in the above Example 1. Such higher harmonics can be removed (see FIG. 6D) by using an optical band-pass filter 82 having the transmittance characteristics with respect to the center optical frequency $f_0$ as shown in FIG. 6C. In addition to the provision of the optical amplifier 81 for amplifying the output from the optical modulating section 7, the above-explained optical band-pass filter 82 may be provided (i) at the output port of the optical modulating section 7, and/or (ii) between the output port of the dual-mode beat pulse generating section 4 and the input port of the optical modulating section 7.

As explained above, according to Example 2, a dual-mode beat pulse optical signal having a frequency interval of B is directly output by the mode-locked laser, and then is further modulated using an electric duobinary encoded signal, thereby realizing an optical transmission system having a wide chromatic dispersion tolerance, where the dispersion compensation of the system can be easily designed, and the limitation of the fiber input power is reduced.

In addition, by using the mode-locked laser 43 as the dual-mode beat pulse generating section 4, one of the MZ optical intensity modulators can be omitted in comparison with Example 1, thereby reducing the loss caused by insertion of MZ optical intensity modulators, and improving the optical S/N ratio of the transmitted signal.

EXAMPLE 3

FIGS. 10A and 10B are block diagrams showing the general structure of a third example of the optical transmitter employed in the optical transmission system in the present embodiment. The distinctive feature of the present optical transmitter in comparison with the above Example 1 is to use the mode-locked laser 43 as the dual-mode beat pulse generating section 4, and to perform sub-harmonic mode locking, which is a mode-locking operation of optical pulse repetition frequency B by using a 1/m (m is a natural number) frequency-divided signal with respect to the optical pulse repetition frequency B.

The pulse light source driving section 3 in FIG. 10A receives a clock signal of frequency B (i.e., corresponding to the transmission speed) from the system clock source 2, and the clock signal is converted into a ½ frequency-divided signal having a frequency of B/2 by the ½ frequency-dividing circuit 31. The ½ frequency-divided signal is amplified to have a synchronous voltage Vs of the mode-locked laser 43 through the use of the drive circuit 33.

Also in the present Example 3, a three-level complementary electric duobinary encoded signal P6 is generated according to an operation similar to that of the above Example 1; the dual-mode beat pulse optical signal P2 is modulated according to the three-level complementary electric duobinary encoded signal P6, so that a converted binary RZ modulated signal P7 is obtained.

Also in Example 3, higher harmonics may be included in the dual-mode beat pulse optical signal P2, as in the above Example 1. Such higher harmonics can be removed by using an optical band-pass filter 82 having the transmittance characteristics with respect to the center optical frequency $f_0$. In addition to the provision of the optical amplifier 81 for amplifying the output from the optical modulating section 7, the above-explained optical band-pass filter 82 may be provided (i) at the output port of the optical modulating section 7, and/or (ii) between the output port of the dual-mode beat pulse generating section 4 and the input port of the optical modulating section 7.

As explained above, according to Example 3, a dual-mode beat pulse optical signal having a frequency interval of B is directly output by the mode-locked laser, and then is further modulated using an electric duobinary encoded signal, thereby realizing an optical transmission system having a wide chromatic dispersion tolerance, where the dispersion compensation of the system can be easily designed, and the limitation of the fiber input power is reduced, similar to Example 2.

In addition, by performing the mode-locking operation of repetition frequency B by using a frequency-divided signal generated by the ½ frequency-dividing circuit 31, the drive frequency of the mode-locked laser can be reduced, so that a drive circuit of the dual-mode beat pulse generating section 4 can be easily designed.

EXAMPLE 4

FIGS. 11A and 11B are block diagrams showing the general structure of a fourth example of the optical transmitter employed in the optical transmission system in the present embodiment. In FIG. 11A, reference numeral 68 indicates a multiplier.

The distinctive feature of the present optical transmitter is to provide an MZ optical intensity modulator for realizing both the functions of the dual-mode beat pulse generating section 4 and the optical modulating section 7, and to reduce excessive insertion loss such as waveguide loss of each portion, or the like.

FIGS. 12A to 14E are diagrams for explaining the operation of the optical transmitter in the present Example 4. According to FIGS. 11A to 14E, the operation of the optical transmitter of Example 4 will be explained.

Figure 12A:
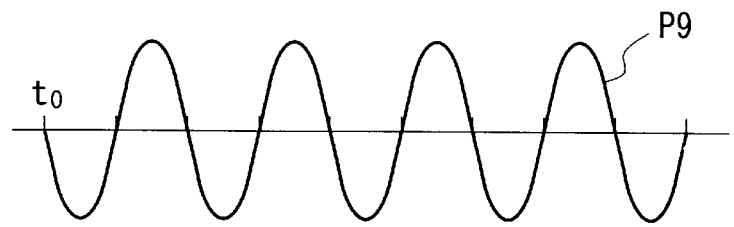
FIGS. 12A to 12E are diagrams for explaining the operation of the optical transmitter of Example 4.
Figure 12B:
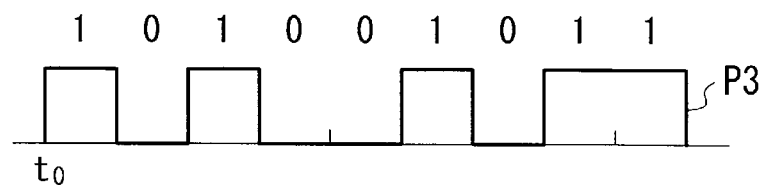

The pulse light source driving section 3 receives a clock signal of frequency B (i.e., corresponding to the transmission speed) from the system clock source 2, and the clock signal is converted to a ½ frequency-divided signal having a frequency of B/2 by the ½ frequency-dividing circuit 31. The ½ frequency-divided signal is amplified by using the drive circuit 32, and is differentially output as a ½ frequency-divided signal P9 as shown in FIG. 12A.

The electric partial response encoding section 6 functions as a duobinary encoding circuit, that is, receives a binary NRZ encoded signal P3 from the binary NRZ digital signal source 5 in synchronism with the system clock source 2, and outputs an electric duobinary encoded signal.

Figure 12C:
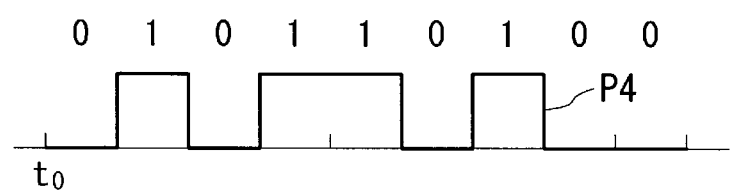

The binary NRZ encoded signal P3 (see FIG. 12B) is logically inverted by the logical inversion circuit 62 (see the inverted NRZ encoded signal P4 shown in FIG. 12C). This inverted encoded signal is converted by a pre-coder 61 having an exclusive OR (EX-OR) circuit 63 and a 1-bit delay circuit 64 (i.e., a 1-time slot delay for data having a transmission speed B) into a binary NRZ pre-coder output signal. After that, a binary pre-coder output signal P5 (see FIG. 12D) is differentially output from the differential converter 65.

Figure 13A:
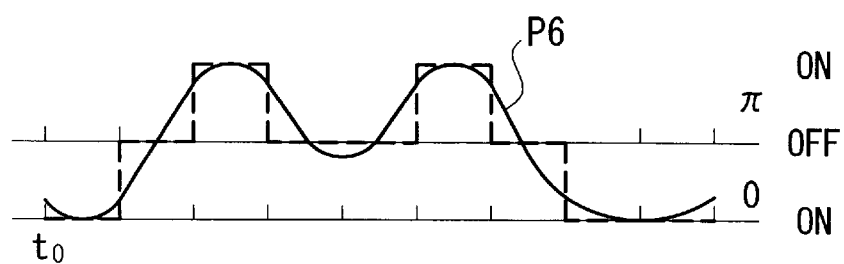
FIGS. 13A to 13C are diagrams for explaining the operation of the optical transmitter of Example 4.

The binary pre-coder differential output signal P5 output from the differential converter 65 is amplified by the amplifying circuit 66, and is then input into the LPF 67 having a 3 dB band of B/4, so that a three-level complementary electric duobinary encoded signal P6 is obtained (see FIG. 13A).

Figure 12D:
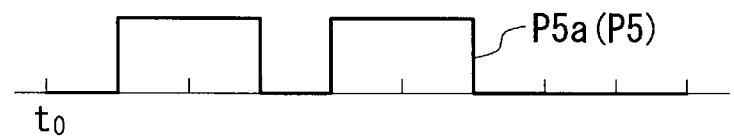
Figure 12E:
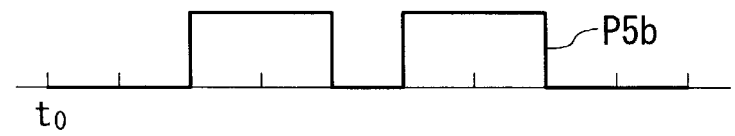

A logically equivalent circuit of LPF 67 is a pre-coder consisting of a 1-bit delay circuit 67A and an adder 67B (see FIG. 11B), so that it is obvious that the three-level complementary electric duobinary encoded signal P6 is equal to the sum of a binary NRZ pre-coder output signal P5$a$ and a 1-bit delayed binary NRZ pre-coder output signal P5$b$ (see FIGS. 12D and 12E).

Figure 13B:
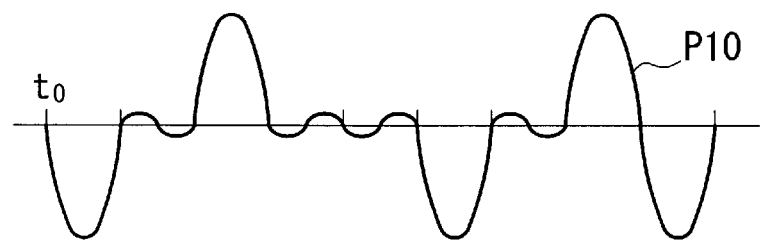

In the multiplier 68, the three-level complementary electric duobinary encoded signal P6 is mixed with the ½ frequency-divided signal P9 output from the pulse light source driving section 3, so that a converted three-level duobinary RZ electric signal P10 is obtained (see FIG. 13B).

FIG. 13B shows an output waveform of the three-level duobinary RZ electric signal P10. It is obvious that the three-level duobinary RZ electric signal P10 has a waveform obtained by multiplying the waveform of the ½ frequency-divided signal P9 from the pulse light source driving section 3, and the waveform of the electric duobinary encoded signal P6.

Figure 13C:
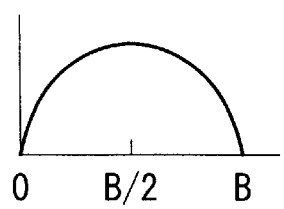

FIG. 13C shows a baseband spectrum of the three-level duobinary RZ electric signal P10. The above ½ frequency-divided signal P9 functions as a B/2 sub carrier in the baseband, and the baseband signal spectrum of the three-level duobinary RZ electric signal P10 is obtained by modulating the ½ frequency-divided signal P9 by the electric duobinary encoded signal P6.

Figure 14A:
FIGS. 14A to 14E are diagrams for explaining the operation of the optical transmitter of Example 4.
Figure 14B:
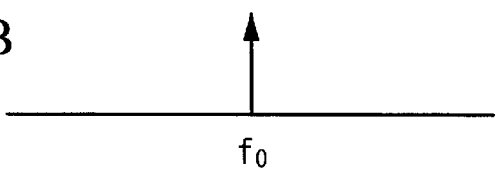
Figure 14C:
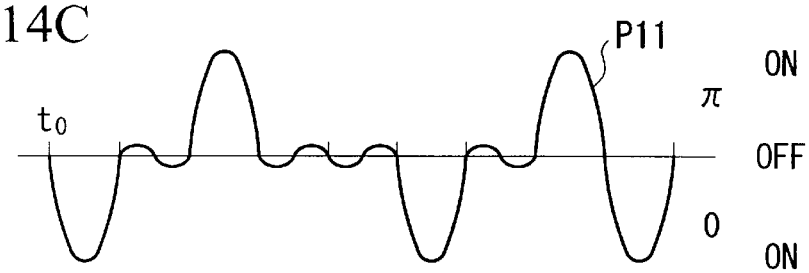

The three-level duobinary RZ electric signal P10 is input as a differential output into the push-pull type MZ optical intensity modulator 71 which is DC-biased so as to have "0" transmission characteristics (namely, transmission null point), so that a single mode optical signal P1 of optical carrier frequency $f_0$ (refer to FIG. 14B) from the CW laser source 42 is converted into a binary RZ modulated signal P11 (see FIG. 14C).

Figure 14D:
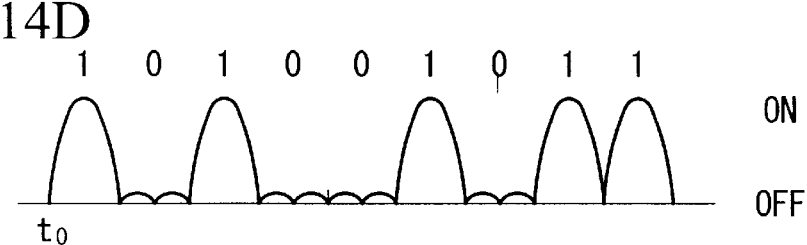
Figure 14E:
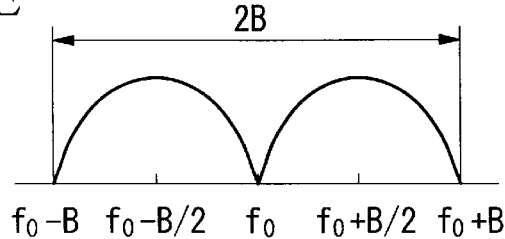

FIG. 14C shows a temporal waveform of the binary RZ modulated signal P11, FIG. 14D shows a directly-detected waveform corresponding to FIG. 14C, and FIG. 14E shows spectra of the binary RZ modulated signal P11.

As shown in FIG. 14C, the temporal waveform of the binary RZ modulated signal P11 corresponds to an RZ encoded signal in which the electric field strength (i.e., light intensity) becomes 0 at regular intervals of each time slot. The line spectrum (of the carrier) as shown in FIG. 14B is modulated by the three-level duobinary RZ electric signal P10; thus, the line spectrum disappears, and no line spectrum having a high spectral density is present in the optically modulated spectra. Accordingly, under the same conditions of the average (optical) fiber input power, the binary RZ modulated signal of the present example has ½ the spectral density in comparison with that of the conventional optical duobinary encoded signal; thus, the allowable fiber input power with respect to the effect of the stimulated Brillouin scattering can be improved by 3 dB.

Also in the present Example 4, higher harmonics may be included as in the above Example 1. Such higher harmonics can be removed by using an optical band-pass filter 82 having the transmittance characteristics with respect to the center optical frequency $f_0$. In addition to the provision of the optical amplifier 81 for amplifying the output from the optical modulating section 7, the above-explained optical band-pass filter 82 may be provided at the output port of the optical modulating section 7.

As explained above, according to Example 4, the single mode optical signal P1 is modulated using the three-level duobinary RZ electric signal P10, which is obtained by mixing the ½ frequency-divided signal P9 (generated using a clock signal having a frequency interval of B) and the electric duobinary encoded signal P6, thereby realizing an optical transmission system having a wide chromatic dispersion tolerance, where the dispersion compensation of the system can be easily designed, and the limitation of the fiber input power is reduced.

EXAMPLE 5

Figure 15:
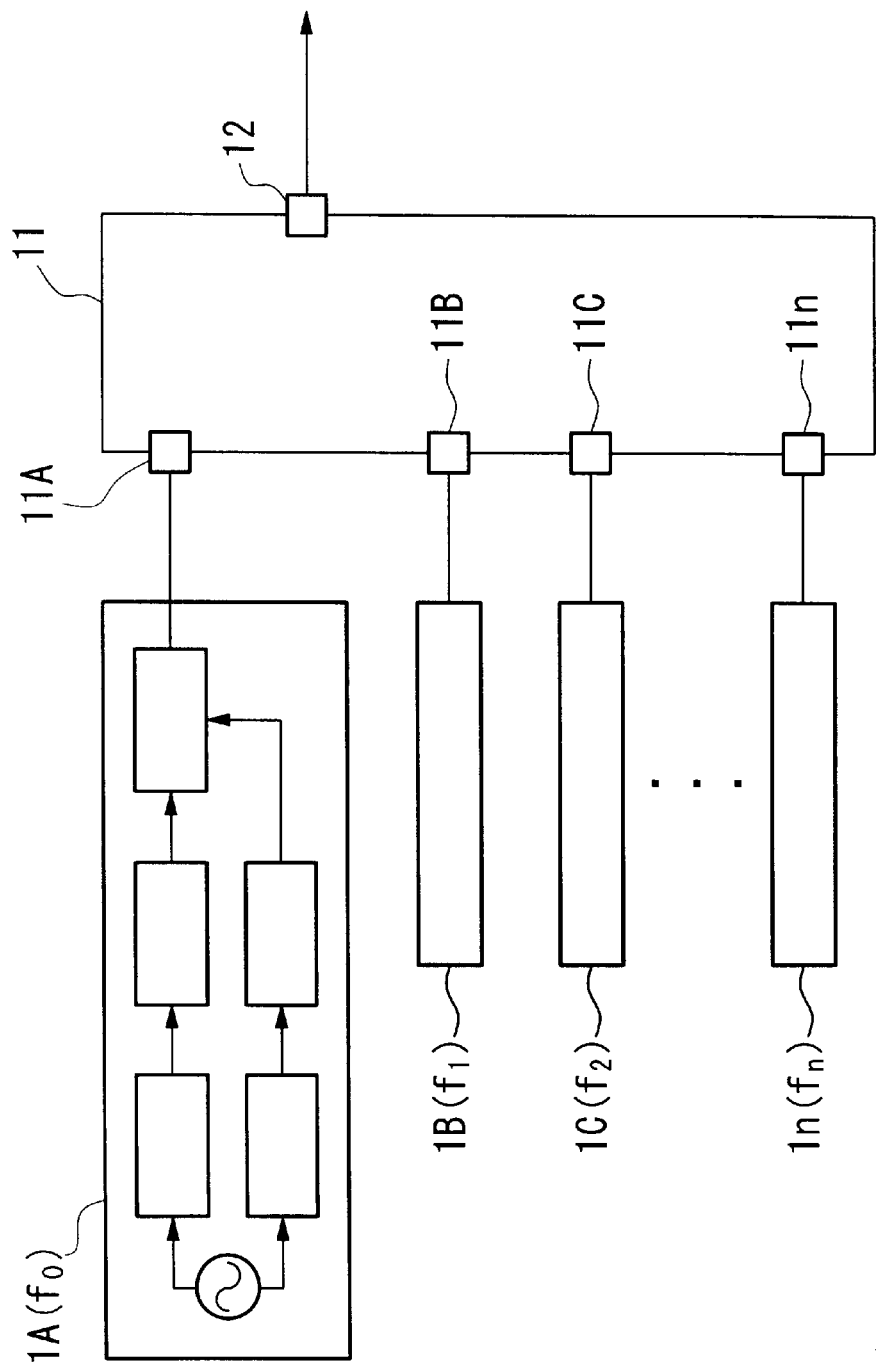
FIG. 15 is a block diagram showing the general structure of the optical transmitter as a fifth example (Example 5).

FIG. 15 is a block diagram showing the general structure of a fifth example of the optical transmitter employed in the optical transmission system in the present embodiment. In the figure, reference numeral 11 indicates a wavelength-division multiplexed filter, reference numerals 11A, 11B, 11C, ..., 11$n$ indicate input ports, and reference numeral 12 indicates an output port.

In the transmitter of this Example 5, the wavelength-division multiplexed filter 11 is used as an optical band-pass filter for removing unnecessary higher harmonics generated in the dual-mode beat pulse generating section 4, and each removed component of the higher harmonics does not function as a crosstalk component in the other wavelength ports.

An arrayed waveguide grating filter may be used as the wavelength-division multiplexed filter 11. An MZ optical intensity modulator 41 as explained in Example 1, or a mode-locked laser 43 as explained in Examples 2 and 3, may be used as the dual-mode beat pulse generating section 4. In addition, a duobinary encoded signal or a modified duobinary encoded signal may be used as a partial response encoded signal.

Figure 16A:
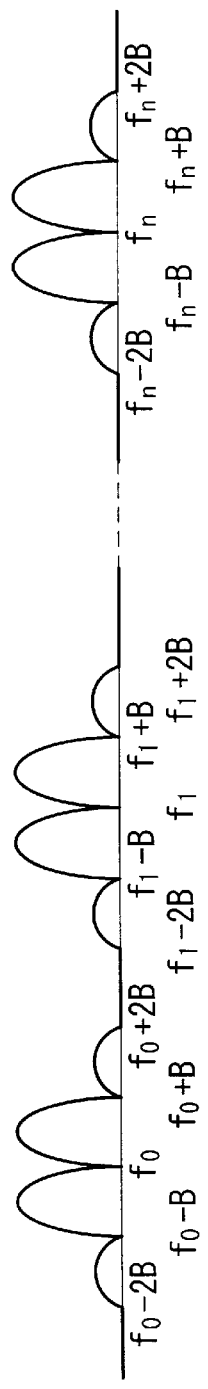
FIGS. 16A to 16C are diagrams for explaining the operation of the optical transmitter of Example 5.
Figure 16B:
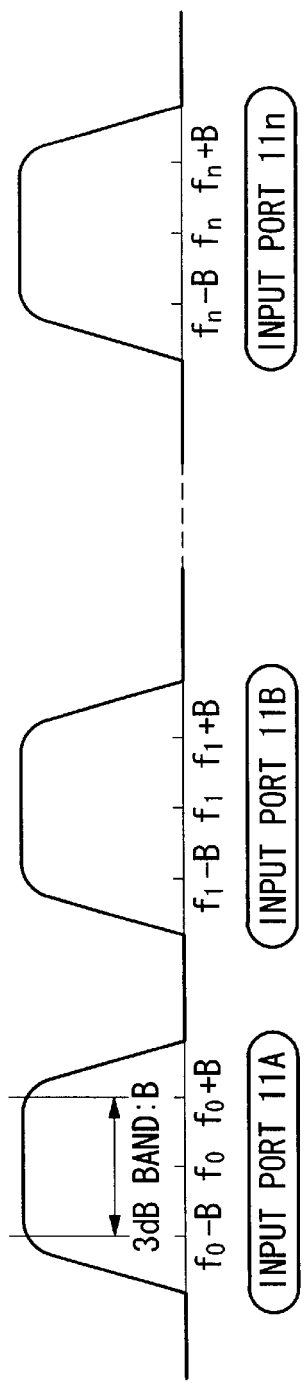
Figure 16C:
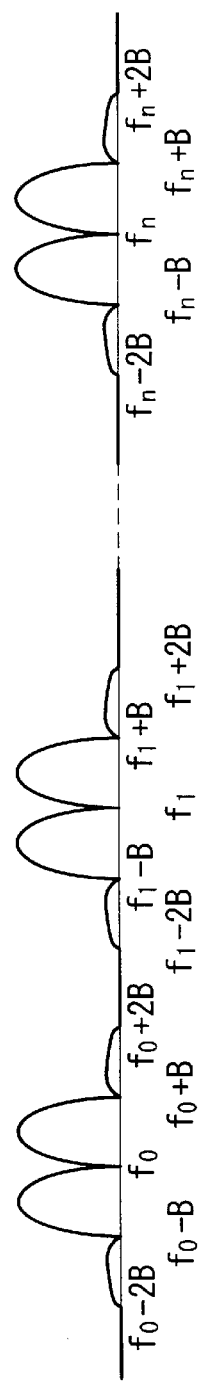

FIGS. 16A to 16C are diagrams for explaining the operation of the optical transmitter of Example 5.

The optical transmission system related to Example 5 comprises a plurality of optical transmitters, that is, n optical transmitters from the first optical transmitter 1A to the nth optical transmitter 1n, and as shown in FIG. 16A, the optical carrier frequencies $f_0$ to $f_n$ are respectively assigned to the first to nth optical transmitters. Also in this example, according to the operation explained in the above Examples 1 to 4, a binary RZ modulated signal is generated in each optical transmitter, and the generated signal is input into the wavelength-division multiplexed filter 11 having n input ports.

Regarding the transmittance characteristics from each input port to the output port 12 of the wavelength-division multiplexed filter 11, the transmittance center of the band corresponds to the relevant carrier frequency ($f_0, \ldots, f_n$), and the cut-off characteristics of the optical band-pass filter are determined so as to remove only higher harmonics. When an arrayed waveguide grating filter is used as the wavelength-division multiplexed filter 11, if the free spectral range (FSR) of the arrayed waveguide grating filter is set to be sufficiently wider than the total band (B) of the optical signals which are to be wavelength-division multiplexed, then the removed higher harmonic components do not function as crosstalk components in the other channels in the wavelength-division multiplexing operation.

EXAMPLE 6

FIGS. 17A and 17B are block diagrams showing the general structure of a sixth example of the optical transmitter employed in the optical transmission system in the present embodiment. In FIG. 17A, reference numeral 69A indicates a 1:2 bit interleave demultiplexing circuit, and reference numeral 69B indicates a 2:1 bit interleave multiplexing circuit.

FIGS. 18A to 21E are diagrams for explaining the operation of the optical transmitter in the present Example 6. With reference to FIGS. 17A to 21E, the operation of the optical transmitter of Example 6 will be explained. In this Example 6, a modified duobinary encoded signal is used as the partial response encoded signal, and an MZ optical intensity modulator 41 is used as the dual-mode beat pulse generating section 4, and the frequency interval between the two longitudinal modes is B (i.e., transmission speed).

The pulse light source driving section 3 receives a clock signal of frequency B (i.e., corresponding to the transmission speed) from the system clock source 2, and the clock signal is converted into a ½ frequency-divided signal having a frequency of B/2 by the ½ frequency-dividing circuit 31. The ½ frequency-divided signal is amplified by the drive circuit 32 to an approximately half-wave voltage $V_\pi$ of the MZ optical intensity modulator 41, and the amplified signal is then differentially output.

In the dual-mode beat pulse generating section 4, a single mode optical signal P1 (see FIG. 18A) from the CW laser source 42 is modulated by the MZ optical intensity modulator 41 according to a ½ frequency-divided signal which is differentially output from the pulse light source driving section 3, where the MZ optical intensity modulator 41 is a push-pull type which is DC-biased so as to have "0" transmission characteristics (namely, transmission null point). Accordingly, a dual-mode beat pulse optical signal P2 having a frequency interval of B is generated (see FIGS. 18B, 18C, and 18D).

Figure 18A:
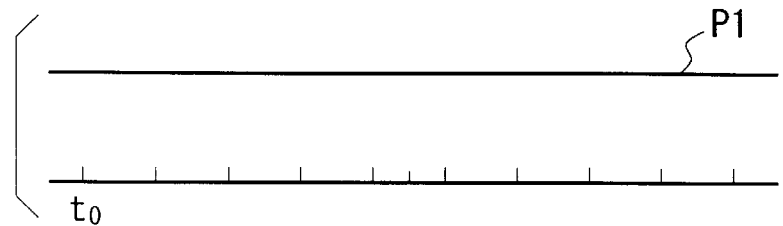
FIGS. 18A to 18D are diagrams for explaining the operation of the optical transmitter of Example 6.
Figure 18B:
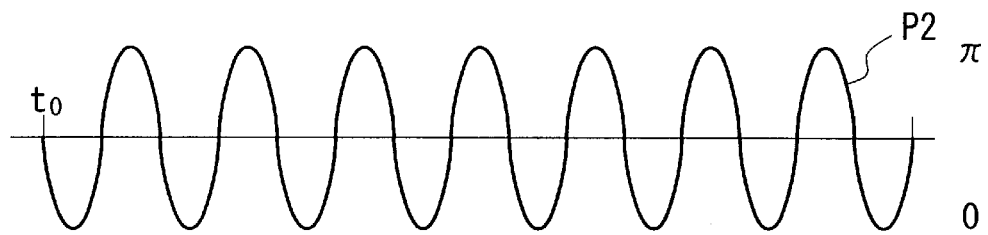
Figure 18C:
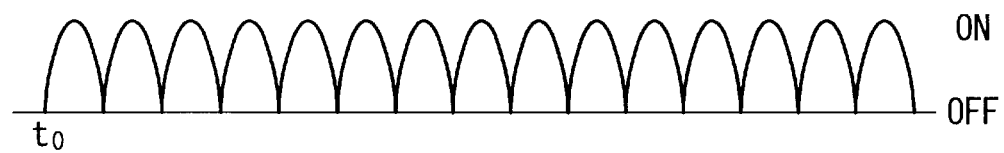
Figure 18D:
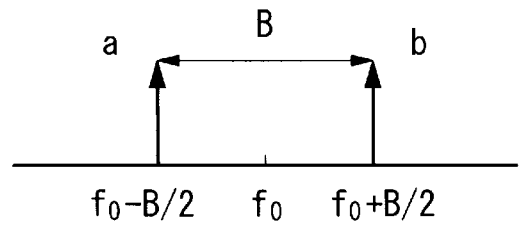
Figure 19A:
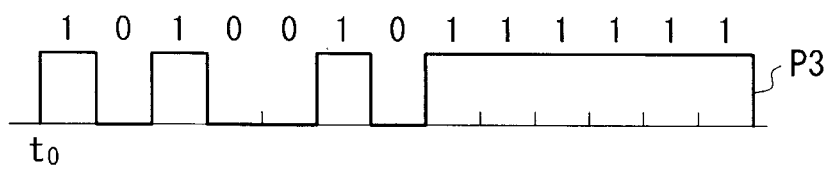
FIGS. 19A to 19G are diagrams for explaining the operation of the optical transmitter of Example 6.
Figure 19B:
Figure 19C:
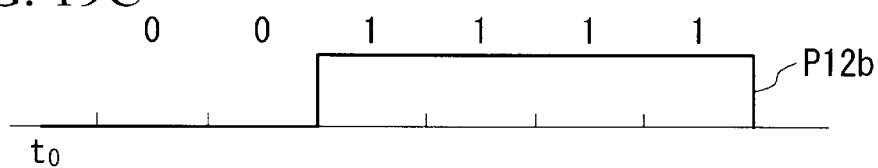
Figure 19D:
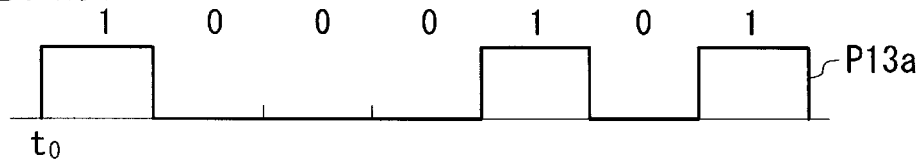
Figure 19E:
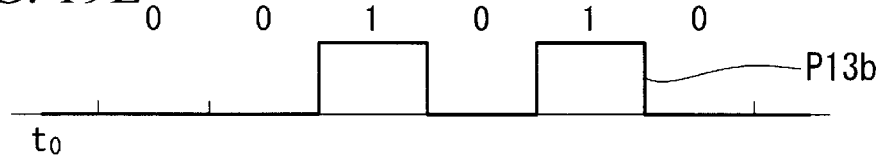
Figure 19F:
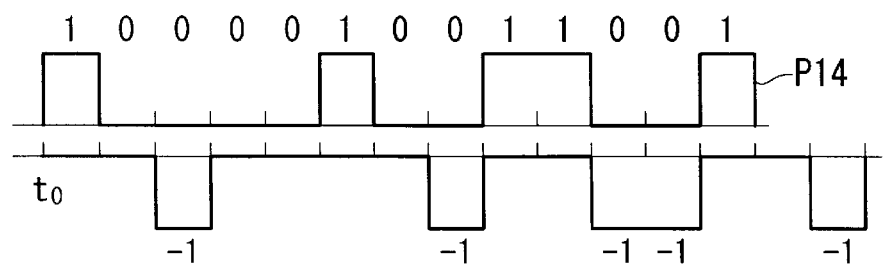
Figure 19G:
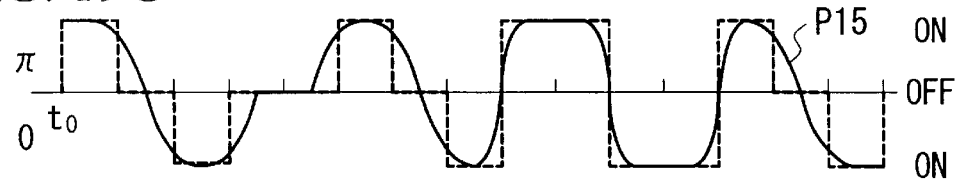

Here, FIG. 18B shows a temporal waveform of the dual-mode beat pulse optical signal P2, FIG. 18C shows a directly-detected waveform corresponding to FIG. 18B, and FIG. 18D shows optical spectra relating to FIG. 18B. The two longitudinal modes "a" and "b" are respectively generated at optical frequencies $f_0-B/2$ and $f_0+B/2$. Therefore, the frequency difference between the two longitudinal modes is equal to the transmission speed B.

The electric partial response encoding section 6 functions as a modified duobinary encoding circuit, that is, receives a binary NRZ encoded signal P3 from the binary NRZ digital signal source 5 in synchronism with the system clock source 2, and outputs an electric modified-duobinary encoded signal.

A binary NRZ encoded signal P3 (see FIG. 19A) is input into the 1:2 bit interleave demultiplexing circuit 69A, so that the signal is divided into two binary NRZ bit interleave demultiplexed signals P12a and P12b each having a data rate (or speed) of B/2.

The two binary NRZ bit interleave demultiplexed signals P12a and P12b demultiplexed by the 1:2 bit interleave demultiplexing circuit 69A are each converted by a pre-coder 61 into binary NRZ bit interleave pre-coder output signals P13a and P13b (see FIGS. 19D and 19E), where the pre-coder 61 comprises exclusive OR (EX-OR) circuits 63A and 63B and 1-bit delay circuits 64A and 64B (i.e., 1-time slot delays for data having a transmission speed B/2). These signals P13a and P13b are then input into the 2:1 bit interleave multiplexing circuit 69B, and are multiplexed into a binary NRZ modified duobinary pre-coder output signal P14 (see FIG. 19F) having a data rate (or speed) of B.

The binary NRZ modified duobinary pre-coder output signal P14 is differentially output by the differential converter 65. The binary NRZ pre-coder differential output signal from the differential converter 65 is amplified by the amplifying circuit 66, and is then input into a band-pass filter (BPF) 67' having a 3 dB band of B/4 and a center frequency of B/4, so that a three-level complementary electric modified-duobinary encoded signal P15 is obtained (see FIG. 19G).

A logically equivalent circuit of BPF 67' is a pre-coder consisting of a 2-bit delay circuit 67C (i.e., a 2-time slot delay for data having a transmission speed B), a logical inversion circuit 67D, and an adder 67B (see FIG. 17B).

Figure 20A:
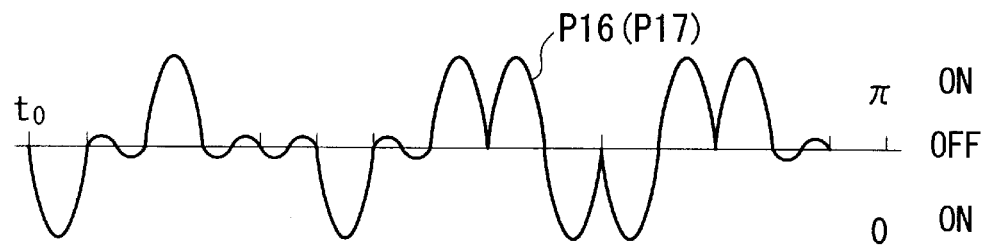
FIGS. 20A to 20C are diagrams for explaining the operation of the optical transmitter of Example 6.

In the optical modulating section 7, the above dual-mode beat pulse optical signal P2 is modulated by the push-pull type MZ optical intensity modulator 71 according to the three-level complementary electric modified-duobinary encoded signal P15, thereby obtaining a binary RZ modulated signal P16 (see FIG. 20A).

Figure 20B:
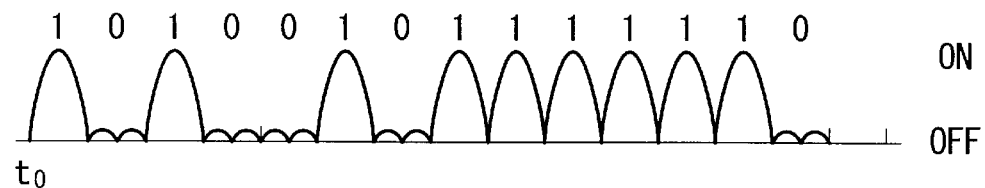
Figure 20C:
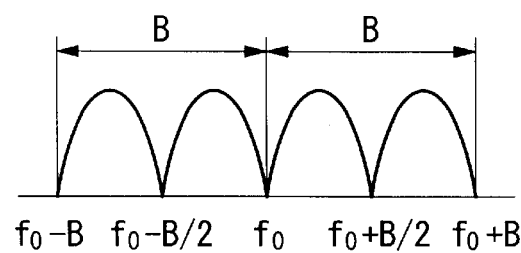

FIG. 20A shows a temporal waveform of the binary RZ modulated signal P16, FIG. 20B shows a directly-detected waveform corresponding to FIG. 20A, and FIG. 20C shows optically modulated spectra corresponding to FIG. 20A.

As shown by FIG. 20A, the temporal waveform of the binary RZ modulated signal P16 corresponds to an RZ encoded signal in which the electric field strength (i.e., light intensity) becomes 0 at regular intervals of each time slot. The two longitudinal modes "a" and "b" as shown in FIG. 18D are each optically modified-duobinary-modulated; thus, line spectra at optical frequencies of $f_0-B/2$ and $f_0+B/2$ disappear, and no line spectrum having a high spectral density is present in the optically modulated spectra. Accordingly, under the same conditions of the average (optical) fiber input power, the binary RZ modulated signal of the present example has ¼ the spectral density in comparison with that of the conventional optical duobinary encoded signal; thus, the allowable fiber input power with respect to the effect of the stimulated Brillouin scattering can be improved by 6 dB.

Also in the present Example 6, higher harmonics may be included in the dual-mode beat pulse optical signal P2, as in the above Examples 1 and 2. A method of removing such unnecessary higher harmonic components will be explained with reference to FIGS. 21A to 21E.

Figure 21A:
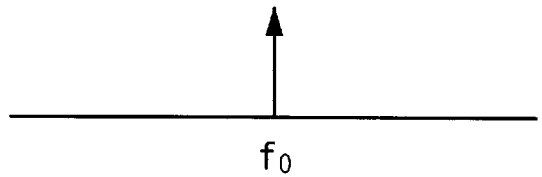
FIGS. 21A to 21E are diagrams for explaining the operation of the optical transmitter of Example 6.
Figure 21B:
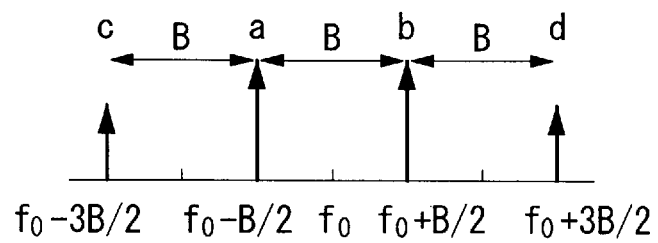
Figure 21C:
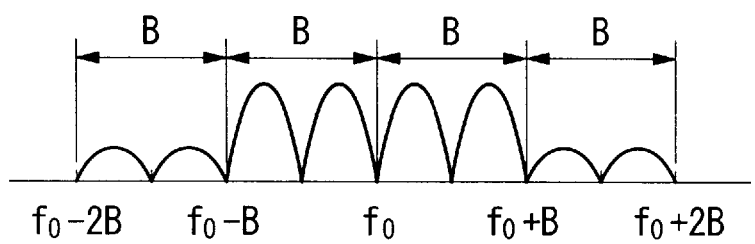
Figure 21D:
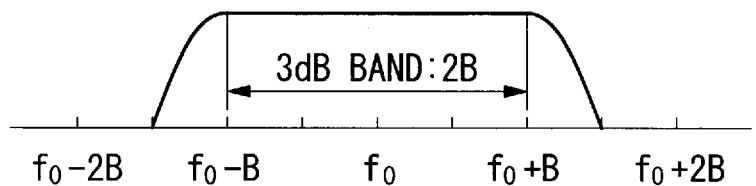
Figure 21E:
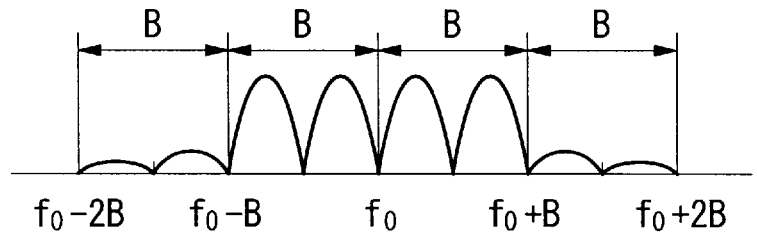

FIGS. 21A, 21B, 21C, and 21E respectively show optically modulated spectra of signals P1, P2, P16, and P17 shown in FIG. 17A. Due to the nonlinear response characteristics of the MZ optical intensity modulator 41 in FIG. 17A, higher harmonic components such as "c" and "d" shown in FIG. 21B are included in the dual-mode beat pulse optical signal P2, and each component is modulated using a modified duobinary encoded signal by the optical modulating section 7. As a result, the generated optically-modulated spectra of the present example include unnecessary higher harmonic components in frequency regions of "$f<F_0-B$" and "$f>F_0+B$".

Such higher harmonic components can be removed (see FIG. 21E) by using an optical band-pass filter having the transmittance characteristics (see FIG. 21D) of a 3 dB band of 2B with respect to the center optical frequency $f_0$ (see FIG. 21A). Such an optical band-pass filter may be provided (i) at the output port of the optical modulating section 7, and/or (ii) between the output port of the dual-mode beat pulse generating section 4 and the input port of the optical modulating section 7.

As explained above, according to the above Example 6, a single mode optical signal is modulated into a dual-mode beat pulse optical signal having a frequency interval of B, and then is further modulated using a modified duobinary encoded signal, thereby realizing an optical transmission system having a wide chromatic dispersion tolerance, where the dispersion compensation of the system can be easily designed, and the limitation of the fiber input power is reduced.

In addition, according to the modulation using a modified duobinary encoded signal as in the present Example 6, the effect of the stimulated Brillouin scattering can be much more reduced.

Second Embodiment

EXAMPLE 1

Figure 22:
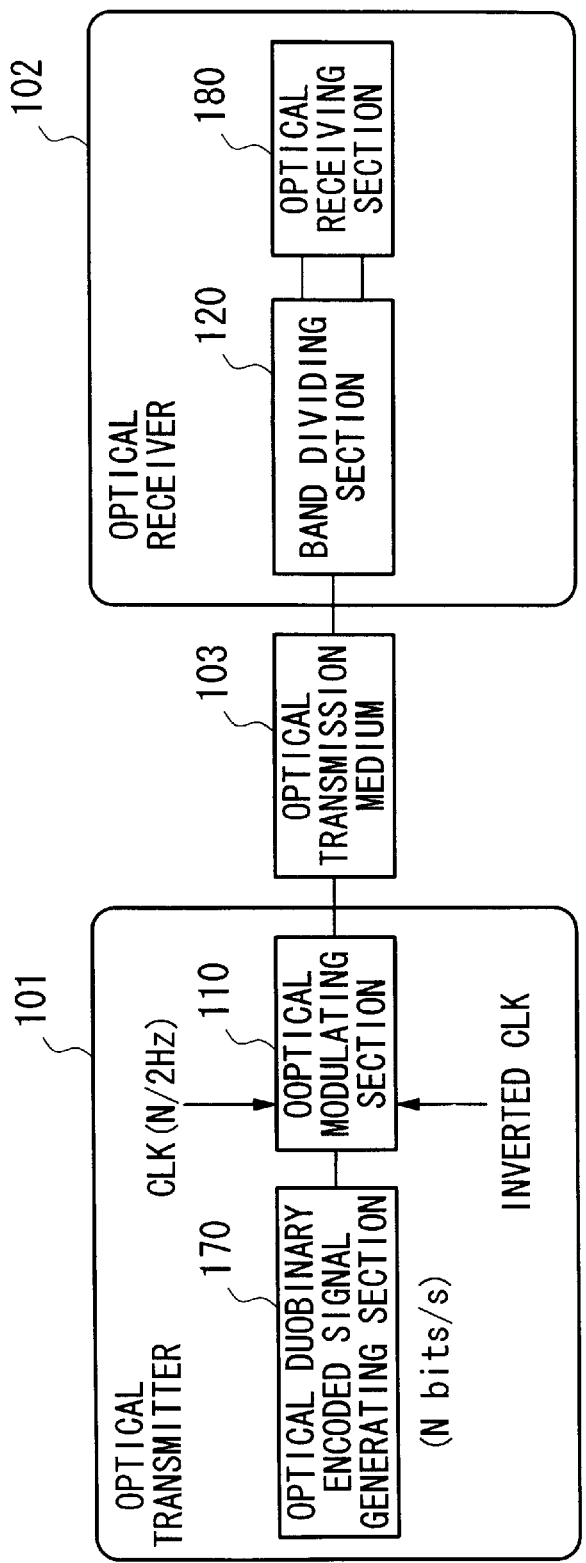
FIG. 22 is a block diagram showing the general structure of a first example (Example 1) of the optical transmission system (an optical transmitter and an optical receiver) in the second embodiment according to the present invention.

FIG. 22 is a block diagram showing the general structure of a first example of the optical transmission system (an optical transmitter and an optical receiver) in the second embodiment according to the present invention.

In the figure, the present optical transmission system comprises an optical transmitter 101 for converting an optical duobinary encoded signal into a carrier-suppressed RZ optical duobinary encoded signal and transmitting the converted signal, and an optical receiver 102 for receiving the carrier-suppressed RZ optical duobinary encoded signal transmitted via an optical transmission medium 103 while dividing the bands of the received signal.

The optical receiver 101 comprises an optical duobinary encoded signal generating section 170 for generating a known optical duobinary encoded signal, and an optical modulating section 110 for converting the generated optical duobinary encoded signal into a carrier-suppressed RZ optical duobinary encoded signal by adding an alternating phase difference to the optical duobinary encoded signal.

A silica optical fiber such as a dispersion shift fiber (DSF) or a single mode fiber with a zero dispersion wavelength of 1.3 $\mu$m band may be used as the optical transmission medium 103. The optical transmission medium 103 may include an optical fiber amplifier (i.e., optical repeater).

The optical receiver 102 comprises a band dividing section 120 for separating two optical duobinary components (i.e., partial response components) in the spectra of the transmitted carrier-suppressed RZ optical duobinary encoded signal, and an optical receiving section 180 for receiving one or both of the two optical duobinary components.

An optical band-pass filter having a dielectric multilayered structure or the like, an optical filter including a Mach-Zehnder interferometer formed using an optical fiber or an optical waveguide, or an arrayed-waveguide grating (AWG) type filter, may be used as the band dividing section 120.

Figure 42:
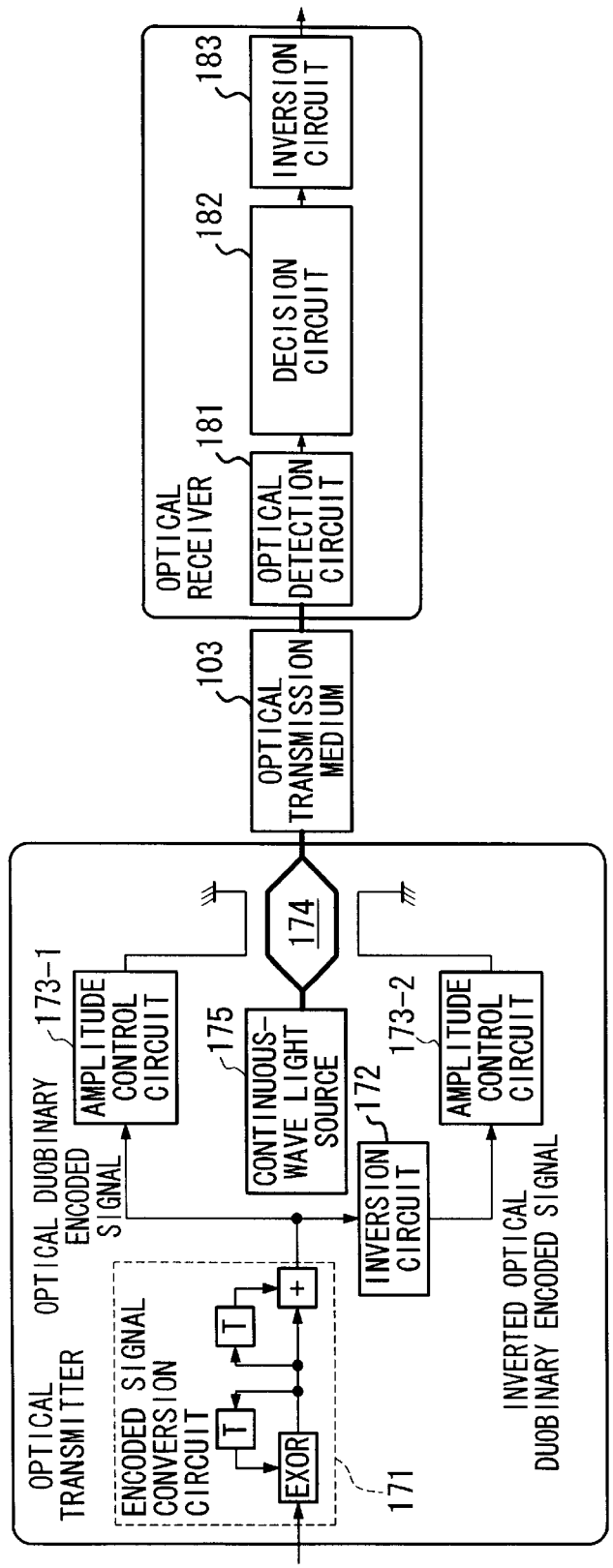
FIG. 42 is a block diagram showing the general structure of a conventional optical transmission system using an optical duobinary transmission method.

As shown in FIG. 42, the optical receiving section 180 comprises an optical detection circuit 181, a decision circuit 182, and an inversion circuit 183. The optical receiving section 180 performs the photoelectric conversion, regeneration, and logical inversion of the optical duobinary component(s) having divided band(s), so as to regenerate the original binary data signal. The inversion circuit 183 may be omitted depending on the structure of an encoded signal conversion circuit 171 of the optical duobinary encoded signal generating section 170.

Figure 23B:
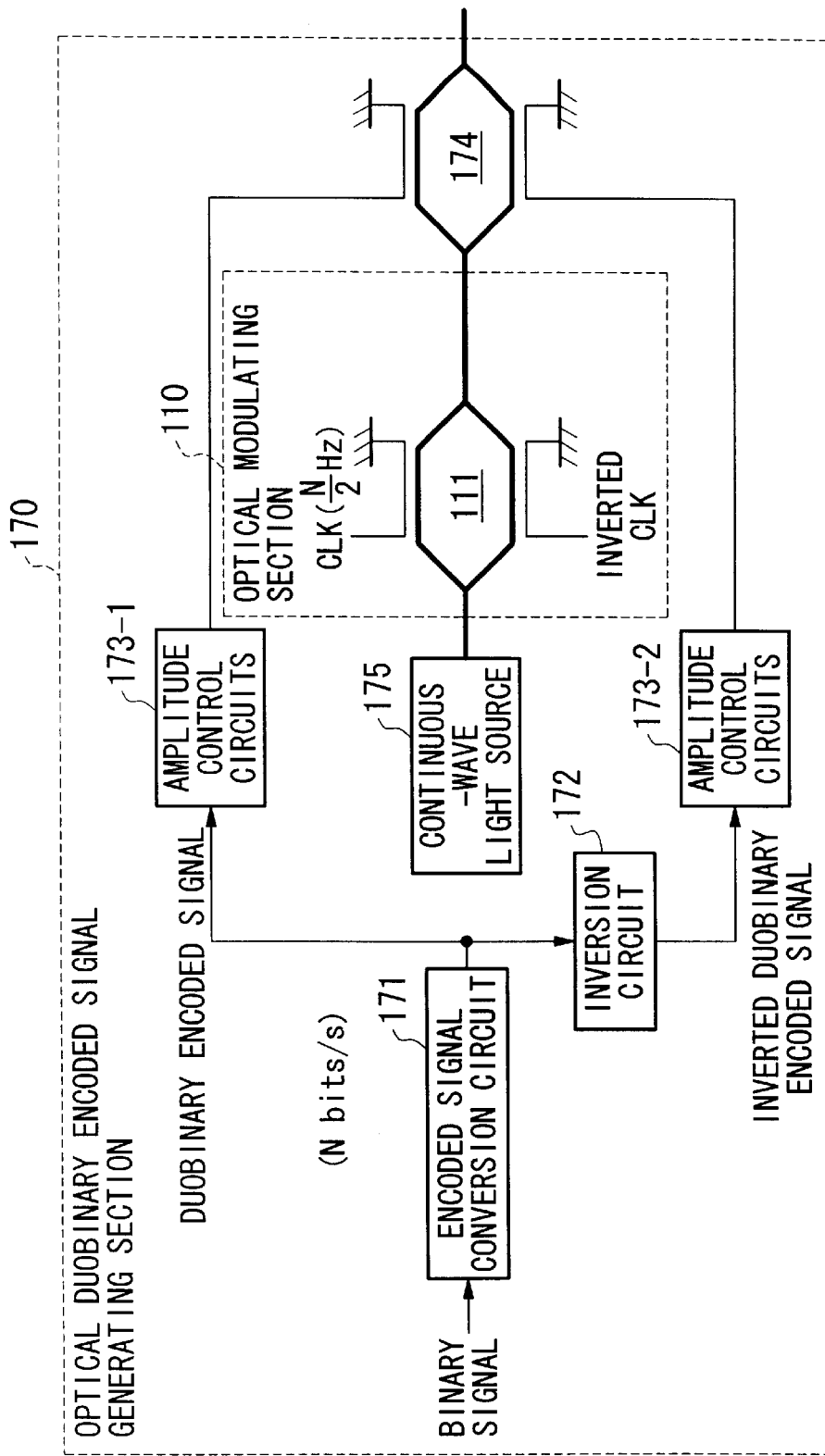

Each of FIGS. 23A and 23B shows a structure of the optical transmitter 101; FIG. 23A shows a first example of the optical transmitter 101, and FIG. 23B shows a second example of the optical transmitter 101.

First Example of Optical Transmitter 101

In FIG. 23A, the optical duobinary encoded signal generating section 170 comprises an encoded signal conversion circuit 171, a (polarity) inversion circuit 172, amplitude control circuits 173-1 and 173-2, a dual-electrode MZ optical intensity modulator 174, and a CW (continuous-wave) light source 175. The optical duobinary encoded signal generating section 170 converts an input binary data signal (i.e., binary signal as input in a conventional structure) into a three-level duobinary encoded signal through the use of the encoded signal conversion circuit 171, and generates an optical duobinary encoded signal by push-pull driving the MZ optical intensity modulator 174.

The optical modulating section 110 comprises a dual-electrode MZ optical intensity modulator 111, which is push-pull driven using a clock signal CLK (having, for example, a sinusoidal waveform) which has a frequency half as much as the bit rate of the optical duobinary encoded signal generated by the optical duobinary encoded signal generating section 170, so that a carrier-suppressed RZ optical duobinary encoded signal is generated.

Below, with reference to FIGS. 24A to 25C, the operation of the present example will be explained. First, the optical duobinary encoded signal generating section 170 generates an optical duobinary encoded signal (see reference symbol "a" in FIG. 24A) having a band approximately half as wide as that of a generally known NRZ encoded signal. FIG. 24B shows an optical waveform (i.e., eye pattern) and relevant optical spectra obtained by a computer simulation.

This optical duobinary encoded signal is input into the optical modulating section 110, that is, into the MZ optical intensity modulator 111, where the optical duobinary encoded signal is modulated by push-pull driving the MZ optical intensity modulator by using a synchronous clock signal (CLK). Accordingly, a converted carrier-suppressed RZ optical duobinary encoded signal (refer to reference symbol "b" in FIG. 24A) is obtained.

Figure 25A:
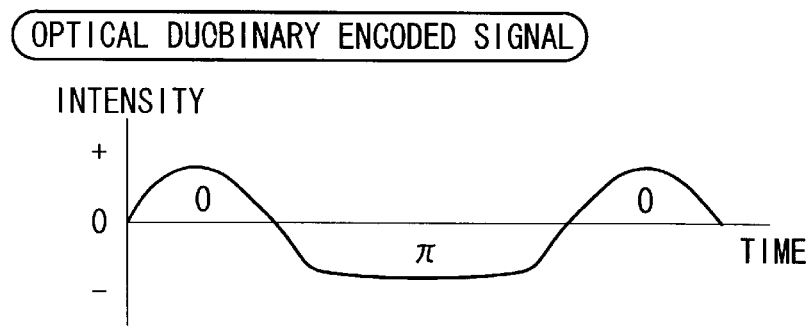
FIGS. 25A to 25C are diagrams for explaining the principle of generation of the carrier-suppressed RZ optical duobinary encoded signal.
Figure 25B:
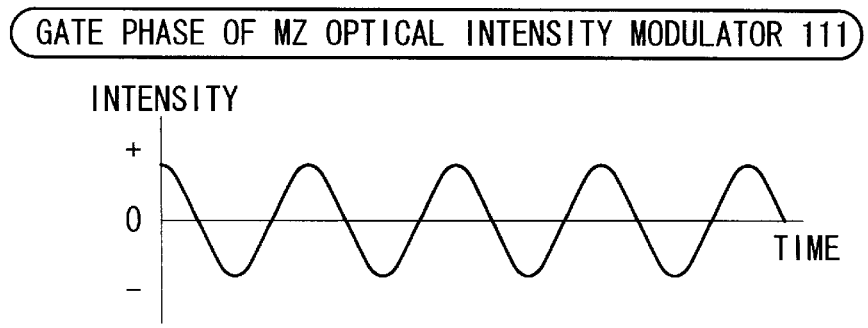
Figure 25C:
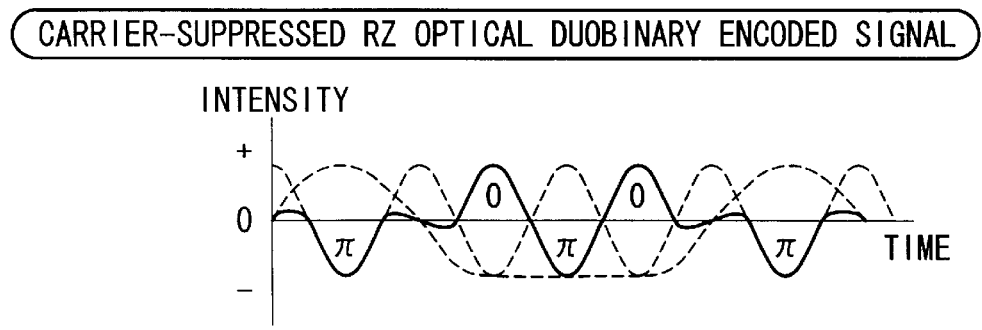

In the above operation, (i) the driving point is positioned at a voltage where the transmittance in the non-modulation state is minimum, and (ii) the frequency of the driving clock signal is half as much as the bit rate of the optical duobinary encoded signal generated in the previous stage. In addition, the driving amplitude is 1 to 3 times as much as that of $V_\pi$ (the driving voltage necessary for changing the transmittance of the optical signal by 0 to 100%) of the MZ optical intensity modulator 111. The MZ optical intensity modulator 111 driven under the above-explained conditions has gate characteristics for generating an RZ encoded signal which has alternating phase characteristics. FIGS. 25A to 25C are diagrams for explaining this feature.

FIG. 25A shows an optical duobinary encoded signal output from the optical duobinary encoded signal generating section 170 in the previous stage. The gate phase condition for push-pull driving the MZ optical intensity modulator 111 is determined as shown in FIG. 25B, based on the phase of the optical duobinary encoded signal. Accordingly, an RZ encoded signal having an inter-bit phase difference pattern as shown in FIG. 25C is obtained, and this is the waveform of the carrier-suppressed RZ optical duobinary encoded signal.

As described above, the MZ optical intensity modulator 11 is push-pull driven using a clock signal of a frequency half as much as the bit rate of the input optical duobinary encoded signal. According to the periodic characteristics of this optical intensity modulator, the repetition frequency of the obtained RZ pulse signal is equal to the bit rate of the input optical duobinary encoded signal. The relevant optical waveform (i.e., eye pattern) and optical spectra are shown in FIG. 24C. In this case, the driving voltage of the MZ optical intensity modulator 111 is a sine wave having a peak-to-peak amplitude twice as much as that of $V_\pi$ of the MZ optical intensity modulator 111. Here, a converted optical pulse signal having a duty ratio of approximately ⅔ is obtained.

According to the above conversion of an optical duobinary encoded signal into an RZ encoded signal, high tolerance with respect to the nonlinear optical effects in the optical transmission medium 103 can be obtained. In addition, in the obtained optical spectra, the carrier component is suppressed, while two optical duobinary components are present.

Figure 24A:
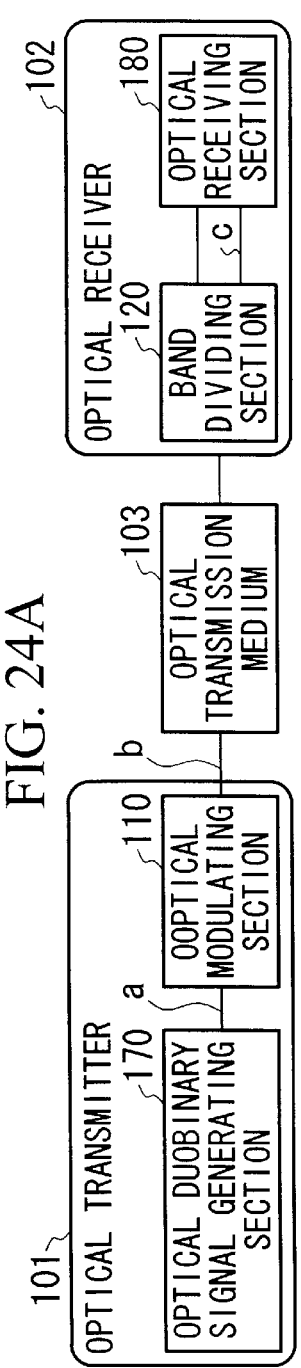
FIGS. 24A to 24D are diagrams for explaining the operation of the first example of the optical transmitter 101.
Figure 24B:
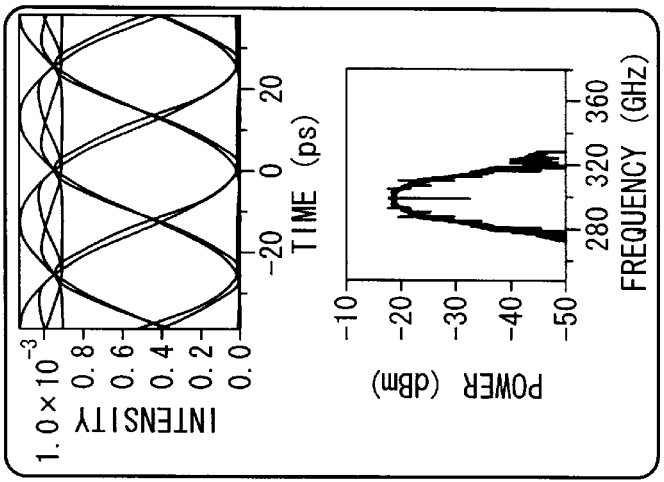
Figure 24C:
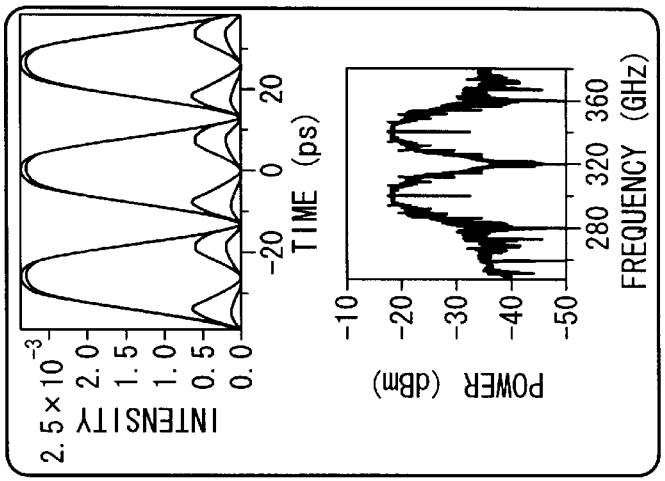
Figure 24D:
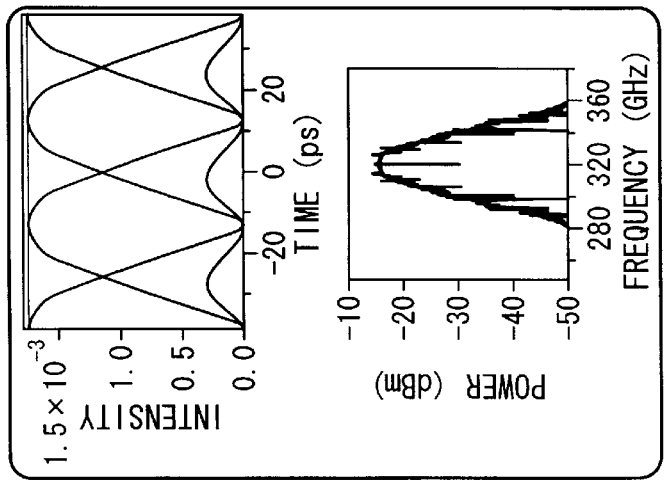

The carrier-suppressed RZ optical duobinary encoded signal transmitted through the optical transmission medium 103 is input into the band dividing section 120 of the optical receiver 102, where one of the two optical duobinary components is chosen (refer to reference symbol "c" in FIG. 24A). FIG. 24D shows the obtained optical waveform (i.e., eye pattern) and optical spectra.

Figure 43:
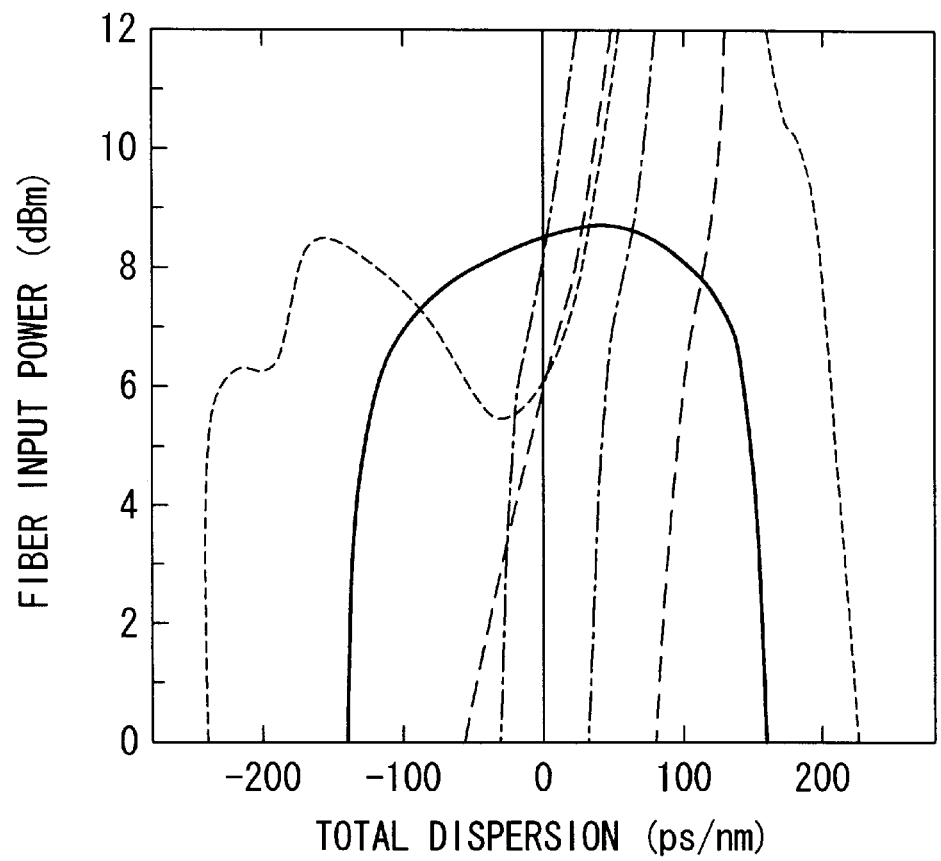
FIG. 43 is a diagram showing the results of a computer simulation relating to the dispersion tolerance.

According to the band dividing operation, an optical waveform almost equivalent to an NRZ signal can be obtained. Therefore, as shown by the solid line in FIG. 43, it is possible to realize, with respect to high fiber input power, high dispersion tolerance, and high tolerance for the nonlinear optical effects in which the optimum dispersion is always maintained in the vicinity of 0.

If it is assumed that the transmitted carrier-suppressed RZ optical duobinary encoded signal is received without performing the band division, then the effect of the group velocity dispersion of the optical fiber is imposed on the total band of the two duobinary components; thus, the dispersion tolerance is reduced.

Second Example of Optical Transmitter 101

The optical transmitter 101 in FIG. 22 may have a structure as shown in FIG. 23B, in which continuous-wave light output from the CW light source 175 is first input into the optical modulating section 110 (i.e., MZ optical intensity modulator 111) for generating an RZ encoded signal having an alternating phase state, and the output light (i.e., optical signal) from the optical modulating section 110 is input into the MZ optical intensity modulator 174 so as to convert the output optical signal into an optical duobinary encoded signal. That is, the MZ optical intensity modulator 11 in the first stage is push-pull driven using a clock signal (CLK), and the MZ optical intensity modulator 174 in the second stage is push-pull driven using duobinary encoded signals output from the amplitude control circuits 173-1 and 173-2.

In this structure, a dual-mode oscillation mode-locked laser may be used in place of the CW light source 175 and optical modulating section 110 (i.e., MZ optical intensity modulator 111). In this case, the number of structural elements can be reduced, thereby realizing a simpler optical transmitter 101.

EXAMPLE 2

Figure 26:
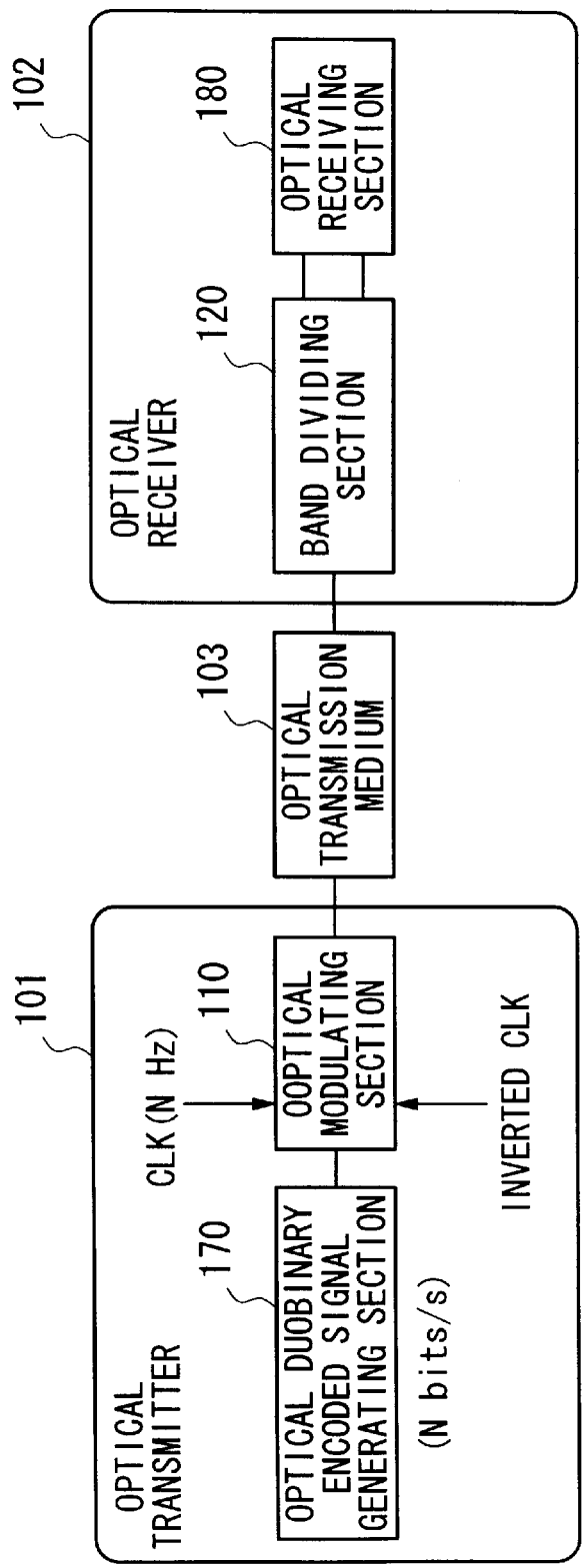
FIG. 26 is a block diagram showing the general structure of a second example (Example 2) of the optical transmission system (an optical transmitter) in the second embodiment according to the present invention.

FIG. 26 is a block diagram showing the general structure of a second example of the optical transmission system (an optical transmitter) in the second embodiment according to the present invention. The structures of the optical transmitter and optical receiver in this example are the same as those of Example 1 shown in FIG. 22; however, the frequency of the clock signal (CLK) for driving the optical modulating section 110 (i.e., MZ optical intensity modulator 111) in the optical transmitter 101 is different.

Figure 27A:
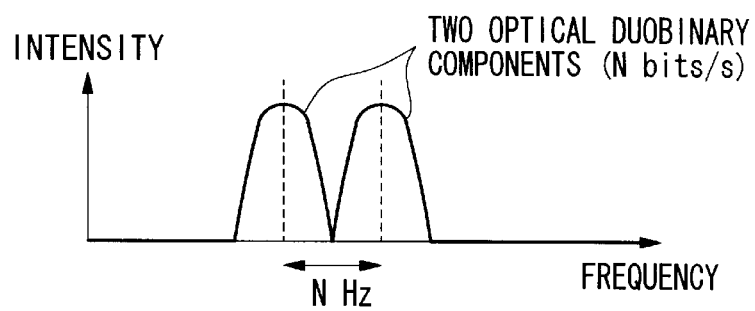
FIGS. 27A and 27B are diagrams for explaining a difference between the effects of Examples 1 and 2 of the second embodiment.

In Example 1; the frequency of the clock signal (CLK) for driving the MZ optical intensity modulator 111 (functioning as the optical modulating section 110) is half as much as the bit rate of the optical duobinary encoded signal generated by the optical duobinary encoded signal generating section 170. Accordingly, given a bit rate of N bits/s of the optical duobinary encoded signal, the frequency difference between the two optical duobinary components of the generated carrier-suppressed RZ optical duobinary encoded signal is N Hz, as shown in FIG. 27A.

Generally, given a bit rate of N bits/s of the optical duobinary encoded signal, the frequency for push-pull driving the MZ optical intensity modulator 111 may be mN/2 Hz (m is a positive integer). In this Example 2, the MZ optical intensity modulator 111 is push-pull driven using a clock signal (m=2) having the same frequency as the bit rate of the optical duobinary encoded signal.

Figure 27B:
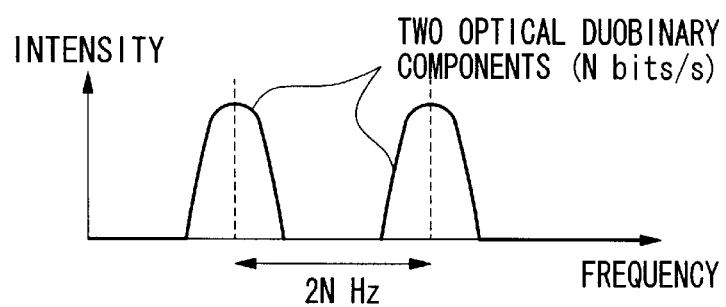

Accordingly, as shown in FIG. 27B, the frequency difference between the two optical duobinary components of the generated carrier-suppressed RZ optical duobinary encoded signal is twice (i.e., 2 NHz) as much as that of Example 1. Therefore, when each duobinary component is isolated by using the band dividing section 120 of the optical receiver 102, a sufficient margin with respect to the center frequency and transmittance band of the optical filter can be obtained, thereby easily realizing a stable operation.

EXAMPLE 3

Figure 28:
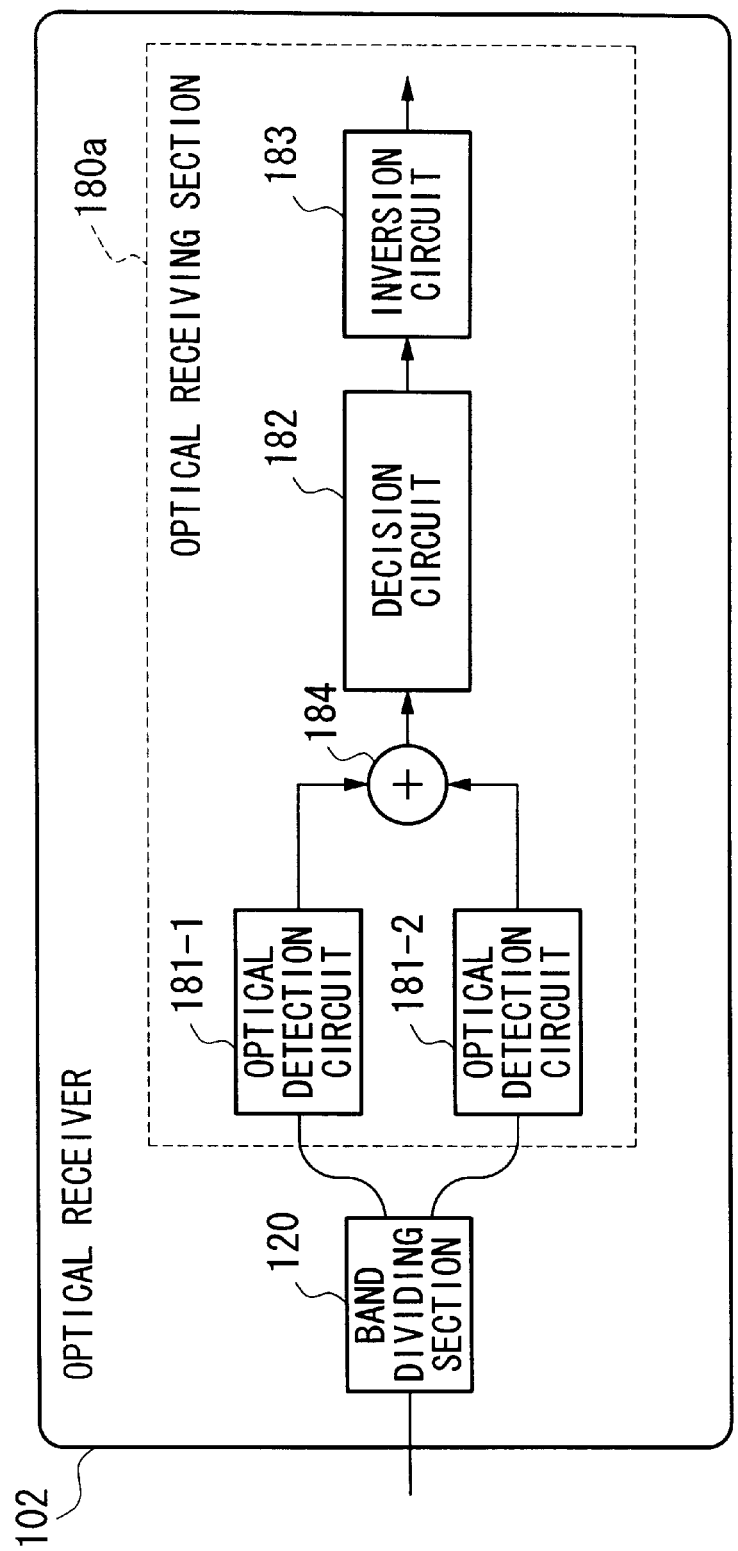
FIG. 28 is a block diagram showing the general structure of a third example (Example 3) of the optical transmission system (an optical receiver) in the second embodiment according to the present invention.

FIG. 28 is a block diagram showing the general structure of a third example of the optical transmission system (an optical receiver) in the second embodiment according to the present invention. The structure of the optical transmitter in this example is the same as that of Example 1 or 2; however, the structure of the optical receiver is distinctive.

The optical receiver 102 of the present example has a distinctive feature of comprising an optical receiving section 180a for receiving two optical duobinary components whose bands have been divided by the band dividing section 120. The optical receiving section 180a comprises two optical detection circuits 181-1 and 181-2, an adder 184, a decision circuit 182, and an inversion circuit 183.

The two optical detection circuits 181-1 and 181-2 may be formed using PIN-type photodiodes, and have the same output polarity. The electric signals from the two optical detection circuits are added by the adder 184, and the added signal is input into the decision circuit 182.

Figure 29:
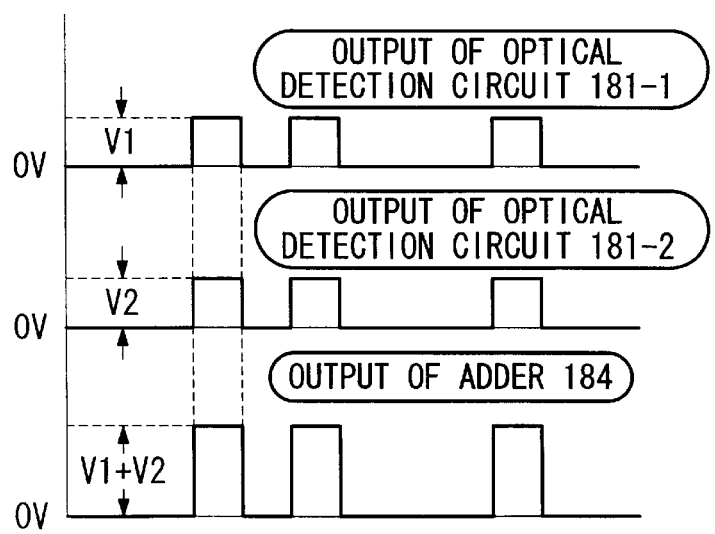
FIG. 29 is a diagram for explaining the operation of Example 3.

The operation of the present example will be explained with reference to FIG. 29. The carrier-suppressed RZ optical duobinary encoded signal transmitted from the optical transmitter 101 is received via the optical transmission medium 103 by the optical receiver 102, in which the received signal is divided into two optical duobinary components by the band dividing section 120 to be separately output.

The two optical duobinary components are individually converted into electric signals by the optical detection circuits 181-1 and 181-2. Here, it is assumed that the output amplitudes of the optical detection circuits 181-1 and 181-2 are V1 and V2. The adder 184 adds the two electric signals, so that the amplitude of the added signal is large, such as V1+V2. Accordingly, the input amplitude into the decision circuit 182 can be large, thereby realizing a stable operation having a sufficient operational margin.

EXAMPLE 4

Figure 30:
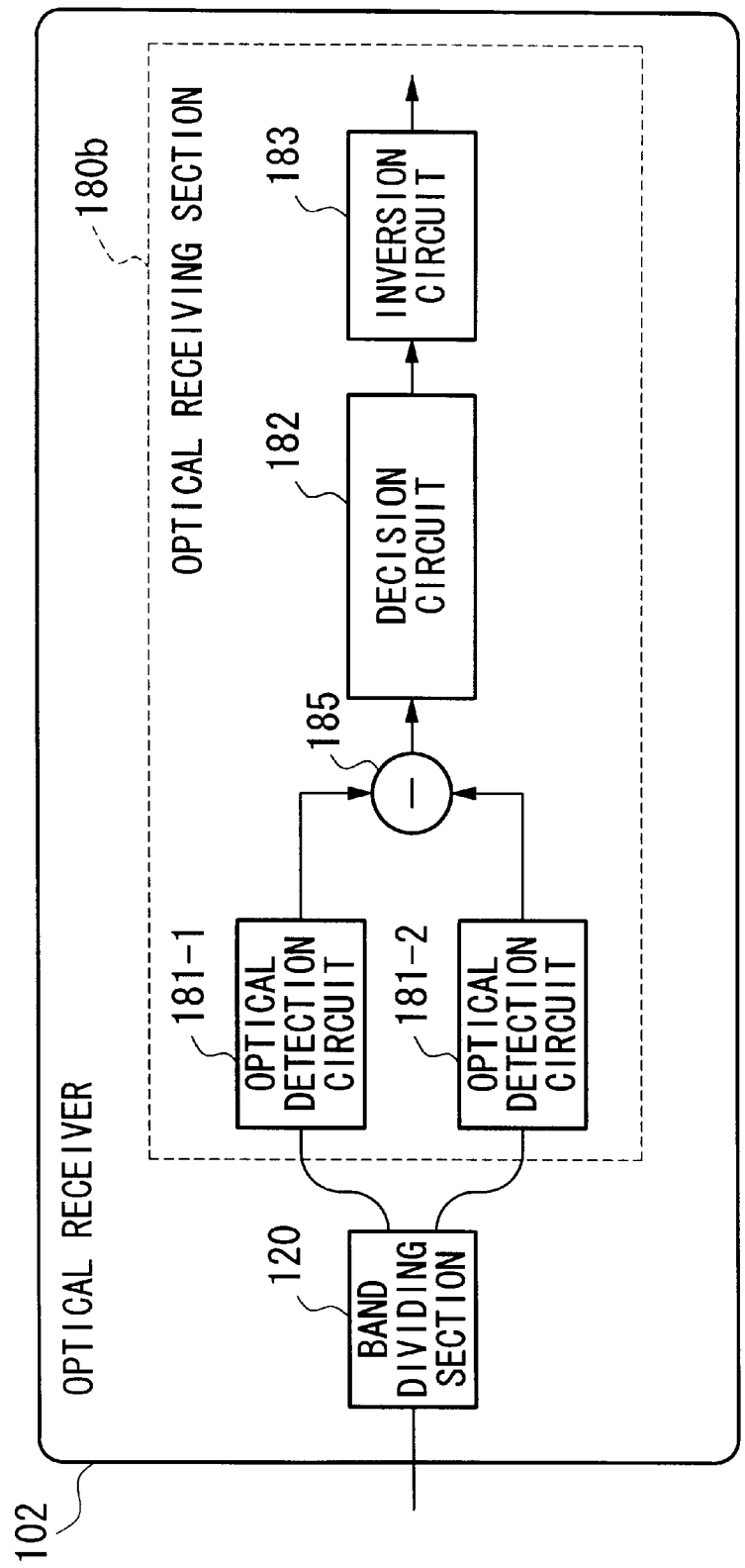
FIG. 30 is a block diagram showing the general structure of a fourth example (Example 4) of the optical transmission system (an optical receiver) in the second embodiment according to the present invention.

FIG. 30 is a block diagram showing the general structure of a fourth example of the optical transmission system (an optical receiver) in the second embodiment according to the present invention. The structure of the optical transmitter in this example is the same as that of Example 1 or 2; however, the structure of the optical receiver is distinctive.

The optical receiver 102 of the present example has a distinctive feature of comprising an optical receiving section 180*b* for receiving two optical duobinary components whose bands have been divided by the band dividing section 120. The optical receiving section 180*a* comprises two optical detection circuits 181-1 and 181-2, a subtracter 185, a decision circuit 182, and an inversion circuit 183.

The two optical detection circuits 181-1 and 181-2 may be formed using PIN-type photodiodes, and have different output polarities. The subtracter 185 performs subtraction on the electric signals from the two optical detection circuits, and the result is input into the decision circuit 182.

The operation of the present example will be explained with reference to FIG. 31. The carrier-suppressed RZ optical duobinary encoded signal transmitted from the optical transmitter 101 is received via the optical transmission medium 103 by the optical receiver 102, in which the received signal is divided into two optical duobinary components by the band dividing section 120 to be separately output.

The two optical duobinary components are individually converted into electric signals by the optical detection circuits 181-1 and 181-2. Here, it is assumed that the output amplitudes of the optical detection circuits 181-1 and 181-2 are V1 and V2. In addition, the polarities of the two electric signals are opposite, that is, one of them has positive polarity (i.e., a positive electric potential is obtained when light is incident), while the other has negative polarity (i.e., a negative electric potential is obtained when light is incident).

Figure 31:
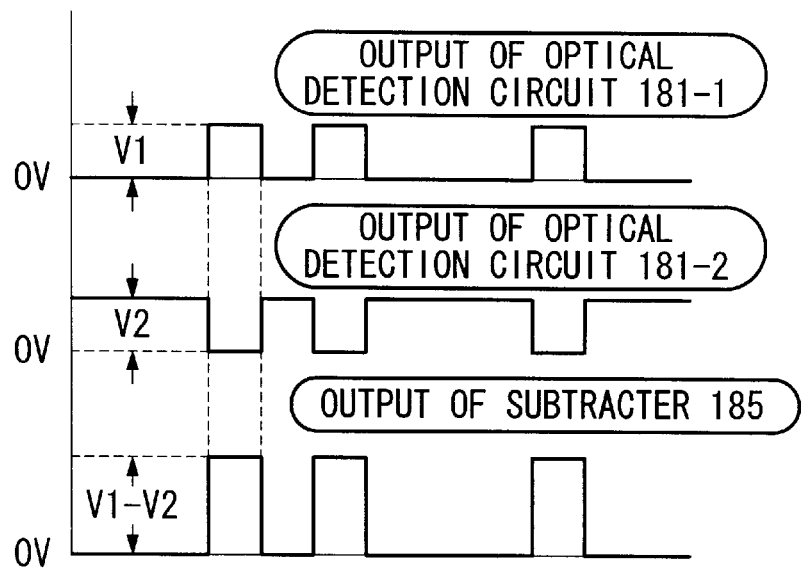
FIG. 31 is a diagram for explaining the operation of Example 4.

The subtracter 185 performs subtraction on the two electric signals, so that the amplitude of the subtracted signal is large, such as V1−V2 (see FIG. 31). Accordingly, the input amplitude into the decision circuit 182 can be large, thereby realizing a stable operation having a sufficient operational margin.

EXAMPLE 5

Figure 32:
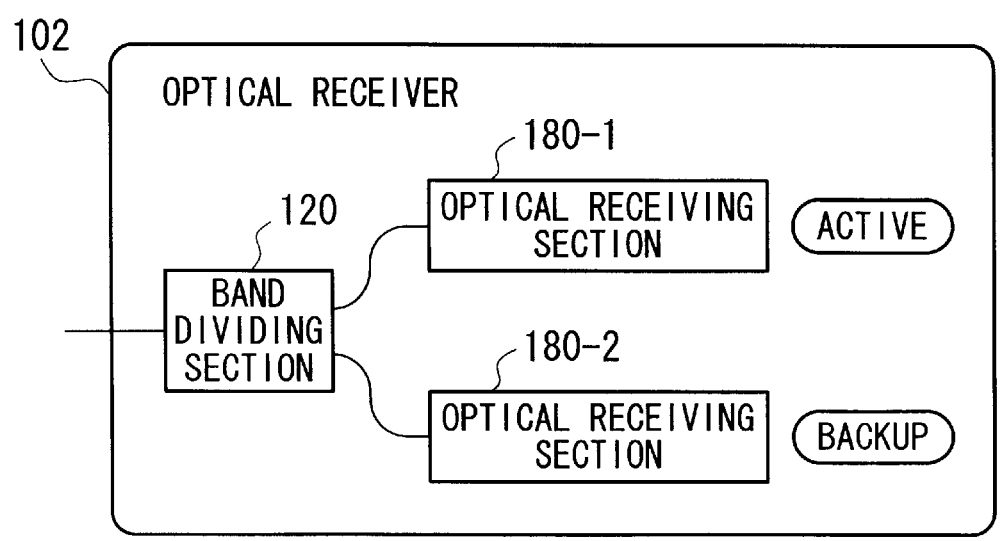
FIG. 32 is a block diagram showing the general structure of a fifth example (Example 5) of the optical transmission system (an optical receiver) in the second embodiment according to the present invention.

FIG. 32 is a block diagram showing the general structure of a fifth example of the optical transmission system (an optical receiver) in the second embodiment according to the present invention. The structure of the optical transmitter in this example is the same as that of Example 1 or 2; however, the structure of the optical receiver is distinctive.

The optical receiver 102 of the present example has a distinctive feature of comprising optical receiving sections 180-1 and 180-2 for parallel-receiving two duobinary components whose bands have been divided in the band dividing section 120. Here, one of the optical receiving sections is for active use, while the other is for backup use. Each optical receiving section comprises an optical detection circuit, a decision circuit, and an inversion circuit.

The operation of each optical receiving section is the same as that of the optical receiver 102 of Example 1. That is, the two optical duobinary components whose bands are divided by the band dividing section 120 are respectively received by the optical receiving sections 180-1 and 180-2, so that if one of them is damaged, the receiving operation can be performed using the other optical receiving section, thereby improving the stability and reliability of the system.

EXAMPLE 6

Figure 33:
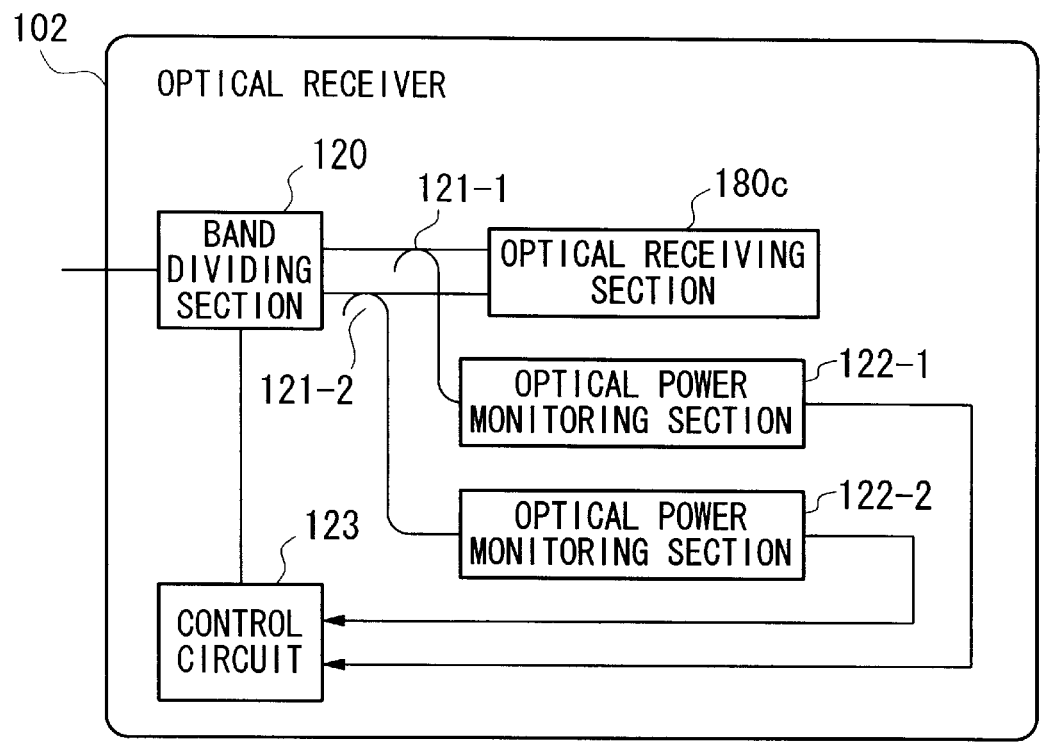
FIG. 33 is a block diagram showing the general structure of a sixth example (Example 6) of the optical transmission system (an optical receiver) in the second embodiment according to the present invention.

FIG. 33 is a block diagram showing the general structure of a sixth example of the optical transmission system (an optical receiver) in the second embodiment according to the present invention. The structure of the optical transmitter in this example is the same as that of Example 1 or 2; however, the structure of the optical receiver is distinctive.

The distinctive feature of optical receiver 102 is to control the band dividing circuit 120 by monitoring the two optical duobinary components whose bands are divided by the band dividing section 120. That is, a portion of each of the two optical duobinary components whose bands are divided by the band dividing section 120 is isolated by a corresponding optical branch device (121-1 or 121-2), and the optical powers (i.e., intensities) of the isolated portions are respectively measured by optical power monitoring circuits 122-1 and 122-2.

A control circuit 123 controls the band dividing section 120 so as to satisfy the conditions that the sum of the two optical powers is a maximum while the difference of the two optical powers is a minimum. The band dividing section 120 may be formed using an optical filter including a Mach-Zehnder interferometer formed using an optical fiber or an optical waveguide. Each of the optical branch devices 121-1 and 121-2 may be formed using an optical coupler of an optical fiber type, or an optical beam splitter using a partial reflection mirror. Each of the optical power monitoring sections 122-1 and 122-2 measures the optical power by using a photoelectric conversion circuit or the like.

The optical receiving section 180*c* may have (i) a structure similar to that of Example 1, in which only one of the two optical duobinary components (whose bands are divided) is received, (ii) a structure similar to that of Example 3 or 4, in which the two optical duobinary components are respectively converted into electric signals, and addition or subtraction of the two electric signals is performed, after which the result is input into the decision circuit, and (iii) a structure similar to that of Example 5, in which the two optical duobinary components are respectively converted into electric signals, and one of the converted electric signals is for active use, while the other is for backup use.

If an arrayed-waveguide grating (AWG) type filter is used as the band dividing section 120, the band dividing section 120 is controlled so as to obtain the maximum optical power of the sum of the two optical duobinary components of the divided bands.

This is because the frequency interval (i.e., grid interval) between optical signals divided by the AWG filter is fixed, and it is impossible to perform control which satisfies the condition that the optical power of the difference between the two optical duobinary components of the divided bands is at a minimum. Therefore, if an AWG having a grid interval which is equal to the bit rate of the carrier-suppressed RZ optical duobinary encoded signal is used, then one of the optical powers of the two optical duobinary components may be monitored so as to have a maximum value thereof.

EXAMPLE 7

Figure 34:
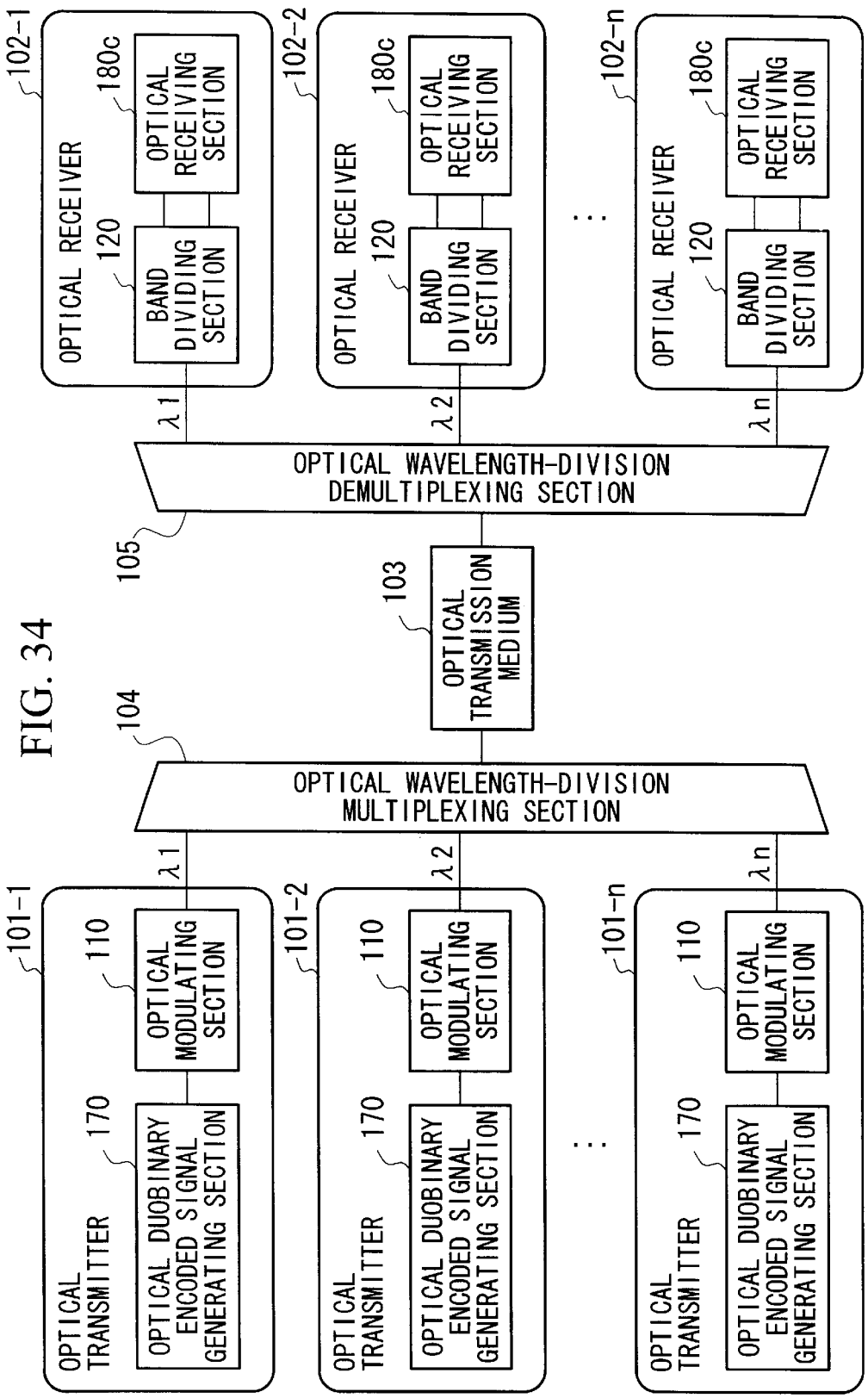
FIG. 34 is a block diagram showing the general structure of a seventh example (Example 7) of the optical transmission system in the second embodiment according to the present invention.

FIG. 34 is a block diagram showing the general structure of a seventh example of the optical transmission system in the second embodiment according to the present invention. In this example, a plurality of the above-explained optical transmitters 101 and a plurality of the above-explained optical receivers 102 are provided for each transmission wavelength, and a plurality of carrier-suppressed RZ optical duobinary encoded signals of different wavelengths are wavelength-division multiplexed and transmitted. Accordingly, the transmission capacity can be improved.

Each of the optical transmitters 101-1 to 101-n comprises an optical duobinary encoded signal generating section 170 and an optical modulating section 110, and generates a carrier-suppressed RZ optical duobinary encoded signal having a specific wavelength (that is, the optical transmitters 101-1 to 101-n output carrier-suppressed RZ optical duobinary encoded signals having different wavelengths).

The carrier-suppressed RZ optical duobinary encoded signals of different wavelengths are multiplexed by an optical wavelength-division multiplexing section 104, and the multiplexed optical signal is transmitted via an optical transmission medium 103. This transmitted optical signal is then demultiplexed by an optical wavelength-division demultiplexing section 105 into carrier-suppressed RZ optical duobinary encoded signals having corresponding wavelengths. The carrier-suppressed RZ optical duobinary encoded signals are respectively received by corresponding optical receivers 102-1 to 102-n. Each of the optical receivers 102-1 to 102-n comprises a band dividing section 120 and an optical receiving section 180c.

The optical receiving section 180c may have (i) a structure similar to that of Example 1, in which only one of the two optical duobinary components (whose bands are divided) is received, (ii) a structure similar to that of Example 3 or 4, in which the two optical duobinary components are respectively converted into electric signals, and addition or subtraction of the two electric signals is performed, after which the result is input into the decision circuit, and (iii) a structure similar to that of Example 5, in which the two optical duobinary components are respectively converted into electric signals, and one of the converted electric signals is for active use, while the other is for backup use.

EXAMPLE 8

Figure 35:
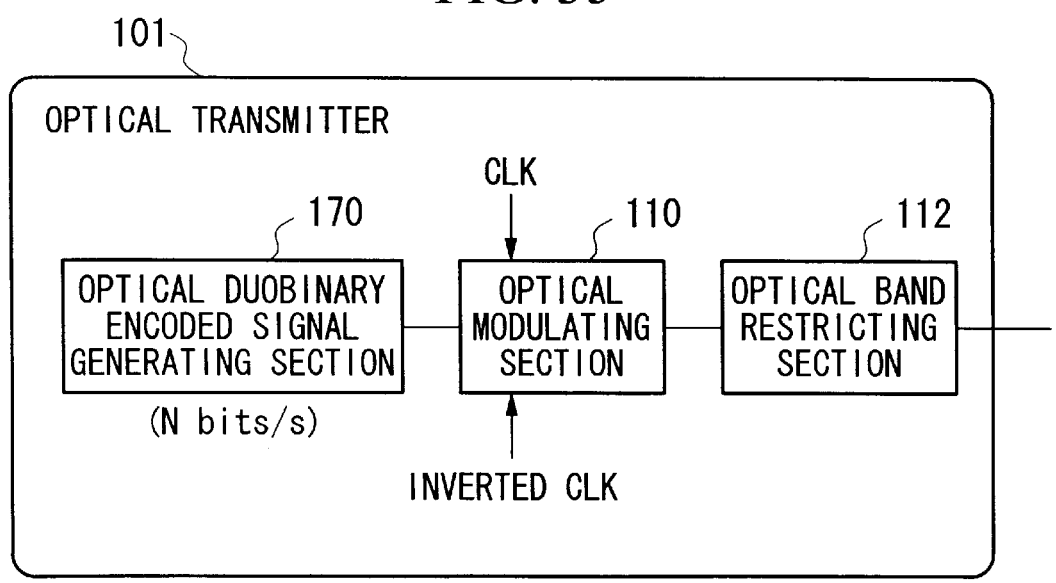
FIG. 35 is a block diagram showing the general structure of an eighth example (Example 8) of the optical transmission system (an optical transmitter) in the second embodiment according to the present invention.

FIG. 35 is a block diagram showing the general structure of an eighth example of the optical transmission system (an optical transmitter) in the second embodiment according to the present invention. The optical transmitter 101 of the present example has a distinctive feature of comprising an optical band restricting section 112 for suppressing unnecessary higher harmonic components generated during the generation of the carrier-suppressed RZ optical duobinary encoded signal. The optical receiver has a structure as explained in either of the above-explained examples.

Figure 36A:
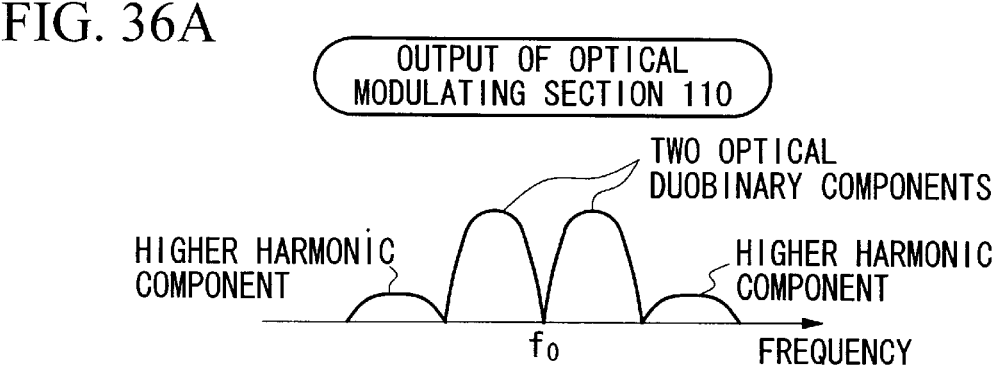
FIGS. 36A to 36C are diagrams for explaining the function and effect of Example 8.

The function and effect according to the present example will be explained with reference to FIGS. 36A to 36C. When the optical modulating section 110 of the optical transmitter 110 generates a carrier-suppressed RZ optical duobinary encoded signal, higher harmonics are generated as shown in FIG. 36A.

Figure 36B:
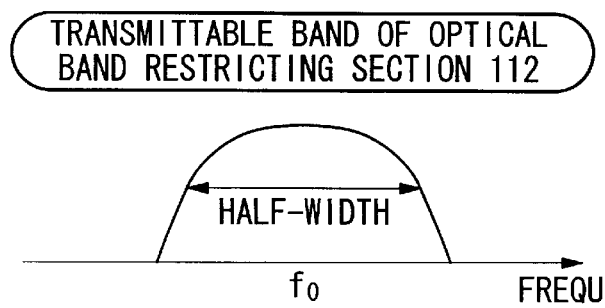
Figure 36C:
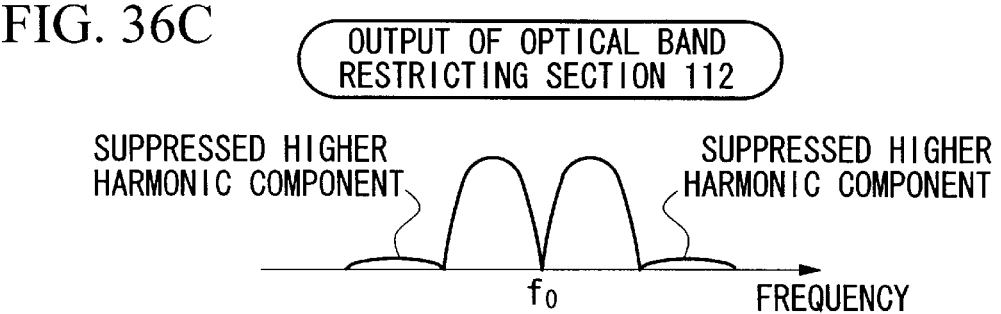
Figure 38A:
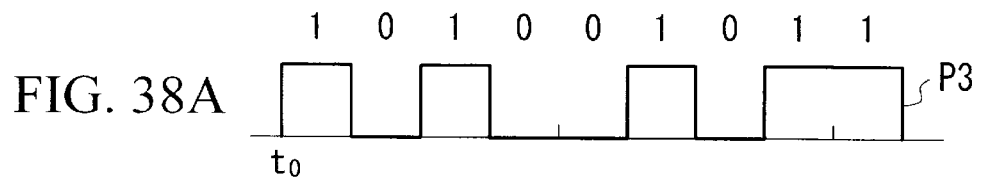
FIGS. 38A to 38E are diagrams for explaining the operation of a conventional optical transmitter.
Figure 38B:
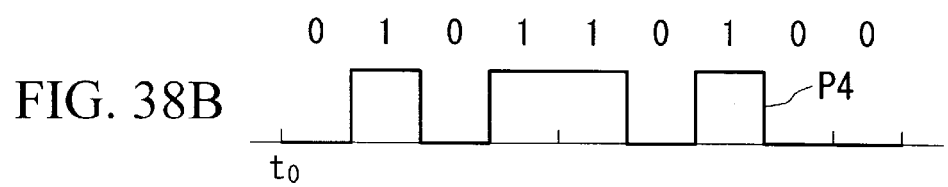
Figure 38C:
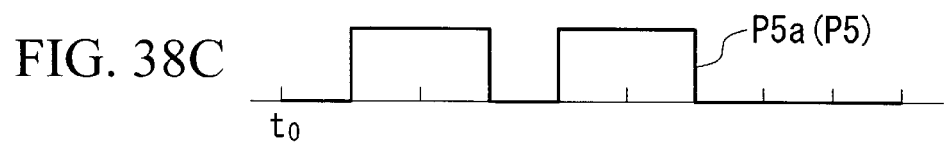
Figure 38D:
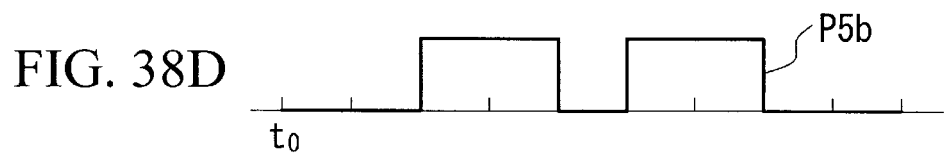
Figure 38E:
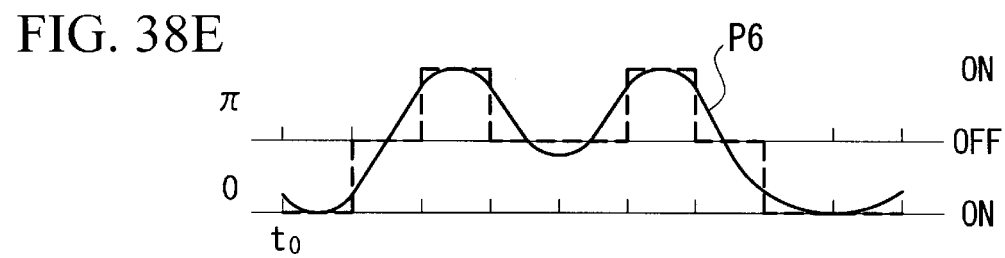
Figure 39A:
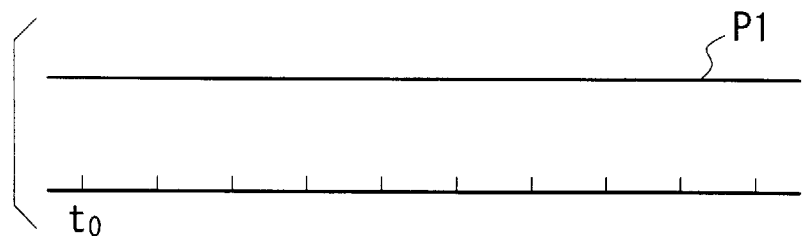
FIGS. 39A to 39C are diagrams for explaining the operation of a conventional optical transmitter.
Figure 39B:
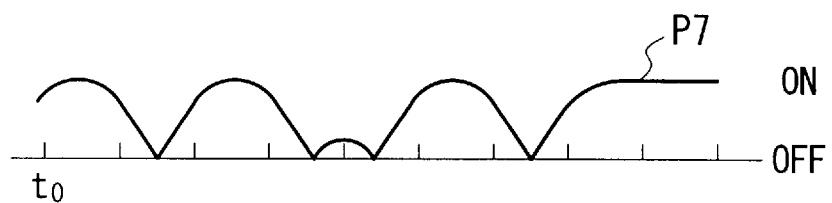
Figure 39C:
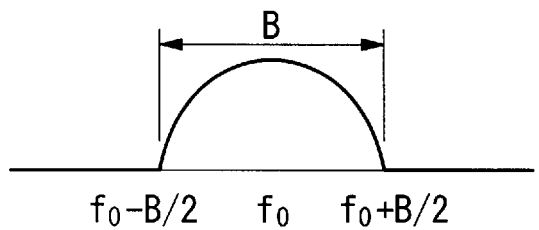
Figure 40A:
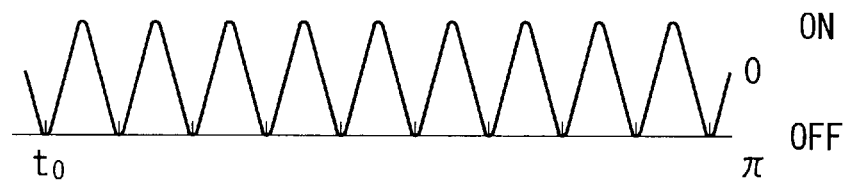
FIGS. 40A and 40B are diagrams for explaining the operation of a conventional optical transmitter.
Figure 40B:
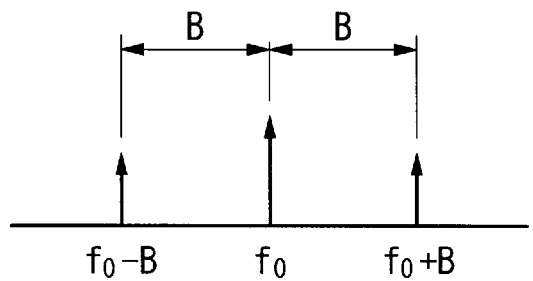
Figure 41A:
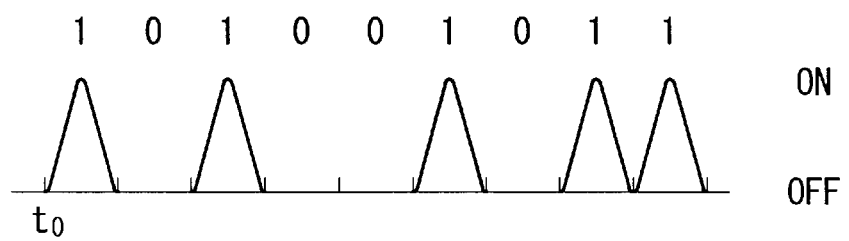
FIGS. 41A and 41B are diagrams for explaining the operation of a conventional optical transmitter.
Figure 41B:
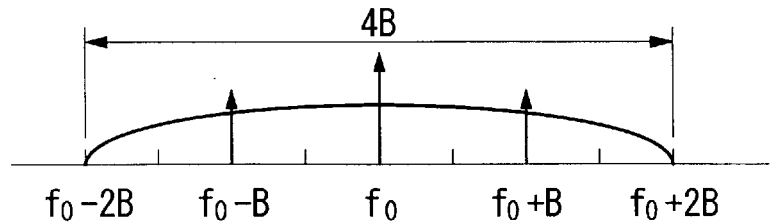

The transmittable band of the optical band restricting section 112 corresponds to the bandwidth of the carrier-suppressed RZ optical duobinary encoded signal, as shown in FIG. 36B, thereby effectively suppressing the higher harmonic components, as shown in FIG. 36C. Therefore, the efficiency of using bands in the wavelength-division multiplexing operation can be improved.

In the present wavelength-division multiplexing system in the above Example 7, an arrayed-waveguide grating (AWG) type filter may be used as the optical wavelength-division multiplexing section 104, and the transmittable bandwidth of the filter may be set to be similar to that of the optical band restricting section 112 of Example 8, thereby simultaneously suppressing the higher harmonic components of the carrier-suppressed RZ optical duobinary encoded signal of each wavelength.

EXAMPLE 9

FIGS. 44A to 44D are diagrams for explaining the distinctive feature of a ninth example of the optical transmission system (an optical receiver) in the second embodiment according to the present invention.

The structure of the optical receiver of the present example is the same as that of Example 1 or 2; however, the crosstalk characteristics of the above-explained band dividing section are distinctive.

Figure 44A:
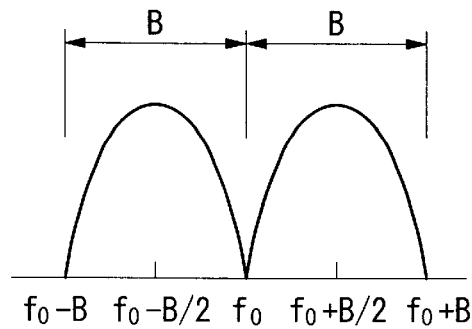
FIGS. 44A to 44D are diagrams for explaining the distinctive feature of a ninth example (Example 9) of the optical transmission system (an optical receiver) in the second embodiment according to the present invention.

FIG. 44A shows RZ encoded signal spectra with respect to a carrier frequency $f_0$, generated according to the present invention. As shown in the figure, two optical duobinary components are generated around two optical frequencies $f_0-B/2$ and $f_0+B/2$. The band dividing section in the present example outputs one of the two spectra of the optical duobinary encoded signal.

Figure 44B:
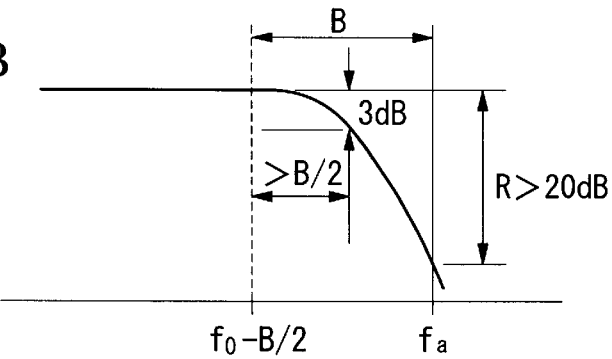

As shown in FIG. 44B, the band-pass frequency of the band dividing section is equal to one of the center frequencies of the optical duobinary encoded signal spectra (for the case shown in FIG. 44B, this is $f_0-B/2$). The present band dividing section has a suppression ratio (of the filter) R>20 dB and a 3 dB band (i.e., half-width) of more than B/2, at a frequency $f_a$ away from the band-pass frequency (i.e., $f_0-B/2$) by +B (B corresponds to the transmission speed).

Figure 44C:
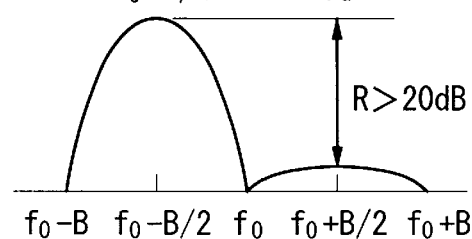

FIG. 44C shows spectra of the optical duobinary encoded signal having bands divided by the above-explained band dividing section. The figure clearly shows that the suppression ratio R of a chosen (i.e., output) optical duobinary component to a non-chosen component can be 20 dB or more with respect to the center frequencies of $f_0 \pm B/2$.

Figure 44D:
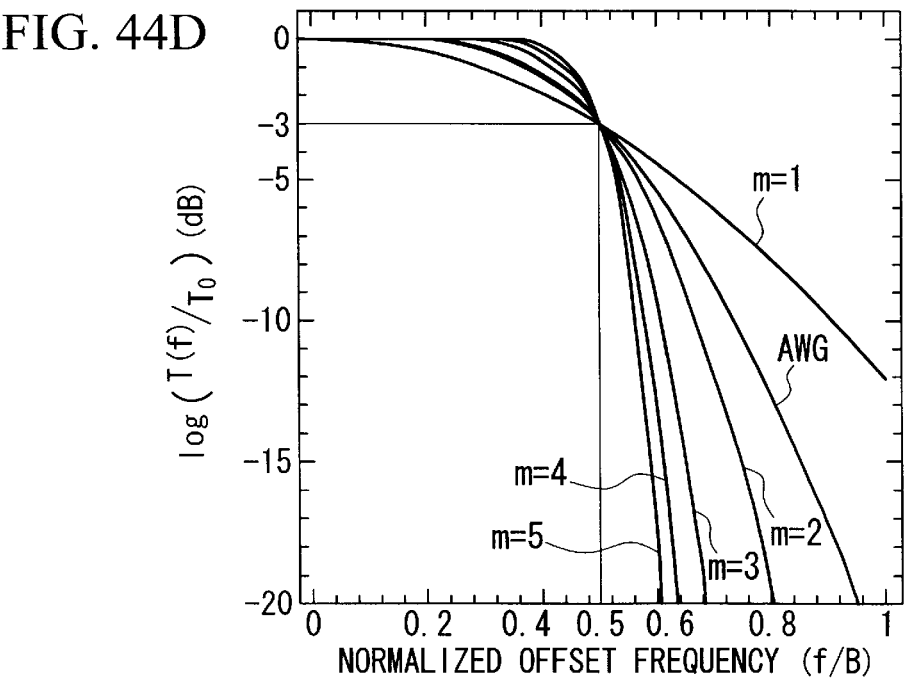

The band dividing section may be formed using a high-pass filter, a low-pass filter, or a band-pass filter. FIG. 44D shows the characteristics of super Gaussian band-pass filters of orders of 1 or more, each having a half-width of B/2, and an actual (actually-used) flat-top type AWG filter.

The transmission characteristics are indicated by:

$$T(f) = T_0 \exp\{-(\ln 2) \cdot (2f/B)^{2m}\}$$

where m is a real number indicating the order of the super Gaussian band-pass filter (abbreviated as "Gaussian filter" hereinbelow). Here, the order m=1 corresponds to a Gaussian filter having a 3 dB band (i.e., half-width) of B/2.

As shown in FIG. 44D, the Gaussian filter of an order m=1 cannot have a suppression ratio R>20 dB under the condition of a 3 dB band of B/2. In contrast, the actual flat-top type AWG filter (see reference symbol "AWG") and the Gaussian filters having an order m>1 can have a suppression ratio R>20 dB under the condition of a 3 dB band of B/2.

Figure 45:
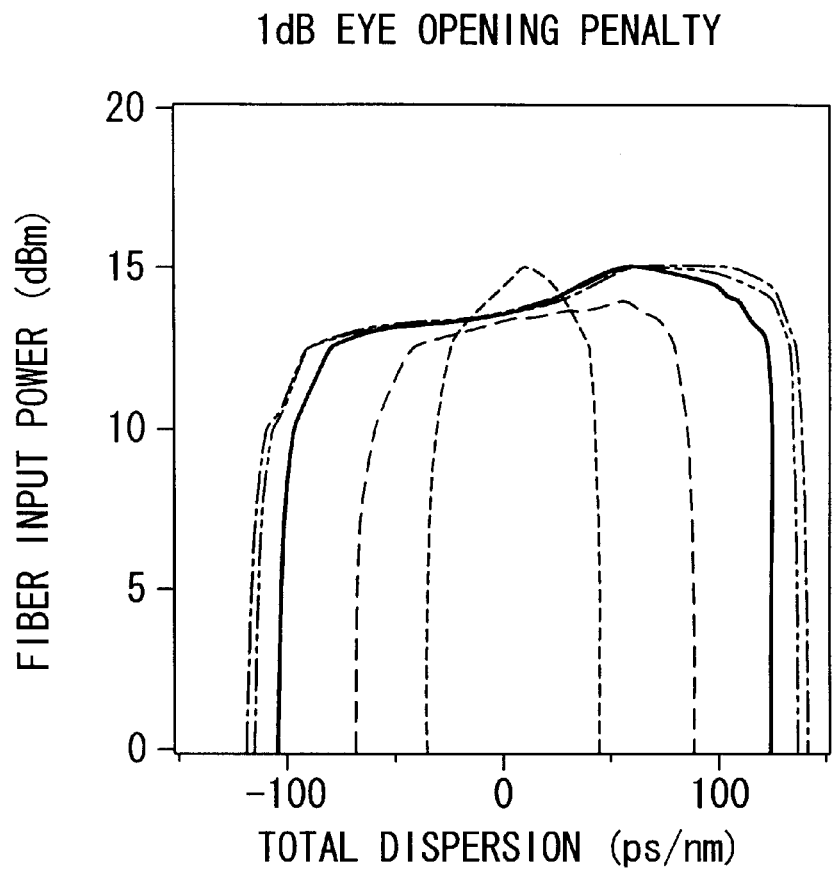
FIG. 45 is a diagram for explaining the function and effect of Example 9.

FIG. 45 is a diagram for explaining the function and effect of Example 9. The graph indicates the results of a computer simulation of the dependency of the chromatic dispersion tolerance on the fiber input power of a repeater when the order m of the Gaussian filter is varied from 1 to 5. In the simulation, the wavelength of an optical signal was 1.552 µm, and a 1.3 µm zero-dispersion fiber having a length of 100 km was used, where the chromatic dispersion at 1.552 µm was 17 ps/km/nm, and the corresponding line loss was 0.2 dB/km. Also in the simulation, a channel of the RZ signal according to the present invention was transmitted without inline-repeaters, the dispersion compensation was performed by using a DCF at the end of the receiving side, and only one of the optical duobinary components was output using the above-explained band dividing section having the transmission characteristics as shown in FIG. 45 in the receiver. In addition, the chromatic dispersion of the DCF was varied, and thus the total dispersion was varied. When the order m of the Gaussian filter is larger than 1, the chromatic dispersion tolerance can be improved to almost 200 ps/nm even if the fiber input power is high such as +10 dBm.

The distinctive features of the present invention have been explained based on specific examples. However, the present invention is not limited to each example, and any modification is possible within the scope and spirit of the claimed invention.

What is claimed is:

1. An optical transmission method for modulating an optical signal having longitudinal modes based on a partial response encoded signal and outputting the modulated signal, comprising the steps of:

receiving a clock signal from a system clock source;

modulating a single mode optical signal based on the clock signal and generating an optical pulse signal having two longitudinal modes, the frequency interval between the two modes being n×B, where n is a natural number and B is a transmission speed;

generating a partial response encoded signal by converting a binary NRZ encoded signal output from a digital signal source in synchronism with the system clock source; and modulating the optical pulse signal having two longitudinal modes based on the partial response encoded signal, and outputting a binary RZ modulated signal obtained by the modulation.

2. An optical transmission method as claimed in claim 1, wherein the binary RZ modulated signal is output after higher harmonic components thereof are removed.

3. An optical transmission method as claimed in claim 1, wherein a duobinary encoded signal is used as the partial response encoded signal.

4. An optical transmission method as claimed in claim 1, wherein a modified duobinary encoded signal is used as the partial response, encoded signal.

5. An optical transmitter comprising:

a system clock source for generating a clock signal;

a binary NRZ digital signal source for generating a binary NRZ digital signal in synchronism with the clock signal;

an electric partial response encoding section for receiving the binary NRZ digital signal and generating an electric partial response encoded signal;

a dual-mode beat optical pulse generating section for generating an optical pulse signal having two longitudinal modes, the frequency interval between the two modes being n×B, where n is a natural number, B is a transmission speed, and the generated optical pulse signal is in synchronism with the binary NRZ digital signal;

a pulse light source driving section for generating a signal for driving the dual-mode beat optical pulse generating section, by using a clock signal in synchronism with the clock signal generated by the system clock source; and an optical modulating section for modulating the optical pulse signal having two longitudinal modes based on the electric partial response encoded signal, and outputting a binary RZ modulated signal obtained by the modulation.

6. An optical transmitter as claimed in claim 5, wherein the dual-mode beat optical pulse generating section includes a Mach-Zehnder optical intensity modulator.

7. An optical transmitter as claimed in claim 5, wherein the dual-mode beat optical pulse generating section includes a dual-mode oscillation mode-locked laser.

8. An optical transmitter as claimed in claim 6, wherein the Mach-Zehnder optical intensity modulator is a push-pull type, and is driven by a clock signal which has a frequency of n×B/2 and has an amplitude equal to the half-wave voltage of the Mach-Zehnder optical intensity modulator.

9. An optical transmitter as claimed in claim 5, wherein the dual-mode beat optical pulse generating section has an optical filter for removing higher harmonic components included in the optical pulse signal having two longitudinal modes.

10. An optical transmitter as claimed in claim 9, wherein an arrayed-waveguide grating filter is used as the optical filter for wavelength-division multiplexing the generated signal.

11. An optical transmitter as claimed in claim 5, further comprising an optical filtering section for removing higher harmonic components included in the optical signal modulated by the optical modulating section.

12. An optical transmitter as claimed in claim 5, wherein the electric partial response encoded signal is a duobinary encoded signal.

13. An optical transmitter as claimed in claim 5, wherein the binary RZ modulated signal is a carrier-suppressed RZ optical duobinary encoded signal.

14. An optical receiver comprising:

a band dividing section for receiving a binary RZ modulated signal transmitted from an optical transmitter as claimed in claim 5, and dividing two partial response components included in the optical spectra of the received binary RZ modulated signal, and outputting one or both of the divided partial response components; and an optical receiving section for receiving one or both of the divided partial response components output from the band dividing section.

15. An optical receiver as claimed in claim 14, wherein the two partial response components are optical duobinary components.

16. An optical receiver as claimed in claim 14, wherein the optical receiving section includes:

a photoelectric conversion section for converting the two partial response components into electric signals; and an adder for adding the electric signals so as to regenerate an original signal in the transmission.

17. An optical receiver as claimed in claim 14, wherein the optical receiving section includes:

a photoelectric conversion section for converting the two partial response components into electric signals; and a subtracter for performing subtraction on the electric signals so as to regenerate an original signal in the transmission.

18. An optical receiver as claimed in claim 14, wherein the optical receiving section individually receives the two partial response components, and one of the components is for backup use.

19. An optical receiver as claimed in claim 14, wherein the optical receiving section monitors one of the optical intensities of the two partial response components, and controls the band dividing section so as to satisfy the condition that the monitored optical power is a maximum.

20. An optical receiver as claimed in claim 14, wherein the optical receiving section monitors both of the optical intensities of the two partial response components, and controls the band dividing section so as to satisfy the conditions that the sum of the two monitored optical powers is a maximum while the difference of the two monitored optical powers is a minimum.

21. An optical receiver as claimed in claim 14, wherein the band dividing section outputs only one of the two partial response components, and has crosstalk characteristics in which a suppression ratio of the output component to the non-output component is 20 dB or more.

22. An optical transmission system in which an optical transmitter and an optical receiver are connected via an optical transmission medium, comprising:
   an optical transmitter comprising:
      a system clock source for generating a clock signal;
      a binary NRZ digital signal source for generating a binary NRZ digital signal in synchronism with the clock signal;
      an electric partial response encoding section for receiving the binary NRZ digital signal and generating an electric partial response encoded signal;
      a dual-mode beat optical pulse generating section for generating an optical pulse signal having two longitudinal modes, the frequency interval between the two modes being n×B, where n is a natural number, B is a transmission speed, and the generated optical pulse signal is in synchronism with the binary NRZ digital signal;
      a pulse light source driving section for generating a signal for driving the dual-mode beat optical pulse generating section, by using a clock signal in synchronism with the clock signal generated by the system clock source; and
      an optical modulating section for modulating the optical pulse signal having two longitudinal modes based on the electric partial response encoded signal, and outputting a binary RZ modulated signal obtained by the modulation; and
   an optical receiver comprising:
      a band dividing section for receiving a binary RZ modulated signal transmitted from an optical transmitter as claimed in claim 5, and dividing two partial response components included in the optical spectra of the received binary RZ modulated signal, and outputting one or both of the divided partial response components; and
      an optical receiving section for receiving one or both of the divided partial response components output from the band dividing section.

23. An optical transmission system comprising:
   a plurality of optical transmitters for generating binary RZ modulated signals having different wavelengths;
   an optical wavelength-division multiplexing section for wavelength-division multiplexing the binary RZ modulated signals having different wavelengths, and outputting the wavelength-division-multiplexed binary RZ modulated signal;
   an optical transmission medium for transmitting the wavelength-division-multiplexed binary RZ modulated signal;
   an optical wavelength-division demultiplexing section for receiving the wavelength-division-multiplexed binary RZ modulated signal transmitted via the optical transmission medium, and wavelength-division demultiplexing the received signal into binary RZ modulated signals having different wavelengths; and
   a plurality of optical receivers, for respectively receiving the binary RZ modulated signals having different wavelengths, wherein:
   at least one of the optical transmitters comprises:
      a system clock source for generating a clock signal;
      a binary NRZ digital signal source for generating a binary NRZ digital signal in synchronism with the clock signal;
      an electric partial response encoding section for receiving the binary NRZ digital signal and generating an electric partial response encoded signal;
      a dual-mode beat optical pulse generating section for generating an optical pulse signal having two longitudinal modes, the frequency interval between the two modes being n×B, where n is a natural number, B is a transmission speed, and the generated optical pulse signal is in synchronism with the binary NRZ digital signal;
      a pulse light source driving section for generating a signal for driving the dual-mode beat optical pulse generating section, by using a clock signal in synchronism with the clock signal generated by the system clock source; and
      an optical modulating section for modulating the optical pulse signal having two longitudinal modes based on the electric partial response encoded signal, and outputting a binary RZ modulated signal obtained by the modulation; and wherein
   at least one of the optical receivers comprises:
      a band dividing section for receiving a binary RZ modulated signal transmitted from an optical transmitter as claimed in claim 5, and dividing two partial response components included in the optical spectra of the received binary RZ modulated signal, and outputting one or both of the divided partial response components; and
      an optical receiving section for receiving one or both of the divided partial response components output from the band dividing section.

24. An optical transmission system as claimed in claim 23, wherein the optical wavelength-division multiplexing section has an optical filter for removing higher harmonic components included in the binary RZ modulated signals having different wavelengths.

25. An optical transmitter comprising:
   a plurality of optical transmitters as claimed in claim 5, for generating binary RZ modulated signals having different wavelengths; and
   an optical wavelength-division multiplexing section for wavelength-division multiplexing the binary RZ modulated signals having different wavelengths, and outputting the wavelength-division-multiplexed binary RZ modulated signal.

26. An optical transmitter as claimed in claim 25, wherein the optical wavelength-division multiplexing section has an optical filter for removing higher harmonic components included in the binary RZ modulated signals having different wavelengths.

27. An optical receiver comprising:
  an optical wavelength-division demultiplexing section for receiving a wavelength-division-multiplexed binary RZ modulated signal output from an optical transmitter as claimed in claim 25, and wavelength-division demultiplexing the received signal into binary RZ modulated signals having different wavelengths; and
  a plurality of optical receivers for respectively receiving the binary RZ modulated signals having different wavelengths, and wherein:

the optical receiver comprises:
  a band dividing section for receiving a binary RZ modulated signal transmitted from an optical transmitter as claimed in claim 5, and dividing two partial response components included in the optical spectra of the received binary RZ modulated signal, and outputting one or both of the divided partial response components; and
  an optical receiving section for receiving one or both of the divided partial response components output from the band dividing section.

\* \* \* \* \*